US008353750B2

(12) United States Patent  
Patchen

(10) Patent No.: US 8,353,750 B2  
(45) Date of Patent: Jan. 15, 2013

(54) RESPONSE GAME SYSTEMS AND METHOD

(76) Inventor: Jeffery Allen Patchen, Oakland, CA (US)

( * ) Notice: Subject to any disclaimer, the term of this patent is extended or adjusted under 35 U.S.C. 154(b) by 985 days.

(21) Appl. No.: 11/234,747

(22) Filed: Sep. 23, 2005

(65) Prior Publication Data

US 2006/0082068 A1    Apr. 20, 2006

Related U.S. Application Data

(60) Provisional application No. 60/612,256, filed on Sep. 23, 2004.

(51) Int. Cl.  
*A63F 9/18* (2006.01)

(52) U.S. Cl. .......................................................... 463/9

(58) Field of Classification Search ................ 463/9, 35, 463/40  
See application file for complete search history.

(56) References Cited

U.S. PATENT DOCUMENTS

| 5,453,015 | A  | * | 9/1995  | Vogel ............................ | 434/350 |
| 5,692,752 | A  | * | 12/1997 | Hanna ........................... | 273/248 |
| 6,760,595 | B2 | * | 7/2004  | Inselberg ...................... | 455/517 |
| 6,778,807 | B1 | * | 8/2004  | Martino et al. ............... | 434/362 |
| 2001/0003099 | A1 | * | 6/2001  | Von Kohorn ................ | 463/40 |
| 2001/0049625 | A1 | * | 12/2001 | Mowry ......................... | 705/14 |
| 2002/0044144 | A1 | * | 4/2002  | Inoue ............................ | 345/204 |
| 2004/0033478 | A1 | * | 2/2004  | Knowles et al. .............. | 434/350 |
| 2004/0152516 | A1 | * | 8/2004  | Blatter et al. ................. | 463/42 |

OTHER PUBLICATIONS

Chatzky, Jean Sherman, "Wanna Be on Millionaire?", Money; Apr. 2000, vol. 29 Issue 4, p. 196.*

* cited by examiner

*Primary Examiner* — Arthur O. Hall  
*Assistant Examiner* — Allen Chan  
(74) *Attorney, Agent, or Firm* — Sterne, Kessler, Goldstein & Fox, P.L.L.C.

(57) ABSTRACT

Novel response games provide participants with opportunities to receive response points and subsequent prizes, awards, fortune, and fame. Correct responses are generally determined by a television producer's and sponsor's targeted viewers (e.g. a designated response game point controller). Players receiving a highest response point total for a plurality of response sessions are identified as highly in-sync with a response point controller and qualify to be selected to star on television as viewer/controller representatives. Viewer/controller representatives are presented with various producer's and sponsor's business element options associated with a future television promotion, production, and program provided. The representatives are shown evaluating each business element and selecting a number of most suitable elements to become future response game elements. The producer's and sponsor's elements selected by the viewer/controller representatives are determined by the representatives to be the most suitable elements for viewers to respond to during a future response game.

35 Claims, 32 Drawing Sheets

(32 of 32 Drawing Sheet(s) Filed in Color)

RESPONSE GAME SYSTEMS AND METHOD

CROSS-REFERENCE TO RELATED APPLICATIONS

This application claims priority to U.S. Provisional Application Ser. No. 60/612,256 filed on Sep. 23, 2004.

TECHNICAL FIELD

The present application relates to novel response game systems and methods in which players are offered prize, award, fortune, and fame opportunities for responding to a response game producers and sponsors business elements via electronic communications media, for example, a method and system in which players and/or a controller respond to various business elements relating to promotions, productions, and products/programs, while being able to receive points, prizes, fortune, and fame as a result of their participation.

The present inventions relate to element response period, game, and test systems and methods enabling primary and ancillary element response period, element response game, and element response test providers, administrators, sponsors, advertisers retailers, and other businesses providing revenues to incorporate elements into the periods, games, and tests in order to capture responses to the elements from entities comprising period, game, and test element controllers, and game and test participants and, in particular, to systems and methods for identifying, rewarding, and engaging entities comprising the element controllers, and game and test participants with a highest degree innate ability to identify and respond to period, game, and test elements in a manner that is at least similar to one or more element controllers designated by the period, game, and test providers, administrators, sponsors, advertisers, retailers, and/or other businesses providing revenues, and to provide consideration to entities comprising element controllers, game and test participants based at least in part upon said ability.

The inventions relate, generally, to novel "Viewer Interactive" element response games/tests with predetermined elements controlled by segments of a society, wherein game/test participants in sync with one or more segments of the society qualify to represent the one or more segments in the production of a subsequent even more novel "Viewer Controlled" element response game/test. More particularly, these inventions allow integration of sponsor provided elements into the games/tests resulting in novel sponsor to consumer relationships.

BACKGROUND

Over the past several years, various voting events have been offered in order to drive/entice participation while offering no opportunity for consideration other than an occasional sweepstake offering.

However, in spite of the extraordinary effort that has been expended in developing new voting formats, no production has been able to provide consumers opportunities to achieve true power and dignity In particular, viewers of, for example, some reality-based television, are able only to participate as a respondent with no opportunity to receive anything more than being listed on a leader board or at best entered into a drawing based not on how they responded but just responding. For example, viewers of "American Idol" are asked to vote for their favorite contestant as many times as humanly possible and are offered nothing, but a chance to see which contestant has a fan base that is willing to place a highest number of votes. A lady by the name of Betty Williams once told me that if someone votes 6 times for one of the final two contestants she didn't vote for she canceled out their 6 votes because she votes 7 times for the other contestant. Another example is when FOX news reported that an owner of a telemarketing company in Texas voted for Kelly Clarkson over 3 million times by using technology available to his company. Furthermore, dialing repeaters are accessible to the public for just this type of multiple voting method. And they say voting is based on a democratic principle, by whom, the producers of AI, I say not. This brings us to the point of "American Idol" judges. The three judges in essence are self appointed America representatives due to the fact that the three judges make the final decision on which contestants are presented for American to vote on. Do did these individuals qualify to represent America?

Consumer information and behavioral characteristics are factors in determining the costs and effectiveness of all media. A primary target demographic for producers and advertisers is the 18-49 age group. The Nielsen rating system, however, has come under criticism from industry sources questioning its accuracy and effectiveness of demographic targeting for purposes of determining advertising revenues.

Further, existing market research services and measurement procedures can, at best, be characterized as being inadequate for capturing accurate and detailed viewer patterns and preferences.

Prior art systems have also been characterized by the lack of sample information, sample size, biases in selecting marketing research samples and errors in data interpretation.

Cable television, satellite, terrestrial broadcast, and Internet systems afford viewers a multiplicity of programming material.

With such a broad range of content, broadcasters and producers attempt to attract eyeballs in order to generate advertising revenue. The goal of broadcasters and producers is to attract and maintain an audience in order to identify and number eyeballs in order to provide current and potential advertisers or revenue providers with a viewership metric.

In order to attract new viewers, broadcasters are attempting to introduce various genres of programming such as interactive events and series with and without viewer participation. When a genre proves to be popular other programmers are generally compelled to duplicate one or more aspects of the genre or program type.

Further, video recording equipment, such as some digital video recorders, for example, may allow deletion of advertising messages. A survey by one digital recorder manufacturer indicates that 84 percent of customers skip advertisements.

Broadcasters employ metrics of how many viewers watch each program in order to attract advertisers and to set advertising rates.

An exact count of the number of viewers of a program is difficult to establish, in contrast to newspaper or magazine publications.

An information service commonly employed is the Nielsen ratings from Nielsen Media Research, Inc headquartered at 299 Park Avenue New York, N.Y. 10171. Nielsen Media Research typically asks viewing habit questions to a small sample of approximately 5000 households. From this sampling, Nielsen generates a measure of how many people watched a particular program or advertisement. The above attempts at measuring and retaining an audience is shown by the embodiments of invented material described herein as poor at best and proves the new methods and system are soon to be embraced by future licensees and businesses associated of the inventor.

The recent hit show on the NBC network, "The Apprentice" broke a Television participant application World record of 215 thousand applicants. The inventions described herein will show how the new Television participant application record will exceed the existing application record by many times over.

High percentage of improperly cast elements for productions.

Consumers/viewers are represented by unqualified individuals and teams determining which elements are to be incorporated into audio and visual events and series.

Events and series that generate revenues based at least in part on a number of viewers generally provide little or no consideration to viewers.

Show AFI text explaining 200 plus billion direct marketing spend and how Television producers and networks are attempting to garner of percentage of the spend.

Currently, various types of un-novel and obvious element response periods are conducted within all industries. Most notably are the entertainment, manufacturing and service industries. Whenever elements are provided to the public for entertainment, consumption, or service, the elements are a result of one or more of the element response periods.

Example 1

A product/element is provided to the public for consumption. The element is a result of an element response period whereby a generally unknown element controller is presented with a plurality of elements. The controller determines which element from the plurality of elements is most suitable for public consumption. In essence, the controller is more often than not a self company appointed consumer representative.

Example 2

An entertainer/element is presented to the public for entertainment. The element is a result of an element response period whereby a generally unknown element controller is presented with a plurality of elements. The controller determines which element from the plurality of elements is most suitable or appealing for entertainment purposes. Therefore, the controller is a self or company appointed viewer representative.

Example 3

Contestants/elements are provided to the public for interactive entertainment. The elements are a result of an element response period whereby a generally unknown element controller is presented with a plurality of elements. The controller determines one or more elements from the plurality of elements that are most suitable for viewer interaction. The element controller is a self or company appointed viewer representative.

Every so often a consumer or viewer representative may get it right . . . which is truly unacceptable.

Therefore, a need exists for businesses to identify and engage viewer and consumer representatives with a proven innate ability to consistently identify elements that are most appealing and suitable to viewers and consumers.

Orchestrating an emotional connection is key for consumers to embrace their brands, but also key is taking this connection to an experiential level. For successful brand building, a company has to start with the consumer, find out when and where they will be, and establish an emotional connection that ultimately creates harmony between the consumer, brand, and product.

SUMMARY

Novel response games provide members of a World community opportunities to receive response points and subsequent prizes, awards, fortune, and fame for correctly responding to and/or controlling various elements of interactive promotions, productions, and products with respect to all genres of existing and future/innovative/interactive publications, radio, music, Television (e.g., talent shows, game shows, award shows, reality, sitcom, drama, etc.) film (e.g. feature, animated, documentary, etc.), video games, politics, and manufacturing.

Most notably novel response games compel and empower viewers to take part in Television promotions, productions, and programs. Correct responses are generally determined by a Television producers and SPONSOR'S targeted viewers (e.g. a designated response game point controller). Players receiving a highest response point total for a plurality of response sessions are identified as highly in-sync with a response point controller (e.g. producer's and sponsor's targeted viewers) and qualify to be selected to star on Television as viewer/controller representatives. While starring on Television viewer/controller representatives are presented with various producer's and sponsor's business element options associated with a future Television promotion, production, and program provided. The representatives are shown evaluating each business element and selecting a number of most suitable elements to become future response game elements. The producer's and sponsor's elements selected by the viewer/controller representatives are determined by the representatives to be the most suitable elements for viewers to respond to during a future response game. After all, who could be more qualified to represent viewers than those proven to be most in-sync with viewers?

Novel response games are designed to utilize producer and sponsor provided elements as response game elements relating to the producer's and sponsor's interactive promotions, productions, and end products. In essence, a response game is intended to be wrapped around all genres of media promotions, productions, and products.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 shows a game producer's game element ranking system prepared for a player to begin a response game process.

The inventions described herein enable event and series producers and broadcasters, advertisers, sponsors, and those seeking consumer data with tools to provide viewers/participants/consumers with a time worthy, socially satisfying, and empowering experience with a potentially unlimited number of platforms to achieve this experiential (phenomenal) result.

The inventions allow the elimination of in your face advertising often time resulting in a bad rap for the brand.

As stated by Rick Mandler, president of ABCs enhanced TV group, "A sitcom is not a great opportunity for an interactive application. A sporting event or a reality show is. So that's basically how we make our judgments." If ABC becomes a licensee they will have a great opportunity to incorporate interactive applications to all types of past, present, and future programming, not only sporting events and so-called reality shows. They may even choose to incorporate interactive applications into "I Love Lucy", "Mash" or "The Tonight Show" re-runs made available on broadcast Television or DVD.

The inventions create a period producer to viewer/consumer synergy by not only allowing a viewer/consumer to control elements presented during a period but to also control/determine which elements are presented.

The inventions also create a consumer to revenue provider synergy whereas the revenue provider offers fame and fortune opportunities to participants identified as in sync with one or more controllers of the primary period theme elements and revenue provider's elements.

Comparing Von Kohorn to Patchen

Von Kohorn allows viewers to receive awards on an event to event basis without points and without an accumulation of award opportunities. Patchen allows viewers to receive and accumulate various point values for various types and numbers of correct responses whereas a correct response to an element is determined by a highest number or a majority of viewers' responses to the element. The point values allow viewers to become identifiable as to whether or not they are in step or in sync with a highest number of viewers for an event or series of events and provides viewers with various consideration opportunities based upon received point totals.

Von Kohorn requests viewers to "select and/or predict" one or more contestants who will respond to a task presented by a host during a same event. Patchen allows a highest number of viewers to determine which contestants are to perform activities or tasks during a subsequent event or phase based upon on determining which contestants are most suitable, qualified or talented with respect to a pre-determined or implied criterion.

Von Kohorn refers to providing awards to viewers for predicting contestants that will successfully perform tasks and/or answer questions prior to the performance of the task or answer to the question. This method of predicting a winning or successful contestant is based on a random or chance response to the contestant. Patchen requires viewers to respond to a contestant's task performance or answer to a question sometime after the task performance or question answer which requires participating viewers to evaluate or judge the contestant's task performance or question answer and then provide a response to the contestant based on subjectivity.

Von Kohorn shows that a winning contestant is one who correctly performs a task or answers a question. The correct performance of the task or correct answer to a question seems to be determined by the "quiz, game, or other show" provider. Patchen shows that a contestant's correct response or performance is determined by a highest number of participating viewers or a highest number of a group or segment of participating viewers.

Von Kohorn refers to tasks or questions a "game, quiz, or other show" contestants are required to perform and answer that are determined by the producers of the game, quiz or other show. Patchen allows viewers to ultimately determine tasks or questions (activities) contestant options, contestants, and finalists are required to perform and answer.

With respect to Von Kohorn shown within the office action the action states "The viewers are requested to select and/or predict one or more of the contestants who will respond the task presented by the host." This method requires a real time interaction while Patchen provides viewers at least 24 hours to evaluate contestant options and select contestants during one phase in order to determine which contestants will appear to perform tasks during a subsequent phase.

The action further states "The language utilized in Von Kohom is of such breadth that by the definitions contained within the beginning portions of the instant specification the task can be who will continue the next round of competition among the contestants. This can mean the viewers need to decide which contestant continues onward which means a "vote" by the viewers which effects the production information." The viewers voting to determine which contestant continues on to the next round or onward is a voting process currently utilized by producers of shows such as Survivor, American Idol, Star Search, and Southern Star, to name a few.

Summary of Von Kohorn to Patchen Comparison

Von Kohorn's invention relates to interactive game or quiz type shows whereas Patchen generally relates to events or series that require or allow various levels of element evaluations or judging with subsequent element selections or voting based on the evaluations or judging of each element. These events may be referred to as competition/evaluation events. A competition/evaluation event may be a talent, award, or audition type of show, or present or future product or service evaluation show, whereas each show or show series generally results in one or more consumables, productions, products, or recognizable elements.

Patchen may also relate to a game, quiz, or other types of shows Von Kohorn refers to by allowing potential viewers to audition and/or cast contestants, hosts, and the tasks or questions one or both may be required to perform or answer prior to or during the shows. These shows may also utilize the Patchen inventions in order to provide viewers with opportunities to receive consideration for correctly evaluating or judging contestants or hosts as well as other elements within the shows when applicable.

Comparing Big Brother to Patchen

Also within the office action the Irish version of Big Brother is shown "where a number of contestants are confined to a house and the viewers of the show each week vote a contestant out of the house." Patchen provides consideration opportunities for viewers participating in the novel process of auditioning and casting contestants who may appear on the show as confined housemates. The Patchen inventions may also provide viewers with an opportunity to receive and accumulate points for correctly voting in or voting out contestants from the house during a series of shows whereas a correct vote in or vote out response to a housemate is determined by a highest number of viewers resulting in providing a producer with the ability to identify viewers that are in sync with a highest number of viewers after one or more shows.

A plurality of contestant (primary element) options may be presented and two or more contestant options may be selected to become contestants. The two or more contestants are generally then evaluated and at least one may be selected to become a finalist. An entity or entities controlling the process of determining which contestant (primary element) options and competition or audition activity (attachment or influence element or tailored attachment or influence element) options are to be made available for viewer selection, with respect to the invention, is generally a competition or audition provider or associate. A designated controller of each subsequent selection process is generally a highest number of all participating viewers. A designated controller may also be a highest number of a segment of participating viewers.

Objects of the Inventions:
Identify and possibly reward and/or engage participating viewers with an ability to evaluate, identify, and select a number of primary elements from a plurality of primary element options that are most viable, suitable, qualified, and/or talented according to a highest number of participating viewers.

Identify and possibly reward and/or engage participating viewers with an ability to evaluate, identify, and choose a number of influence or attachment or tailored influence or attachment elements from a plurality of influence or attachment or tailored influence or attachment element options that are most viable, suitable or best for preselected or viewer selected primary elements to perform, be attached to, or be influenced by during a competition or audition according to a highest number of participating viewers.

Identify and possibly reward and/or engage participating viewers with an ability to evaluate, identify, and select a number of competition or audition finalists from a plurality of competing or auditioning primary elements that are most viable, suitable, qualified, and/or talented according to a highest number of participating viewers.

The invention allows participating viewers comprising a majority of participating or a majority of a segment of participating viewers controlling the fate/future of primary element options, competition or audition attachment, influence, or tailored attachment or influence options, and finalists to receive point values for providing correct responses to elements. A correct response is determined by an element controller be it a highest number of all participating viewers or a highest number of a segment of participating viewers.

Generally, participating viewers receiving a highest point total for one or more response categories may be identified as in sync with the controller or having the pulse of the people with respect to the one or more categories. Participants in sync with a majority of viewers/consumers over a period of time may be considered to have a skill or an ability that may be required or most suitable to become a viewer/consumer representative or leader. Therefore, consideration may and should be offered to those with this rare skill or ability. A participating viewer with a highest point total may even be a highly suitable employee or executive for businesses targeting viewers or consumers to which the skilled viewer is in sync. Also, viewers in sync with the likes and dislikes of a majority of viewers may be most suited to represent viewers during a production preparation process as an element (contestant option, competition activity option, Interactive and placement product option) casting director or become a star during a future production as a celebrity judge with a proven track record of having 'the pulse of the people.'

By allowing viewers that are proven to be in sync with a majority of viewers or a majority of a target demographic to participate in a production preparation process for future interactive events and series, the stage is set for future "Totally Viewer/Consumer Controlled" productions.

Producers of future reality TV programming may utilize the invention to provide fans and soon to be fans with opportunities to receive consideration for correctly auditioning and casting contestants for the future programming.

Those utilizing the invention may and most likely will attract record breaking numbers of viewers when compared to current conventional programming providing little or no empowerment and no opportunities for ultimate consideration.

The producers of shows such as Survivor, Big Brother, American Idol, The Bachelor, The Bachelorette, The Apprentice, Miss America, Miss Universe, to name a few, may utilize the invention to cast highly recognizable contestants and participants and to attract and maintain a massive and committed audience base.

Producers of various types of productions requiring a host or celebrity judge may utilize the systems and methods to allow potential viewers or at home participants to audition and cast a host or celebrity judge for a future production.

Another basic concept of the invention is to allow viewers to participate in competitions and auditions as if they were casting directors, celebrity judges, and/or production executives.

Accordingly, it is an object of the present inventions to provide systems and methods for capturing and storing information pertaining to entities comprising element response period element controllers, element response test and game element controllers, and element response test participants.

It is another object of the present inventions to provide systems and methods for monitoring television viewer or user behavior with regards to, and in response to, televised programs, commercial advertisements as well as elements incorporated into the programs and advertisements.

It is yet another object of the present inventions to provide systems and methods for monitoring and storing information pertaining to an element controller's responses to elements with respect to controlling each element's fate and determining which responses and to which elements are correct responses for test participants.

Generate consumer anticipation and excitement with respect to element presentations. More specifically, create consumer anticipation and excitement with respect to being presented with productions, products, and services.

Enable element controllers to determine which consumables options from a plurality of consumable options presented by an element response period provider and/or element response period revenue provider during an element response period are most suitable to be consumed during or after an element response period.

Enable element response period revenue providers to develop and maintain a direct marketing relationship with consumers from one or more societies or one or more segments of one or more societies designated to control the future or fate of element response options or response elements presented during the period.

Enable element response period and element response test providers to develop a direct marketing relationship with consumers from one or more societies or one or more segments of one or more societies designated to control the future or fate of element response options or response elements presented during the period.

Enable element response period and test providers to identify and engage period and test participants most qualified to assist or represent one or more controllers of elements incorporated into a period or test by the period or test provider.

Enable element response period and test revenue providers to identify and engage period and test participants most qualified to assist or represent one or more controllers of elements incorporated into a period or test by the period or test revenue provider.

Enable element response period or test providers to incentivize members of one or more societies to access and/or consume elements presented during a period or test.

Initiate and maintain a synergy between element response period and test viewers and participants, period and test providers, and revenue providers.

Enable element response period and test providers to utilize all possible element observation and evaluation platforms and media.

Enable element response period and test providers to utilize all possible element response platforms.

Provide element response period viewers and element response test participants with electronic, wireless, and printed element response point self assignment and element response point total calculation systems.

Enable producers and manufacturers to generate revenues during the process of advertising and marketing productions and consumables.

A test provider's objective may be to allow a highest number of participants to be considered as most qualified to represent a controller. This may be accomplished by designating a majority of participants as an element controller and provide only two elements to respond to. If all participants respond to the same element, all participants may be in sync with the element controller for the one response. This may happen if the two elements are diverse. When the two elements are similar, the number of participants in sync with the controller will be far less than 100% and may be closer to 50%. When three elements are similar, the number of participants that will be in sync with the controller is generally far less than 50%. A test provider may wish to bring an unmanageable number of participants down to a manageable number by utilizing this method.

A function of an element response period may be to allow one or more element controllers to determine which elements from a plurality of elements presented before and/or during the period are most or least suitable or most or least qualified when compared to other elements within the period or within an element category within the period, wherein suitability or qualification is defined by the period provider.

An element response test generally functions in the same capacity as an element response period and will have at least one other function. The at least one other function may be to identify participants most in sync with the one or more element controllers. When one or a plurality of participants are identified as most in sync with a controller various methods may be applied to accomplish the identification process.

Identify one or more participants in sync with one or more element controllers.

Identify an entity or entities comprising one or more element controllers in sync with one or more participants.

Identify an entity or entities comprising one or more element controllers in sync with an entity comprising another element controller.

Identify an entity or entities comprising one or more element controllers in sync with a majority of entities comprising another element controller.

Enable one or more element controllers to determine the fate or future of one or more elements made available to receive at least one response during a period.

Enable viewers and entities comprising one or more element controllers to participate in one or more element response games or tests ancillary to an element response period or primary element response test or game.

Enable an element response period provider to allow one or more period revenue providers to incorporate element response options into a period in order to allow one or more element controllers designated by the period provider to determine the fate of elements incorporated into the period by the period provider to also determine the fate of elements incorporated into the period by the revenue provider.

Enable an element response period provider to directly or indirectly generate revenues from a revenue provider for allowing the revenue provider to incorporate elements into a period in return for the revenue provider's receiving responses from game or test participants when a game or test exists and responses from entities comprising one or more element controllers when the one or more element controllers are comprised of members of one or more societies.

Enable an element response period provider to allow a period revenue provider to designate their own one or more element controllers to determine the fate or future of elements they incorporated into a period.

Enable an element response period provider and period revenue provider, when a period revenue provider exists, to capture and utilize data from ancillary game and/or test participants when one or more ancillary games and/or tests exits and data from the one or more games and/or tests is accessible.

A response game system receives input from a plurality of participants by way of the Internet, wireless device, Interactive Television, Telephone, or by way of other existing or future means of providing responses.

The system captures responses, determines correct responses based on a response point controller, assigns point values to players for providing correct responses, and identifies players receiving a highest point total based on one or more periods. Generally a number of highest number of response game players within a segment of response game players is designated by a response game producer and sponsor as a response point controller.

Players receive a point value for providing a response to an element that is at least similar to a response point controller's response.

Players receiving a highest point total, generally based on a plurality of response sessions, are identified as most in-sync with the response point controller. Players most in-sync with the response point controller (e.g. a game producer's and sponsor's target consumer demographic) qualify to be game players within a segment of response game players as designated by a response game producer and sponsor as a response point controller.

Players receive a point value for providing a response to an element that is at least similar to a response point controller's response.

Players receiving a highest point total, generally based on a plurality of response sessions, are identified as most in-sync with the response point controller. Players most in-sync with the response point controller (e.g. a game producer's and sponsor's target consumer demographic) qualify to be selected to receive an opportunity based on their proven ability to respond in-sync with targeted consumers.

A novel feature of a response game is to judge a judge, whereas a player is a judge and a response point controller (e.g. Trump, a majority of viewers, a majority of targeted viewers, etc.) responses are correct responses. This method identifies a player's ability to judge based on receiving points for responding in-sync with the response point controller.

Introducing a Patent Pending Interactive Media Promotion, Production & Product Evolution Attention media executives who wish to shower consumers with love and gain an incredible competitive advantage.

Imagine . . . 1. Receiving unprecedented measurable/scalable ROI! 2. Capturing emotionally relevant user specific data volunteered by a massive customer base! 3. Generating a positive cash flow while promoting and producing versus risking capital on promotions and productions! 4. Adding value to each product sold! Imagine no more!

Introducing patent pending "Systems and Methods for Element Response Periods, Games and Tests" enabling you to do these things and more by providing consumers with innovative, compelling and user friendly printed and electronic tools and methods to interact with and/or control aspects of your promotions, productions and products. The systems may be implemented immediately and with ease by utilizing existing infrastructures and distribution methods.

MEDIA PROMOTION Game Systems and Methods:
- Compel current and future consumers to become promotion players by offering novel prize opportunities.
- Capture innovative and quantifiable player relationship and promotion data.
- Provide domestic and international consumers with custom tailored promotions.
- Generate revenues during the promotion process that far EXCEED promotion costs.
- Compliment or replace current less effective and costly non-participation based promotion methods.
- Enable immediate and low cost implementation by utilizing existing infrastructures.
- Provide worldwide interactive media promotion BARRIER TO ENTRY.
- Cause competitor unrest.

MEDIA PRODUCTION Game Systems and Methods:
- Drive promotion players to become production players by offering novel prize and award opportunities.
- Compel current and future consumers to become production players by offering uniquely original prize opportunities.
- Capture highly qualified and measurable 1 to 1 player relationship and production data.
- Provide domestic and international consumers with custom tailored products.
- Generate revenues during the production process that far EXCEED production costs.
- Compliment or replace current less effective and costly non-participation based production methods.

Enable low cost implementation by utilizing existing infrastructures.

Provide worldwide interactive media production BARRIER TO ENTRY.

Cause competitor despair.

MEDIA PRODUCT Game Systems and Methods:

Drive production players to become product players by offering novel prize, award and fame opportunities.

Compel current and future consumers to become product players by offering uniquely original prize opportunities.

Capture innovative and quantifiable player relationship and product data.

Generate ancillary revenues that MAY EXCEED product sales.

Enable low cost implementation by utilizing existing infrastructures.

Provide worldwide interactive media product BARRIER TO ENTRY.

Cause competitor destruction.

Businesses hire companies to measure product placement and advertising effectiveness whereas the invention creates highly effective product placements and advertising as well as provides proprietary return on investment measuring tools.

Businesses generally pay a fee to access consumer research data whereas the invention allows companies to not only pay a fee for more valuable consumer research data but also capture their own proprietary and tailored/desirable consumer research data.

Enables companies to measure return on investment and to pay for results based advertising.

FIGS. 1 thru 11 depict a participant's response game interaction sequence. For illustration purposes the game elements utilized for this demonstration are 6 single artist songs and 6 sponsor's corporate logo designs. Keep in mind that a game element may be anything within the universe that can be responded to or receive a response. FIG. 1 shows images representing a music artist. Each image represents a song that has been made available for evaluation on one or more evaluation platforms. The system the images are uploaded into is a type of response system. This response system is a game element ranking system. The game element ranking system enables participants (controlling players, non controlling players, controlling respondents other than players, and non controlling respondents other than players) to rank their favorite songs in the order of $1^{st}$ thru $3^{rd}$ place generally based on a previous evaluation of each song. The ranking system also enables participants to evaluate/rate each song based on a rating scale. Participants are enabled to re-evaluate each song or evaluate songs for a first time by simply clicking on a rating button associated with each image.

Figure 2:
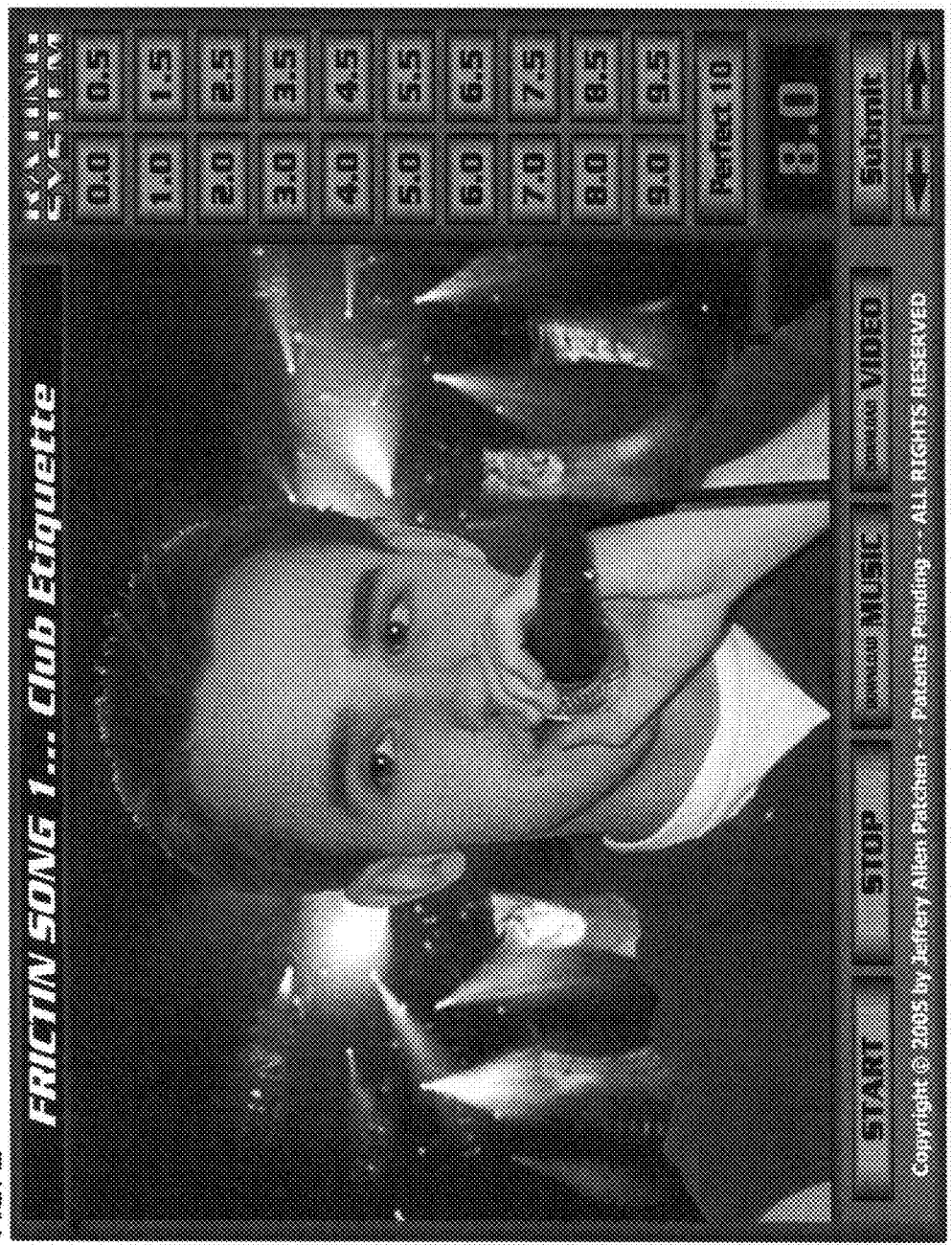
FIG. 2 shows the game producer's game element evaluation system and the results of a player providing an initial element evaluation.

By clicking on the rating button a participant is transferred to a rating system shown in FIG. 2.

The rating system now enables the participant to listen to each song presented on the ranking system. The participant clicks on the download music button to listen to the song represented by the title and image posted. The participant clicks on the 8.0 as indicated by the 8.0 highlighted in red in the space below the rating buttons and above the submit button. The participant clicks on the submit button to enter the rating into a song rating database associated with the participant.

Figure 3:
FIG. 3 shows the game producer's game element ranking system and the results of the player completing an evaluation process.

After submitting the rating the participant is transferred back to the ranking system shown in FIG. 3. FIG. 3 shows that the participant rated each of the 6 songs and is now ready to rank 3 favorite songs in the order of $1^{st}$ thru $3^{rd}$ place by clicking on a ranking button below each image representing a song. By clicking on a ranking button below an image the image is transferred to a staging area. The staging area is framed. The red framing throughout the system identifies a participant's initial and submitted images receiving a participant's one or more responses.

Figure 4:
FIG. 4 shows the game producer's game element ranking system and the results of the player completing a game element rating and ranking process.

The ranking system now enables the participant to rank their 3 favorite songs according to a rating of each song, although the participant may have elected to rank songs based on a previous evaluation process. FIG. 4 shows the participant's 3 favorite song rankings and rating transferred to the song response staging area. The participant may now re-evaluate one or more songs or provide a submission of each song rating and ranking by clicking on the submission button located below the ranking staging area. When a participant is identified as a player the participant's response submissions are transferred to a response point assignment and calculation system. When the participant is a respondent other than a player the participant is transferred to a subsequent game element response system whereas one or more game element categories exist. The term respondent generally identifies the participant as a controlling participant or non controlling participant. A game producer and sponsor may designate one or more respondents other than players as a response point controller. The game producer may also designate one or more players as a response point controller whereas the designated players may be referred to as controlling players. All players, controlling and non controlling, may receive a point value for providing a response to an element that is at least similar to a response point controller's response to the element. When a producer and sponsor designate a highest number of players as a response point controller, the response point controller is unidentifiable until sometime after players submit responses. After responses are submitted the highest number of players providing a response to an element become identifiable as controlling players. Players that are not within the highest number of players become identifiable as non controlling players. Controlling players based on a single response to an element receive a point value based on their ability to respond in-sync with the response point controller.

Now, one may think that if a highest number of players is a response point controller and the highest number of players providing a response to an element receives a point value, that the game results in a highest number of players receiving a highest point total. This may be true if the game only required one response to two elements. When the game requires a plurality of responses to a plurality of elements players making up a highest number of players evolves with each response. This producer and sponsor for this game designated a highest number of Americans as a response point controller depicted by the American flag posted over the gold frames within the two game element categories shown in FIG. 5.

Forget evaluation as an option previously stated. Evaluation is now a requirement This game requires players to rate 6 game elements within 2 categories and rank 3 of the 6 elements within each category. This way the game requires a player to provide 18 responses (12 ratings and 6 rankings) for this period. The game may also have a number of periods or response sessions each with 18 required responses. When a game consists of 10 periods or response sessions the number of player required responses increases to 180. Identifiable players comprising a highest number of players comprising a response point controller may be a majority of players when players are required to provide one response to one of two elements, but when 180 responses are required players that receive a highest point total are minimal.

A response game producer's and/or sponsor's objective may be to enable a massive number of players to receive a highest response point total by requiring fewer responses to fewer element for fewer periods.

Now back to the game . . .

Figure 5:
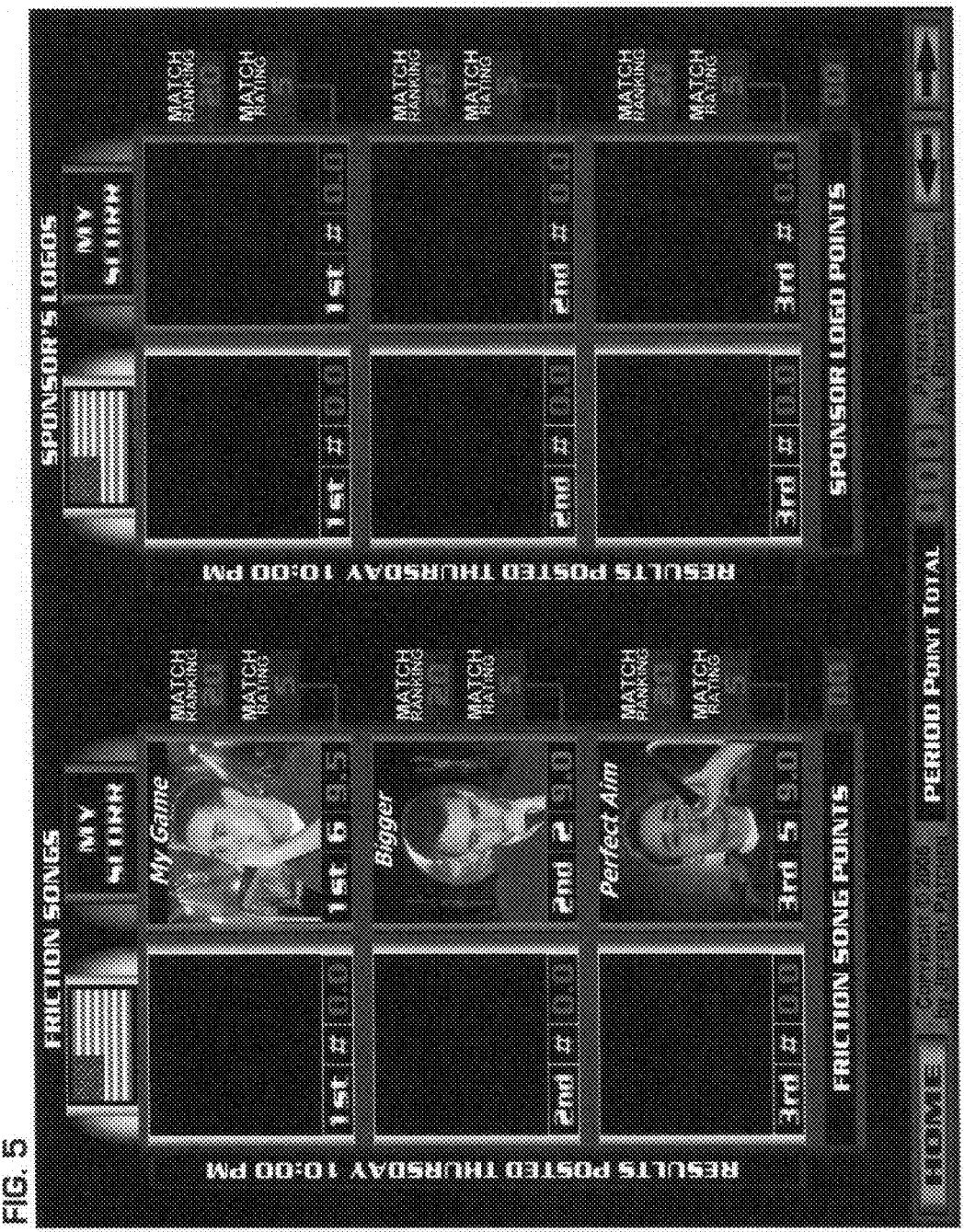
FIG. 5 shows the player's rated and ranked game elements transferred to a response point assignment and calculation system resulting form the player submitted rated and ranked producer's game elements.

After submitting ranked songs the participant is transferred to a response point assignment and calculation system. FIG. 5 shows the participant's songs transferred into the system. The response point assignment and calculation system shows a participant's submitted responses framed in red and one or two response point controller's gold frames. A game phrase may be "Players Responses are Red and The Controller's are Golden".

The response point assignment and calculation system shown in FIG. 5 posts a player's responses to elements within two game categories and a response point controller's responses within the two categories. This system posts a player's and controller's ratings and ranking to 3 elements within each of two categories.

Figure 6:
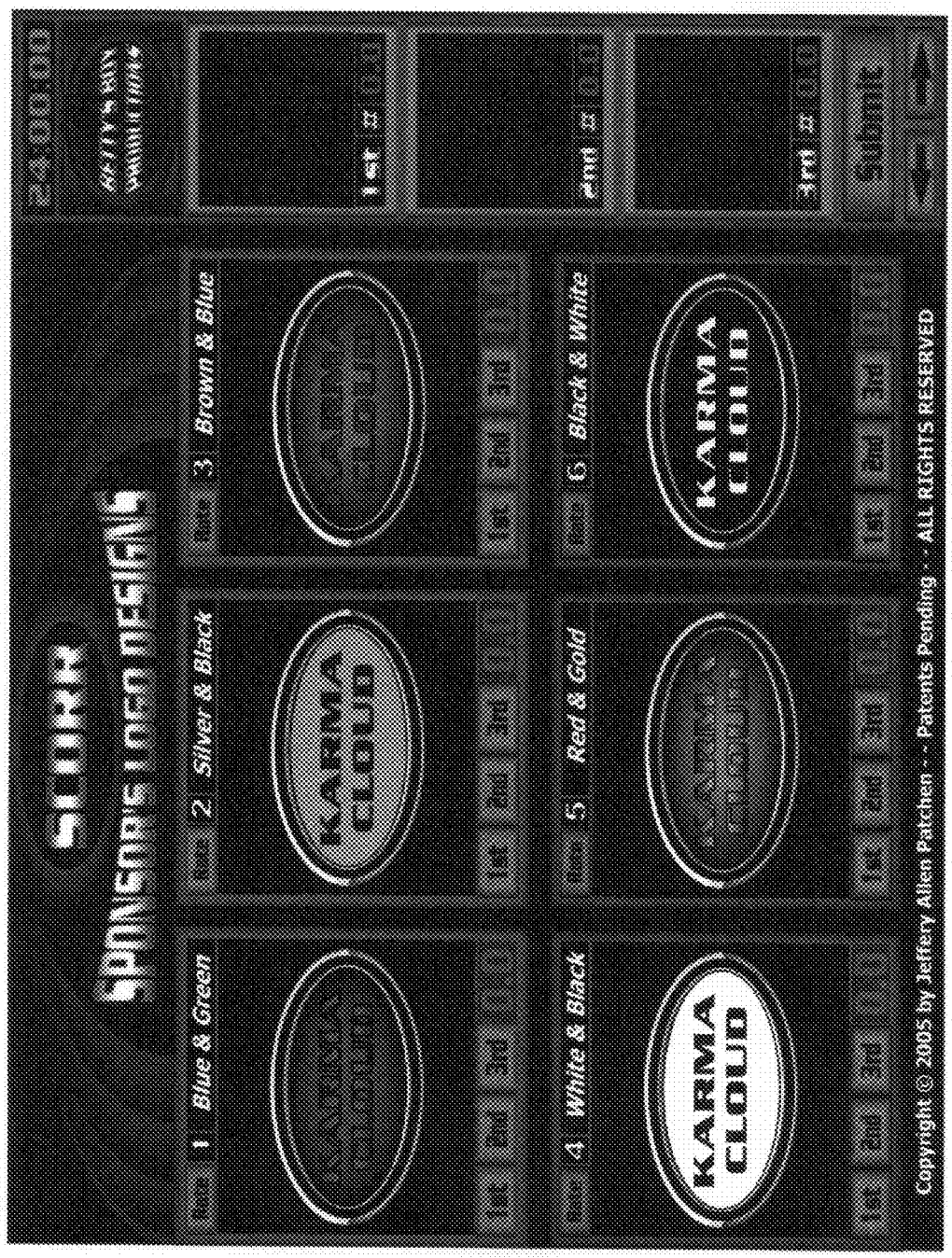
FIG. 6 shows a game sponsor's game element ranking system.
Figure 7:
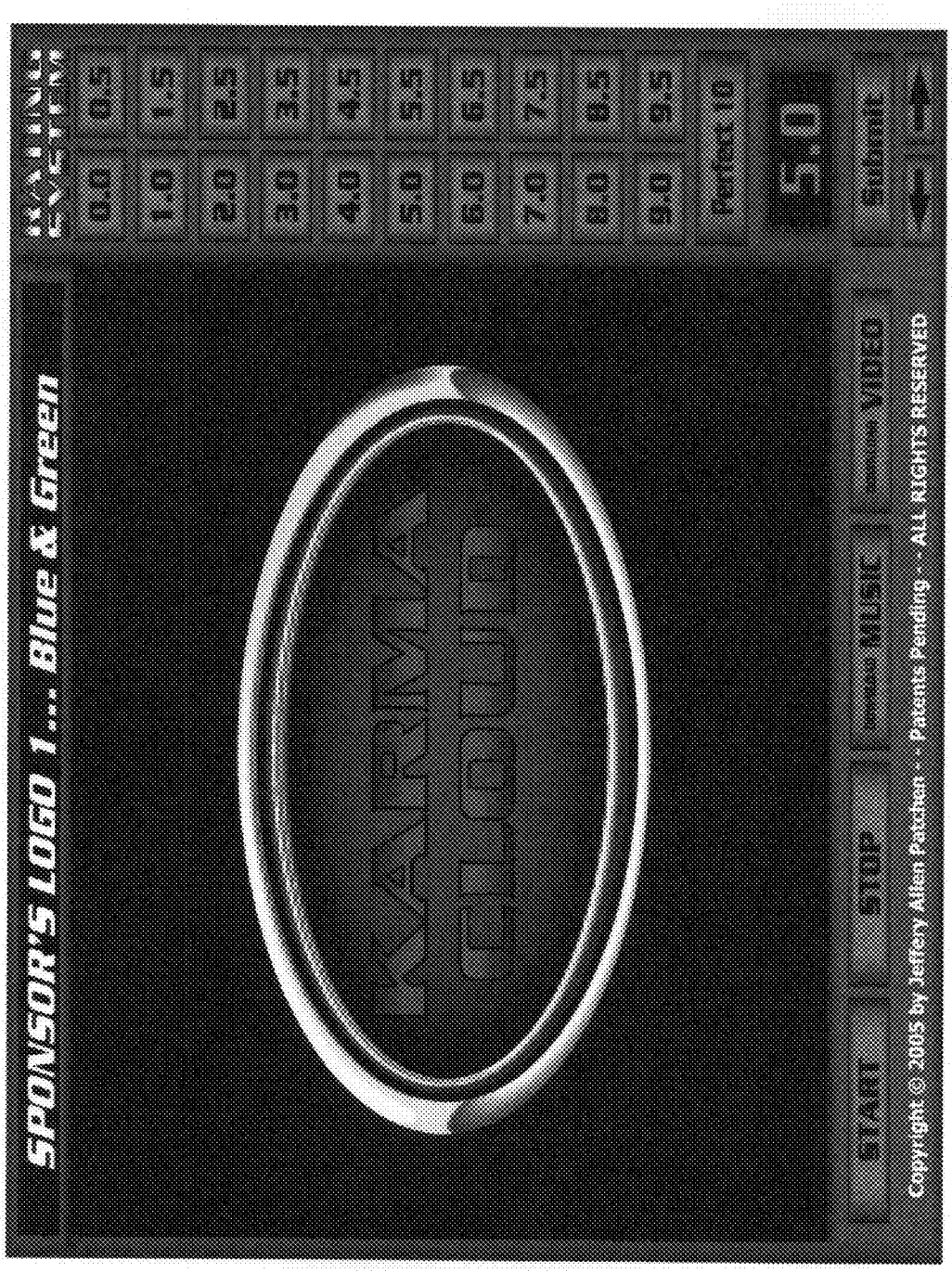
FIG. 7 shows the game sponsor's game element evaluation system and the results of an element evaluation.
Figure 8:
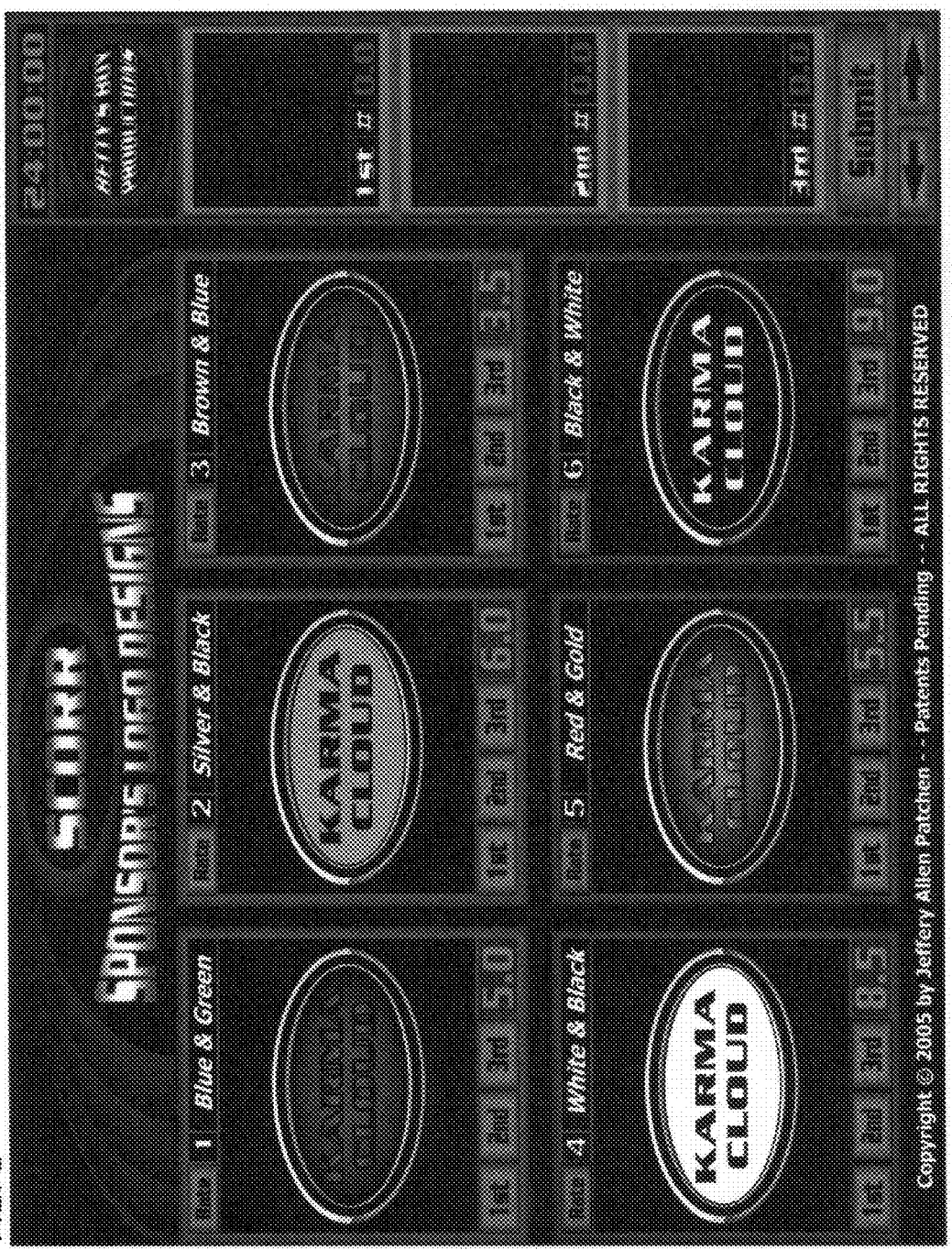
FIG. 8 shows the game sponsor's game element ranking system and the results of the game sponsor's game element evaluation process.

The player now clicks on the forward button located at the bottom right of FIG. 5 and is transferred to a sponsor's game element response system shown in FIG. 6. For this game the sponsor wishes to allow America to vote on a corporate logo the sponsor will utilize based on a highest number of votes or a response point controller. The player or participant clicks on the rate button associated with logo number 1 and is transferred to the sponsor's game element evaluation system shown in FIG. 7. The participant rates the sponsor's 6 game elements and is transferred back to the ranking system shown in FIG. 8 wherein a rating of each of the sponsor's game elements is now posted.

Figure 9:
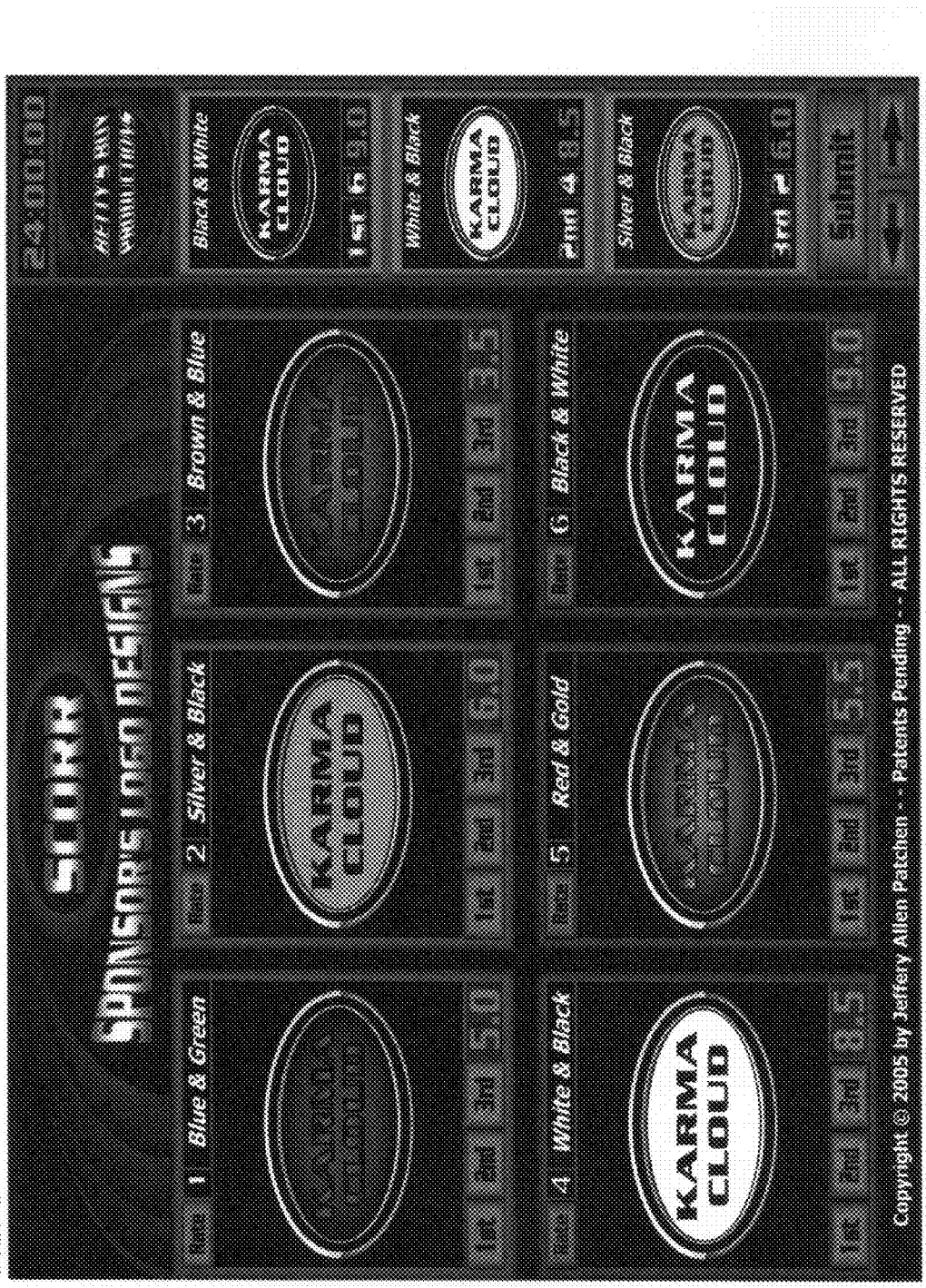
FIG. 9 shows the game sponsor's game element ranking system and the results of the game producer's game element rating and ranking process.
Figure 10:
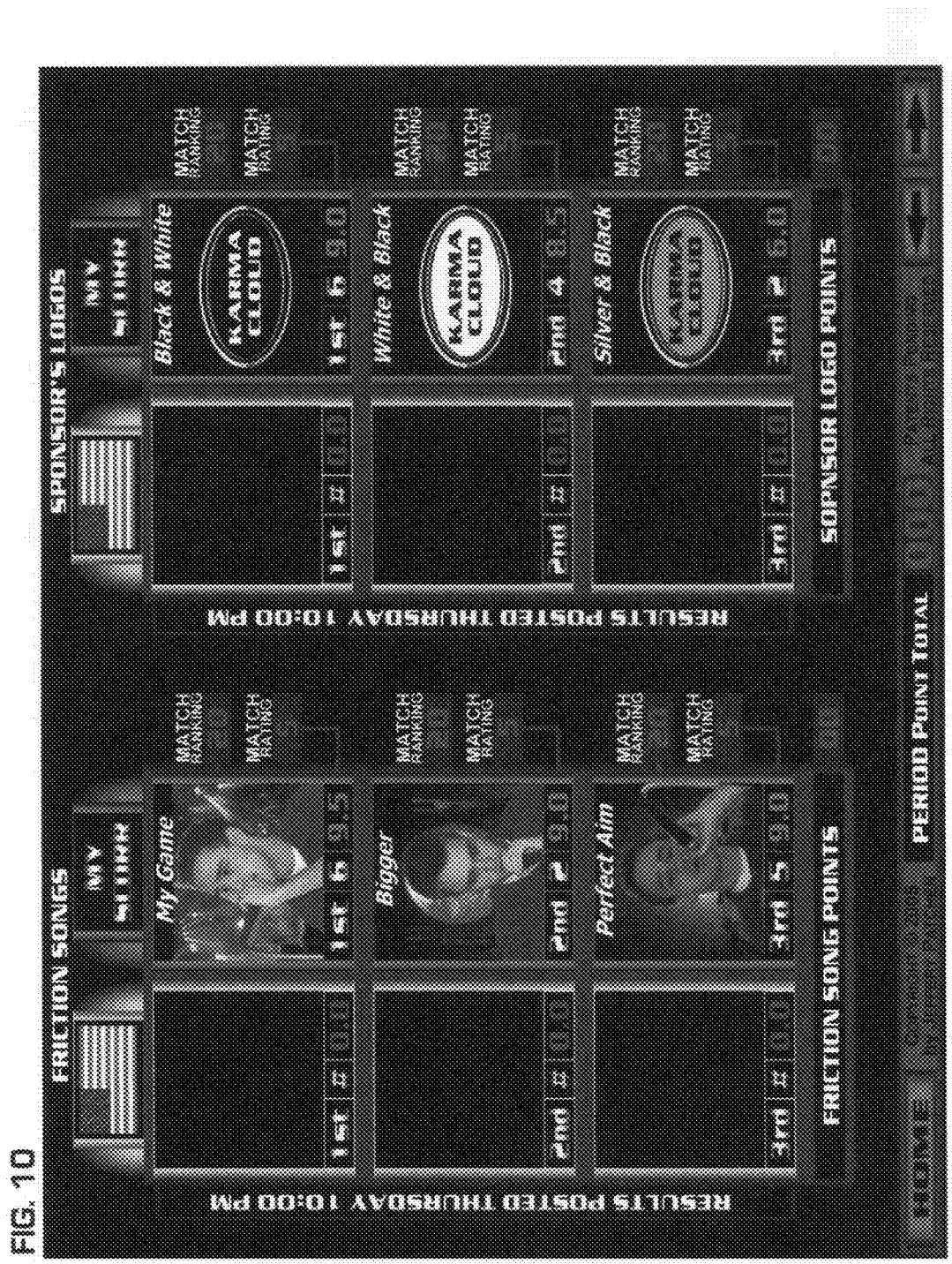
FIG. 10 shows the game sponsor's rated and ranked game elements transferred to a response point assignment and calculation system resulting from the sponsor's game element rating and ranking submission process.

The player ranks 3 favorite sponsor's game elements show in FIG. 9 wherein the player's rating and ranking of their 3 favorite sponsor's game element is staged. The player submits rankings by clicking on the submit button. The player is again transferred to the response point assignment and calculation system shown in FIG. 10 wherein the players rated and ranked producer's game elements and rated and ranked sponsor's game elements are posted.

Players receive 20 points for matching a response point controller's ranking and 5 points for matching a response point controller's rating.

America's favorite producer's game elements and sponsor's game elements are posted sometime after a response submission deadline.

Figure 11:
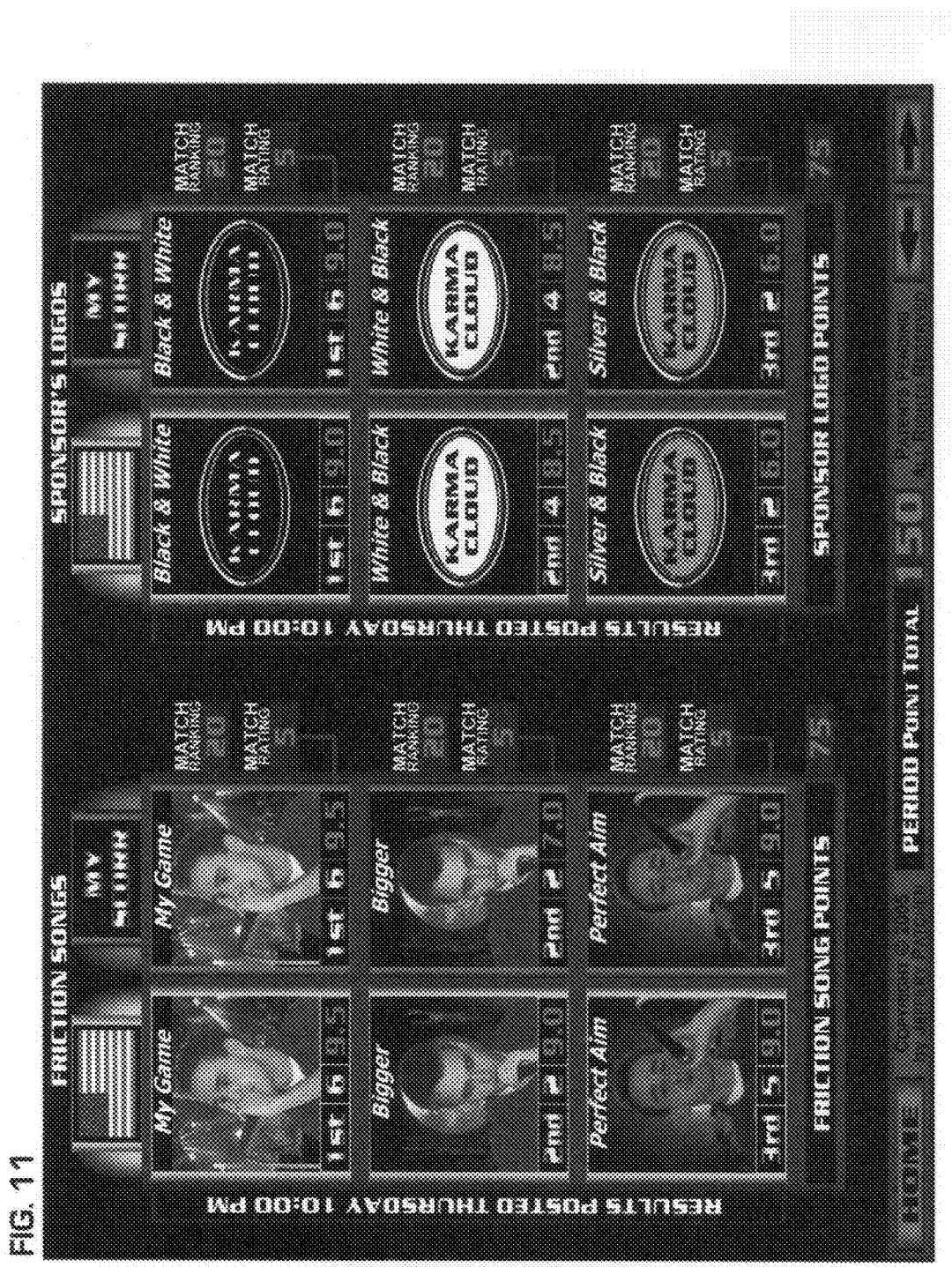
FIG. 11 shows the response point assignment and calculation system assigning, calculating and totaling response points resulting from a posting of a response point controller's rated and ranked producer's and sponsor's game elements.

The response point controller's rated and ranked producer's game elements and rated and ranked sponsor's game elements are shown posted in FIG. 11. When the response point controller's responses are posted within the response point assignment and calculation system a player's response points are assigned, calculated, and totaled. Players receiving a highest point total for a period are identified as in-sync with the response point controller that period whereas only one response point controller is utilized for the period.

Figure 12:
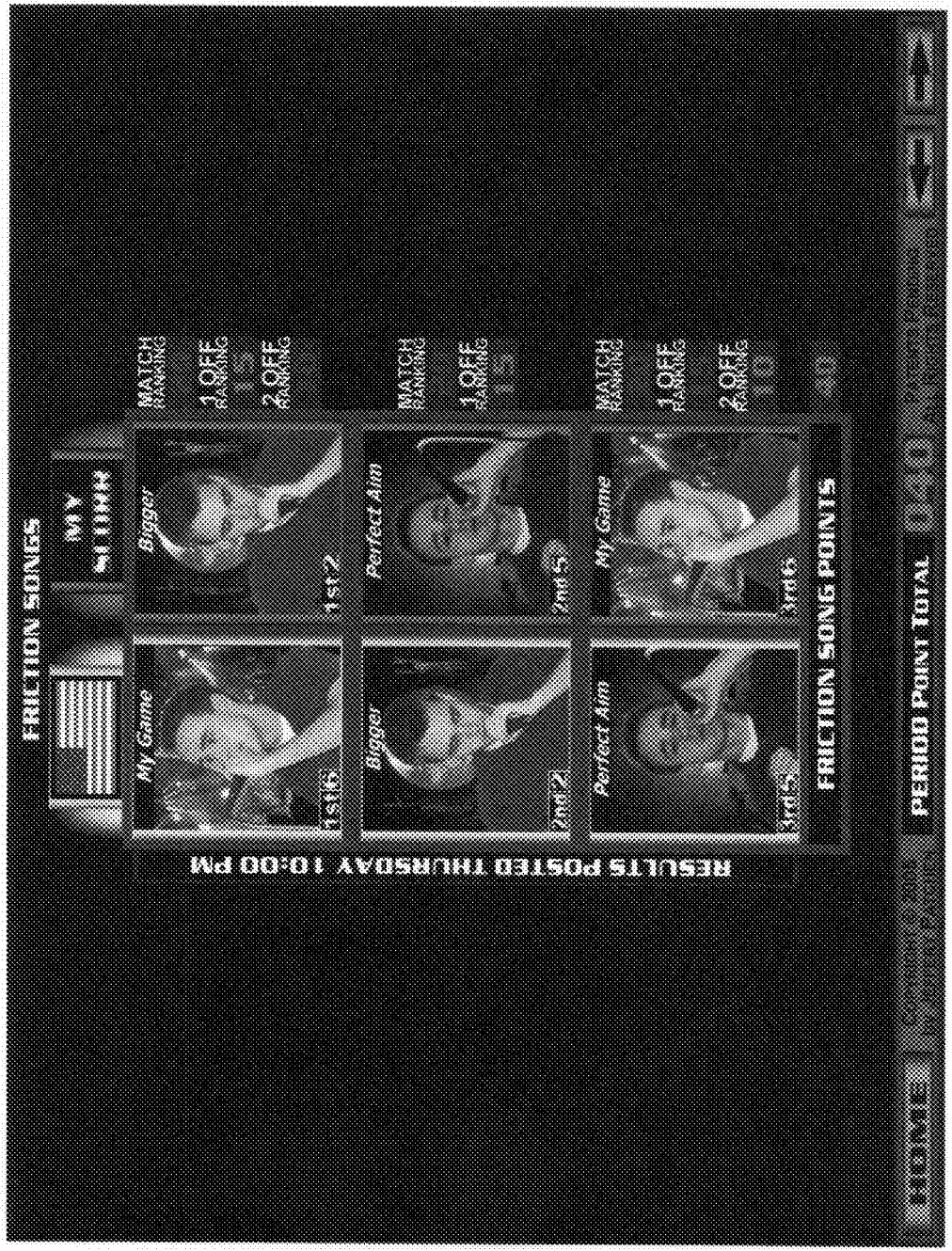
FIG. 12 shows a response point assignment and calculation system assigning, calculating and totaling response points based on a participant's submitting responses within a proximity range from a response point controller's responses.

FIG. 12 shows a response point assignment and calculation system wherein a player receives point values based on responding to a same element a response point controller responds to but does not match a response with the response point controller. This type of system assigns a highest point value for matching a response point controller's response, which the player depicted failed to do. This system also assigns points of a lesser value based on proximity to a response point controller's response. The player depicted received 10 points for providing a response that was two off from the response point response and 15 points twice for providing two responses that are one off each from the response point controller's two remaining responses.

Figure 13A:
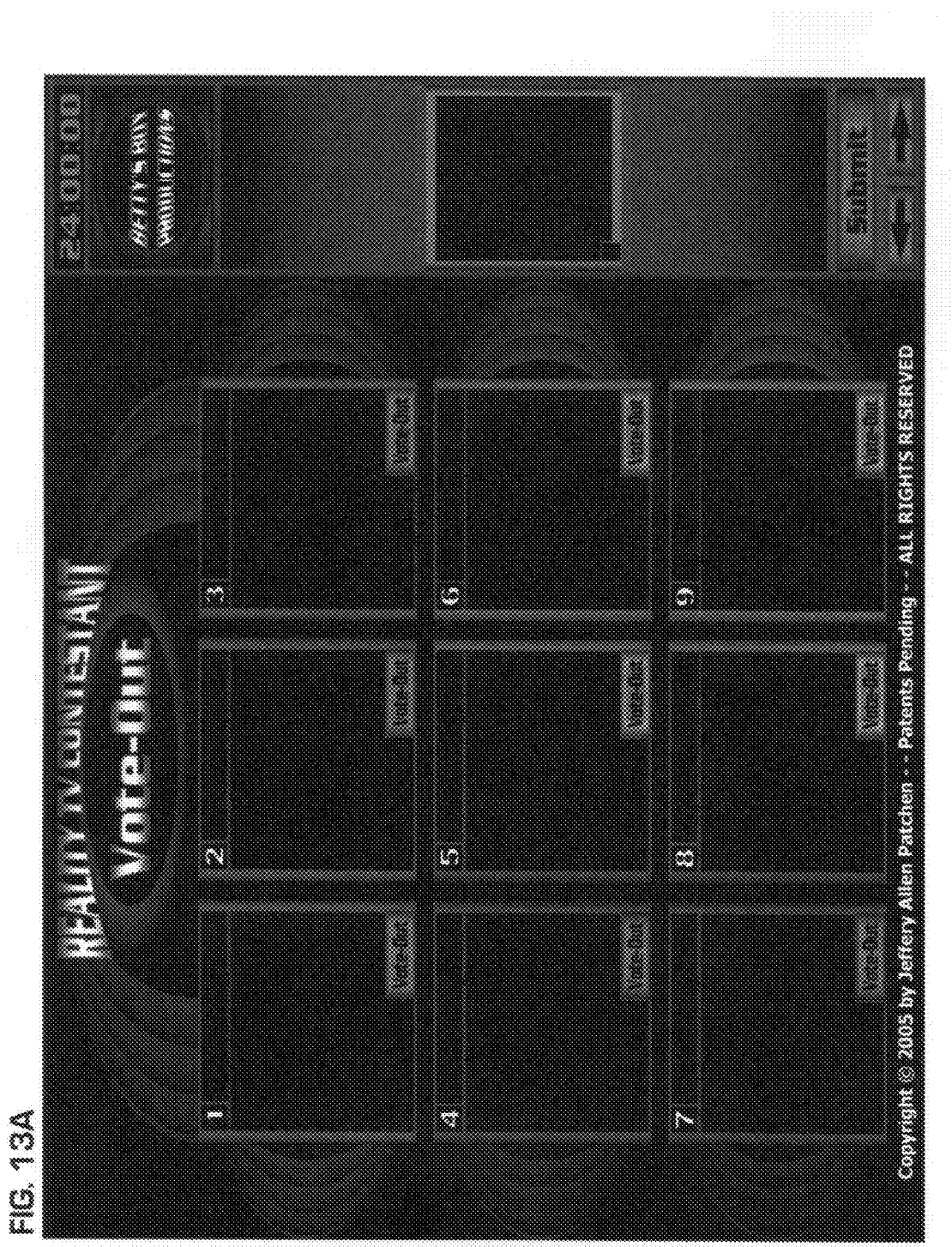
FIG. 13A shows a game element vote-out system enabling participants to provide a vote-out response.
Figure 13B:
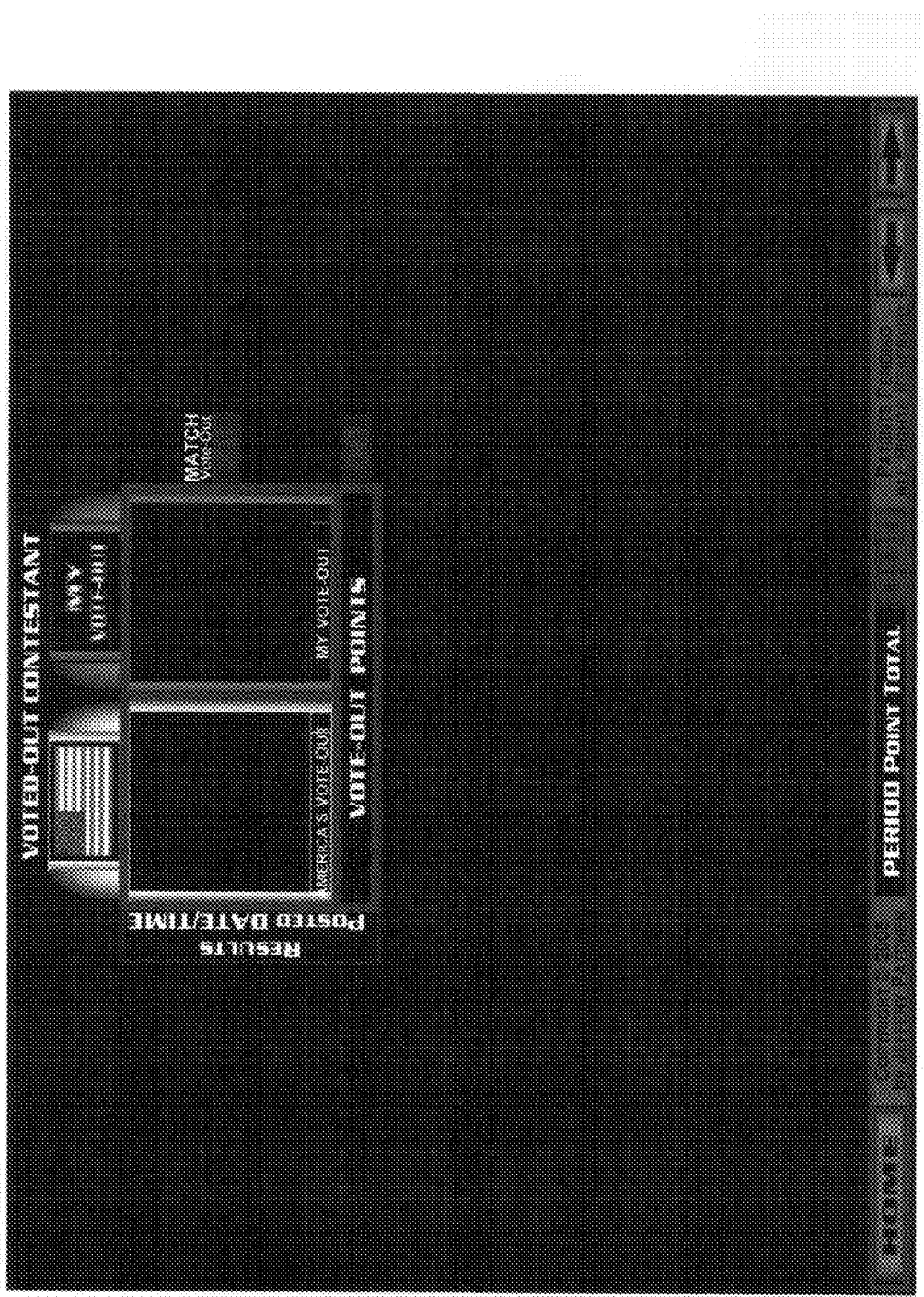
FIG. 13B show a game element response point assignment and calculation system associated with the game element vote-out system enabling participants to receive a response point value.

FIG. 13A shows a game element vote-out system. This system enables a participant to vote-out elements, such as reality TV contestants, after viewing or evaluating elements on one or more media. After a participant provides a vote-out response to a least favorite or least qualified element and submits the response the element is transferred to a response point assignment and calculation system shown in FIG. 13B.

Figure 14A:
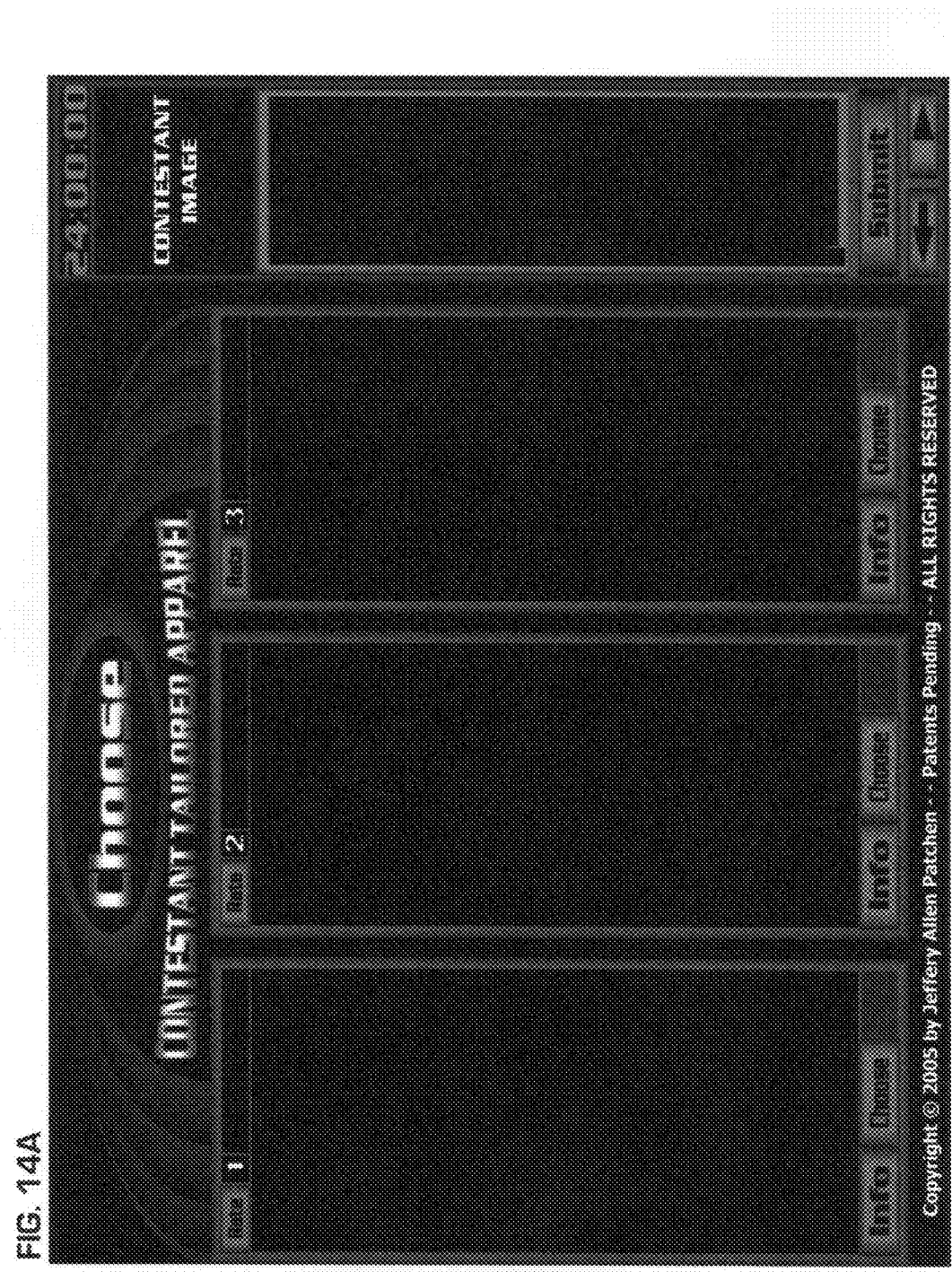
FIG. 14A shows a game element choose system enabling participants to provide a choose response to an element in relation to another element.

FIG. 14A shows a game element choose system. This choose system is designed to allow a pre-selected element or contestant to be posted in the upper right hand side of the system. This system may be utilized to enable participants to choose a tailored apparel set or item for a posted contestant to wear during a future event. This system may also be utilized to enable participants to determine activities, such as songs, for a contestant to perform during a future event. The element posted in the upper right and the elements made available to be selected are virtually unlimited as with all response systems.

Figure 14B:
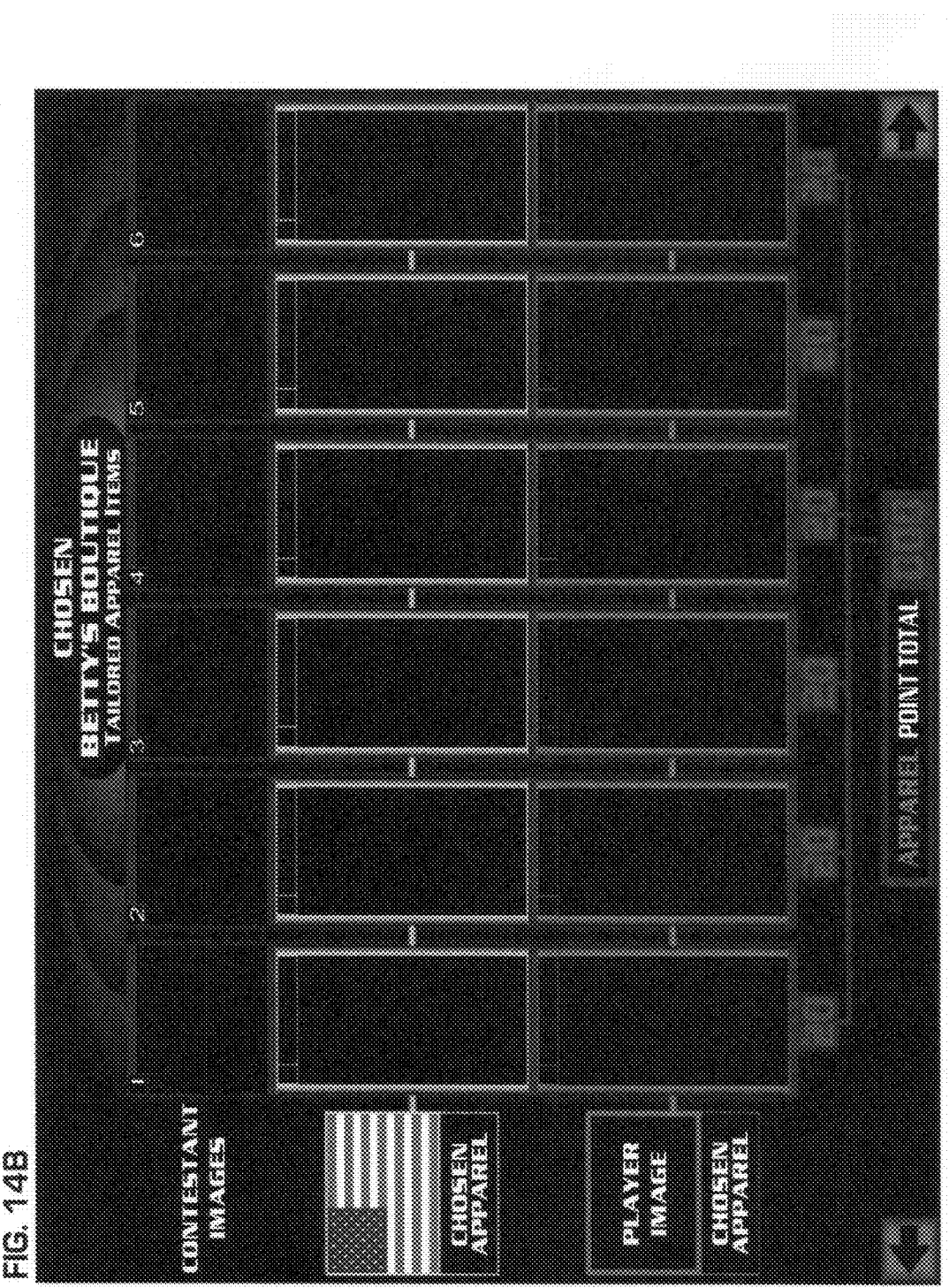
FIG. 14B shows a game element response point assignment and calculation system associated with the game element choose system allowing players to receive response point values.

FIG. 14B shows a response point assignment and calculation system associated with the choose system. This system posts images of a plurality of pre-selected elements, such as contestants. The player's chosen elements are to be posted in red and elements receiving a response point controller's response are to be posted in gold.

Figure 15A:
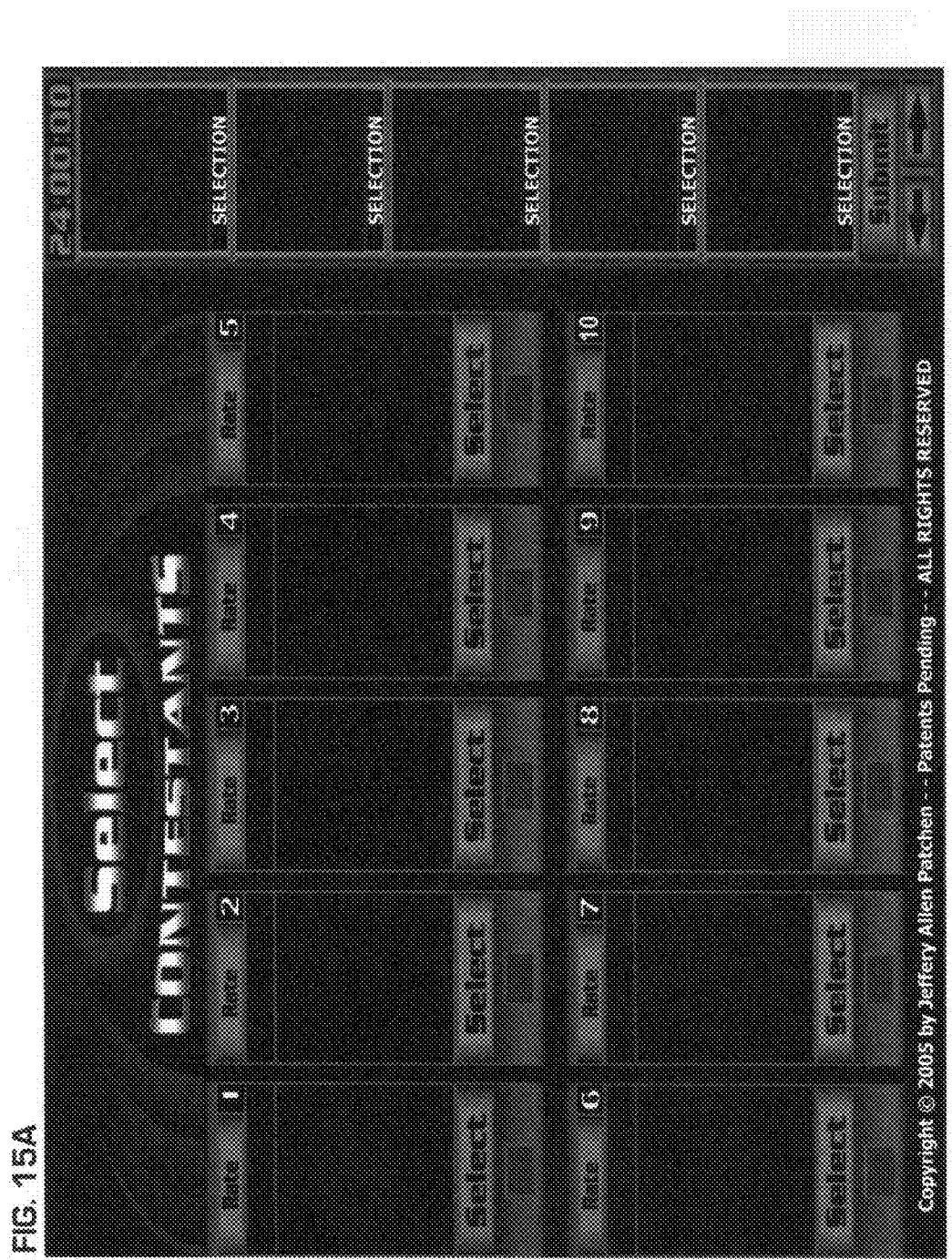
FIG. 15A shows a game element select system enabling participants to provide a select response to a plurality of elements.

FIG. 15A shows a game element selection system. The selection system enables a participant to select a number of elements from a plurality of elements posted. This system may be utilized to enable participants to select contestants that qualify to compete during a future event. This system enables participants to first rate or evaluate element options prior to making selections.

Figure 15B:
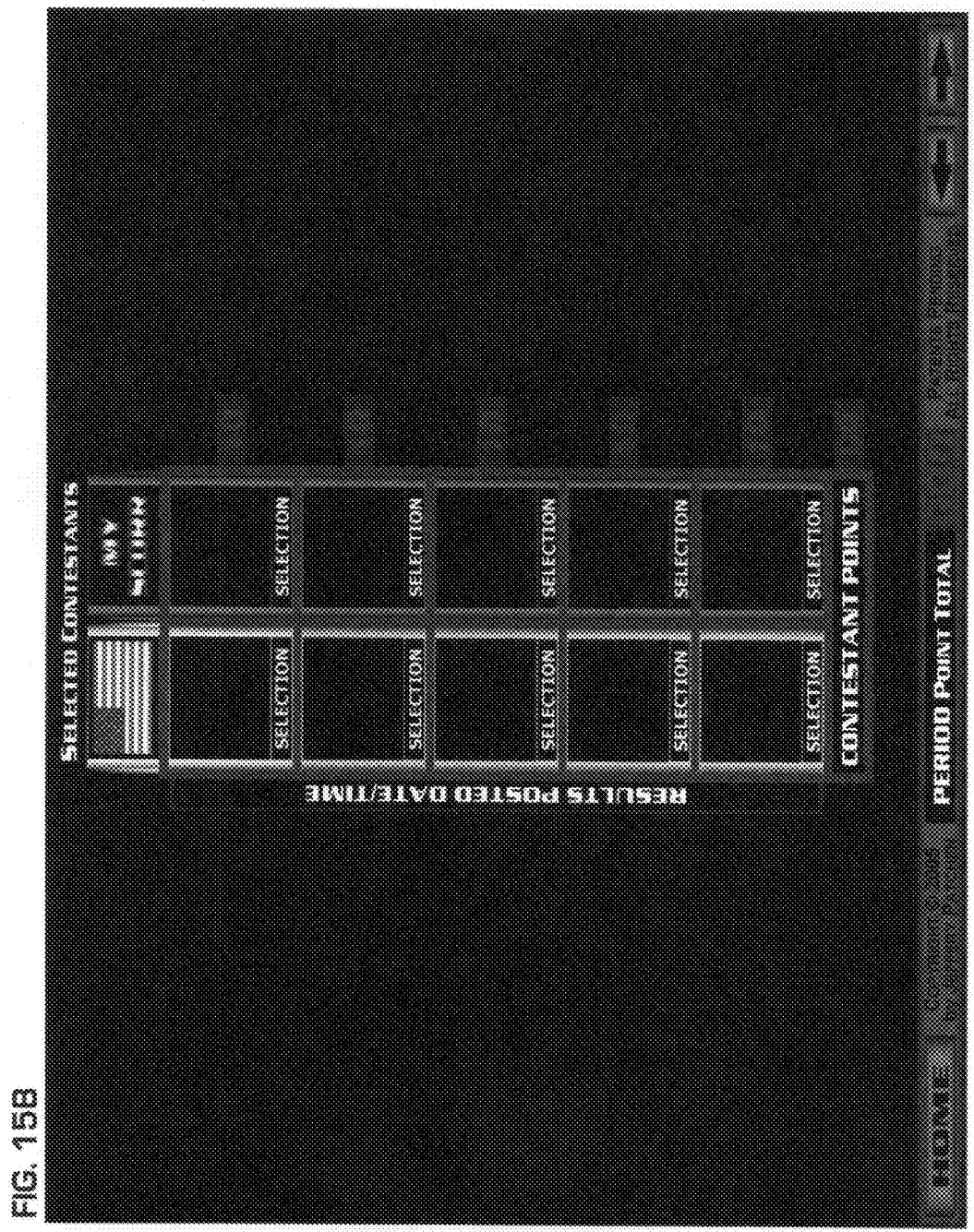
FIG. 15B shows a game element response point assignment and calculation system associated with the game element select system allowing players to receive response point values.

FIG. 15B shows a response point assignment and calculation system associated with the game element selection system. This response point assignment and calculation system assigns a player a point value for selecting an element a response point controller selected. A player may receive a same point value for a first selection that matches a response point controller's last selection. The only prerequisite is to select a same element.

Figure 16:
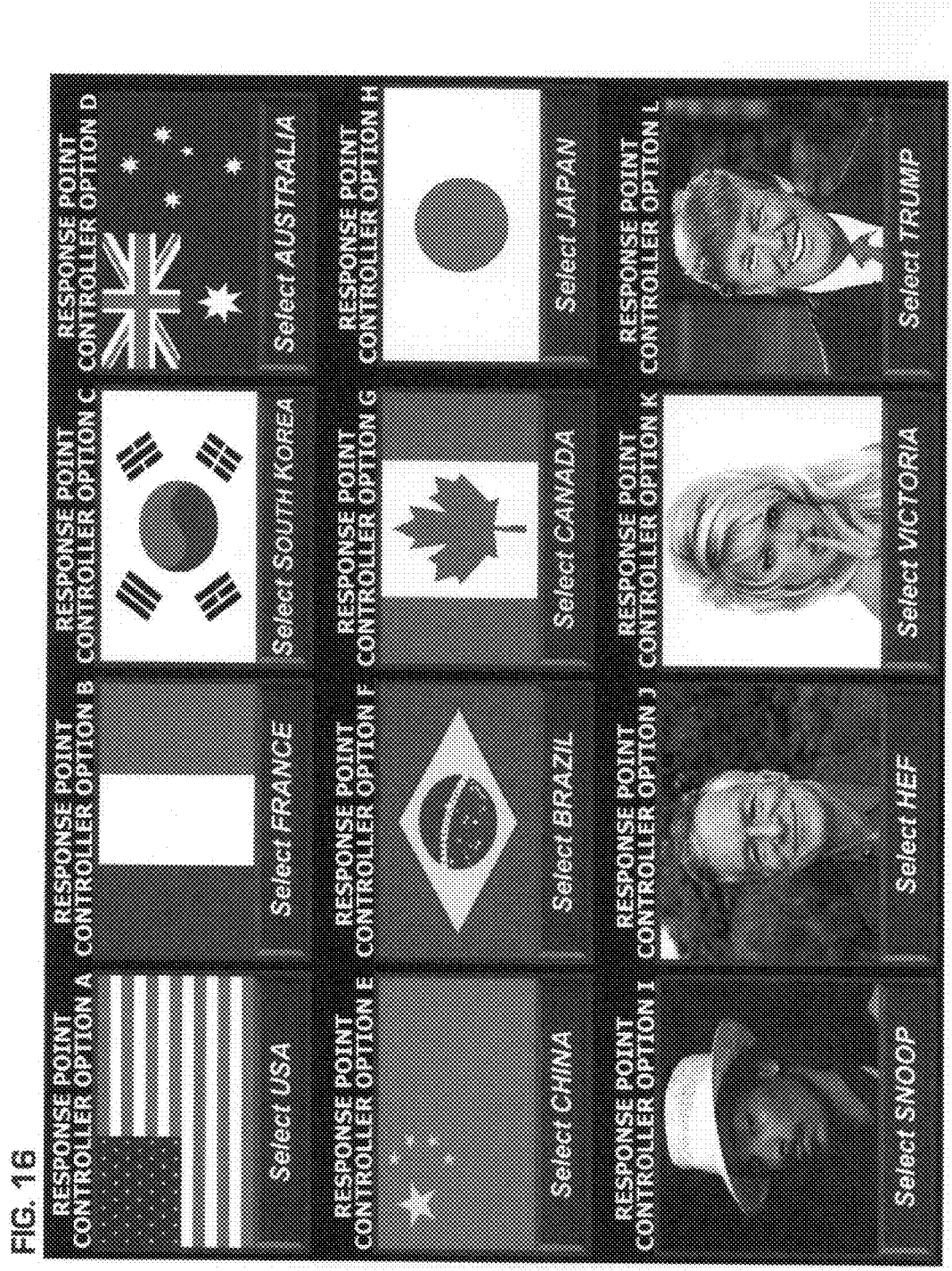
FIG. 16 shows a response game player's response point controller selection system.

FIG. 16 shows a response point controller selection system. This system enables a player to select a response point controller of their choice. The selected response point controller's image, once selected, is posted over the gold frames within an associated response point assignment and calculation system.

Figure 17:
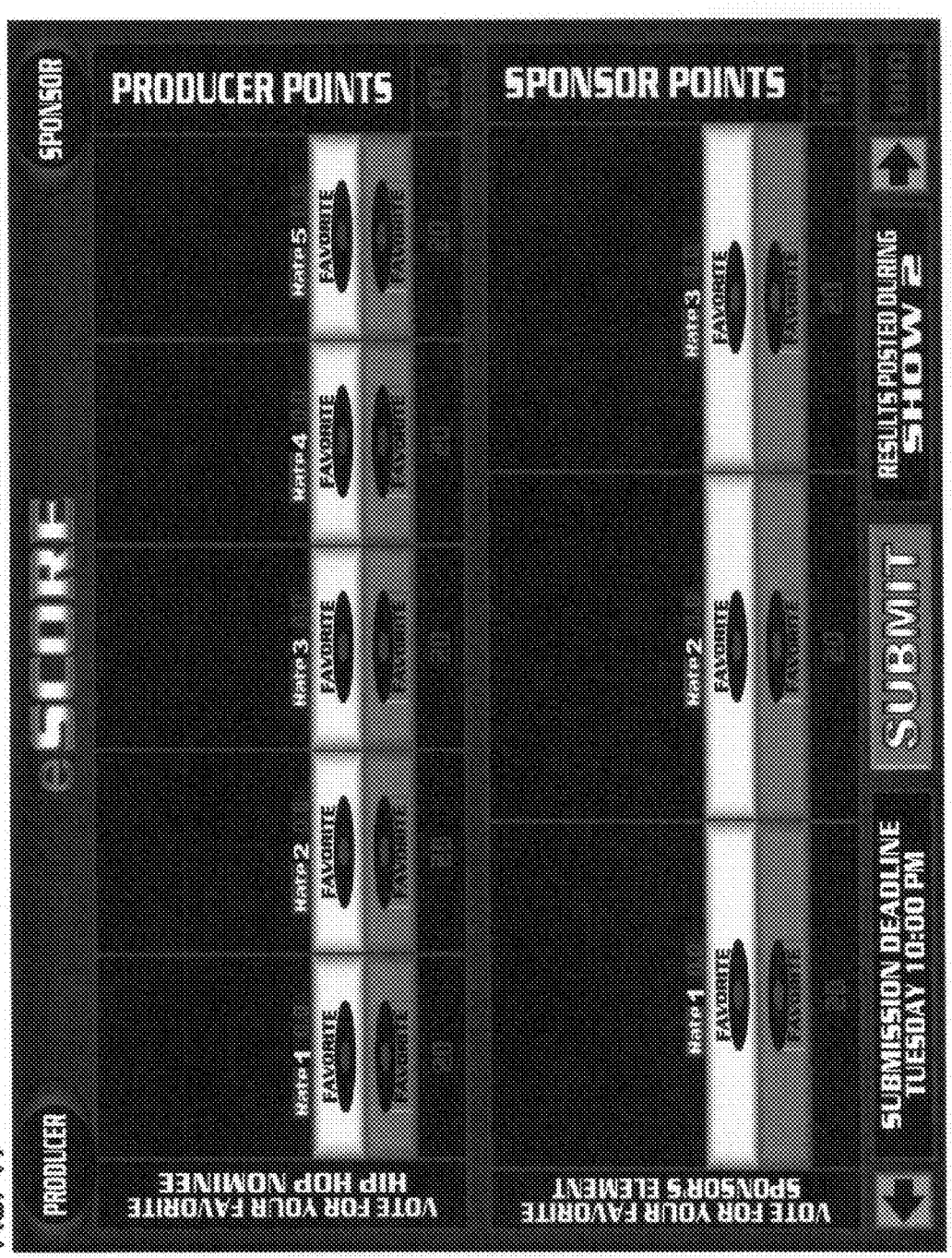
FIG. 17 shows a response game producer's and sponsor's over and under game element voting system with an integrated producer's and sponsor's response point assignment and calculation system.
Figure 18:
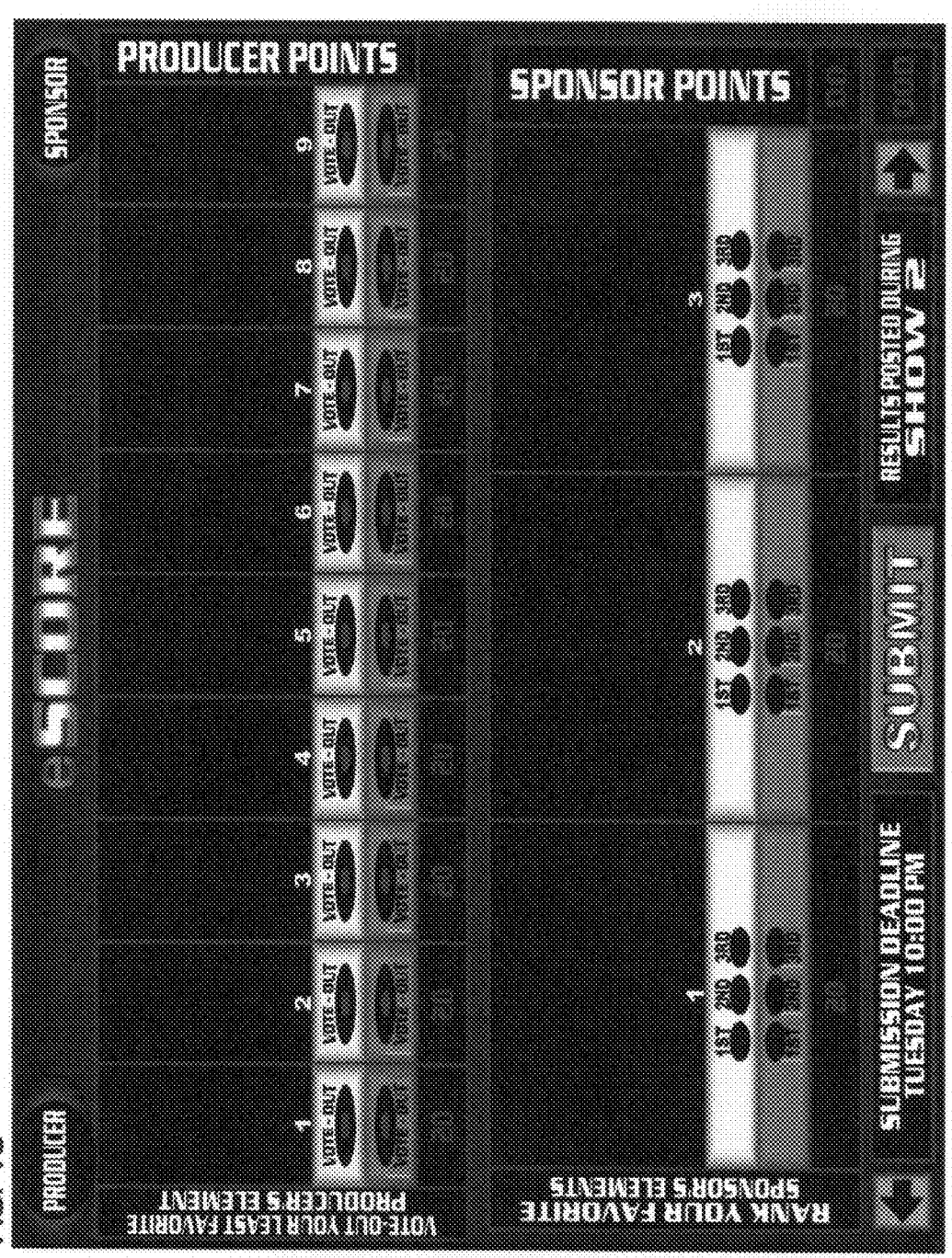
FIG. 18 shows an over and under response game system enabling a participant to vote-out a least favorite producer's element (think "Survivor" or "The Bachelor") and rank favorite sponsor's game elements.
Figure 19:
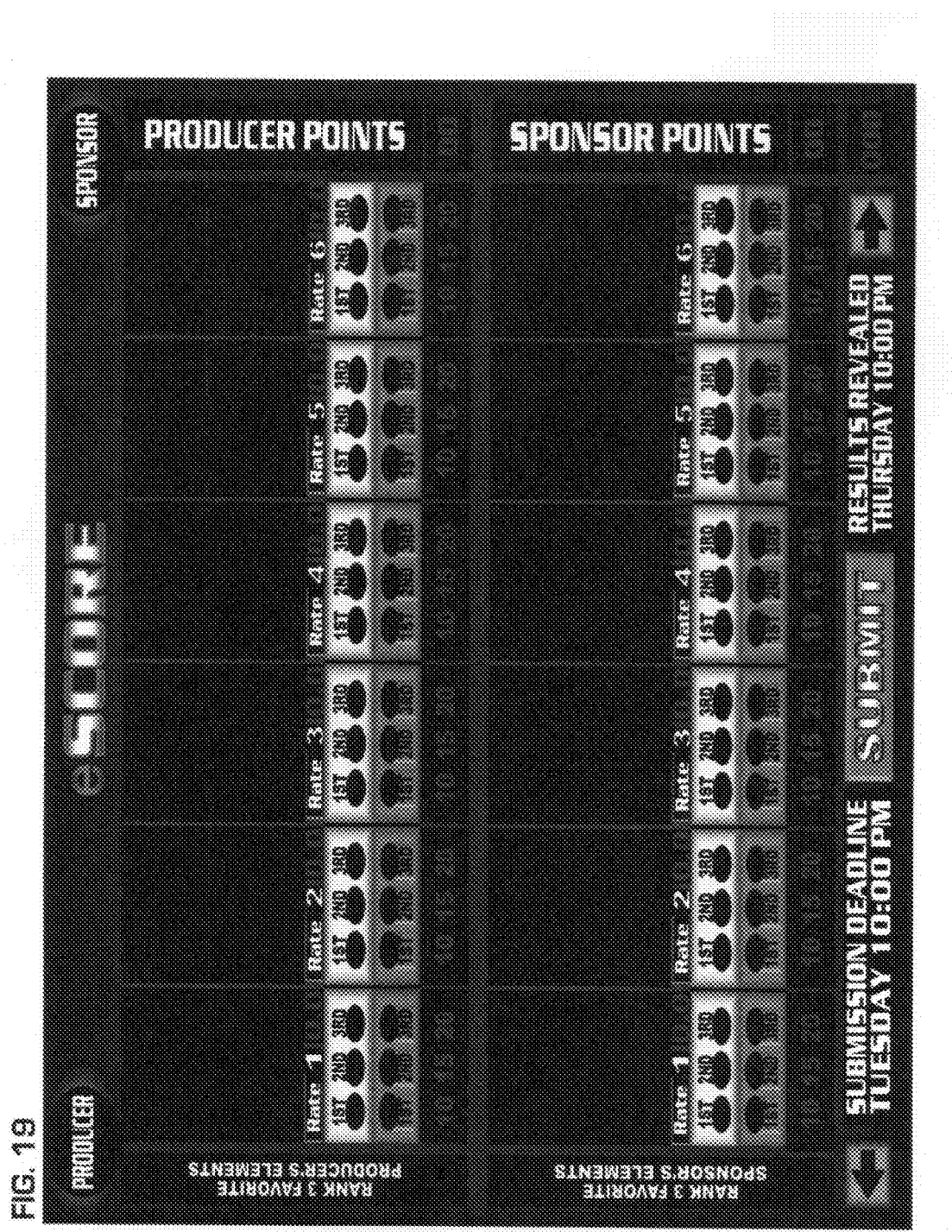
FIG. 19 shows an over and under game element ranking system utilizing two proximity response point assignment systems.

The following over and under response game systems shown in FIGS. 17, 18, and 19 are similar to the previous response game systems wherein player's responses are surrounded by red and the response point controller's responses are surrounded by gold. The over and under system may or may not employ an element evaluation/rating system. The basic difference between the over and under response game system and the previously shown systems is that the over and under system shows the producer's response system and response point and calculation system posted over a sponsor's response system and response point assignment and calculation system.

The over and under system shown in FIG. 17 enables a player to vote for a favorite producer's game element and a favorite sponsor's game element. This system also utilizes a game element evaluation system enabling a player to first evaluate one or more elements prior to voting for a favorite element. The evaluation/rating system is integrated in various response game systems enabling a participant to study producer's and/or sponsor's game elements for a first time or re-evaluate game elements that the participant studied or evaluated previously on one or more media such as Television, Internet, wireless device, CD, DVD, or any other type of available game element study or evaluation platform or media. The over and under system also requires a participant to submit a required number of responses to a required number of elements prior to a response submission deadline. Sometime after a player submits responses a response point controller's responses are posted. The response point controller's responses may be posted immediately after a player clicks the submission button posted on the middle bottom of the system or at a later time or date.

At the same time or sometime after a response point controller's responses are posted the system assigns a player a response point value based on providing a response that matches a response point controller's response.

The over and under response game system shown in FIG. 18 combines a producer's game element vote-out and vote-out response point assignment and calculation system over a sponsor's game element ranking and ranking response point assignment and calculation system. This system adds a player's assigned vote-out response points and rankings response points in order for the player to receive a combined vote-out and ranking response point total. The over and under systems show a player's combined producer point assignment and sponsor point assignment in the lower right side of the system.

All response game systems may be replicated with printed material. And all printed response game systems may be replicated electronically. Printed response game systems may be inserted into publications, game kits, mailers, etc. The printed response game systems may also be sized to fit into product packing such as CD jewel cases, DVD cases, etc. Printed response game systems guide players through a process of manually inputting responses to game elements, assigning response points for providing responses that are at least similar to a response point controller's responses, and calculate a point total.

Figure 20A:
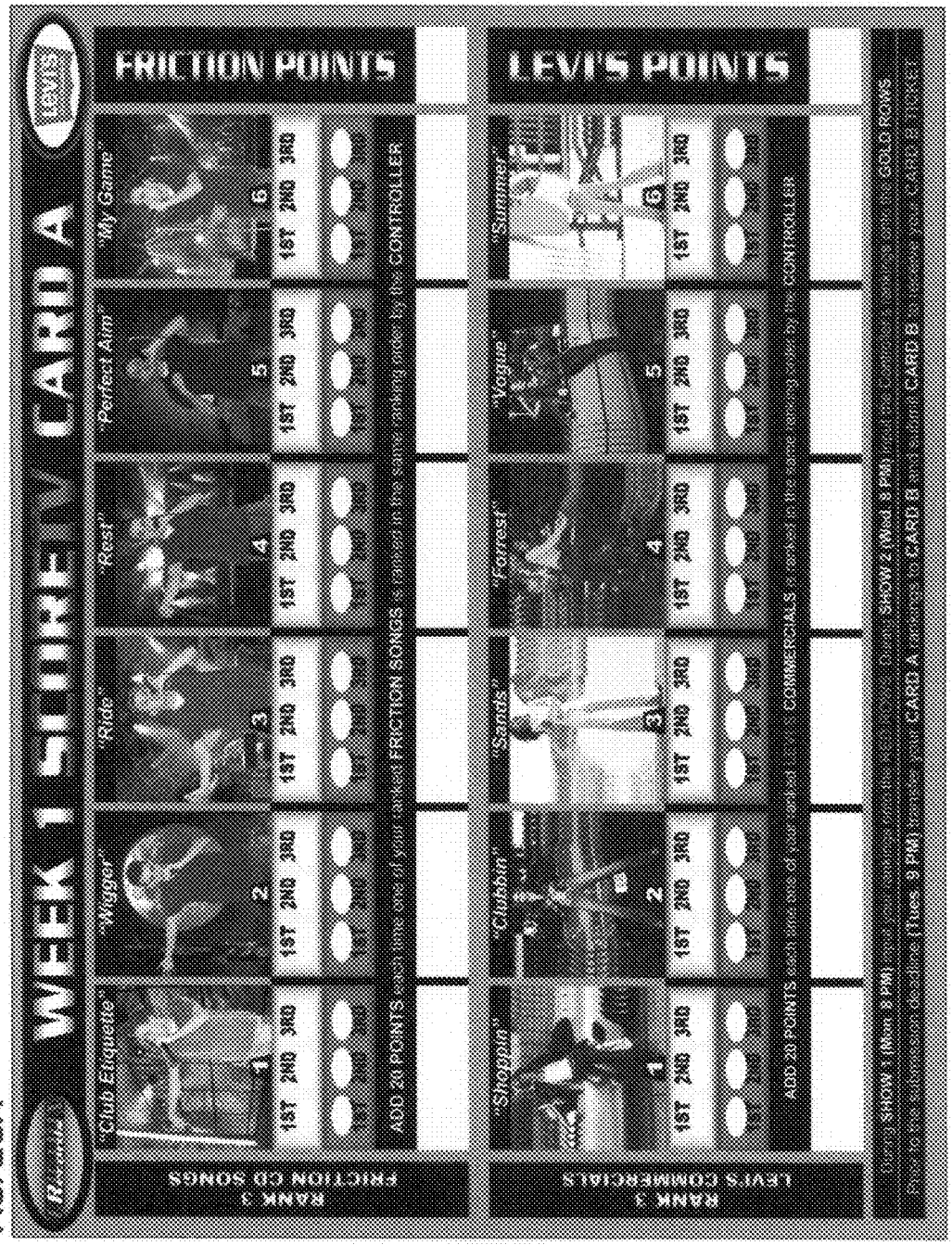
FIG. 20A shows a printed card A of a 2 card 1 ticket response game system.

The following 2 card 1 ticket printed response game system shown in FIG. 20A is virtually identical to the electronic over and under response game system shown in FIG. 19.

Figure 20B:
FIG. 20B shows a printed card B of a 2 card 1 ticket response game system.
Figure 20C:
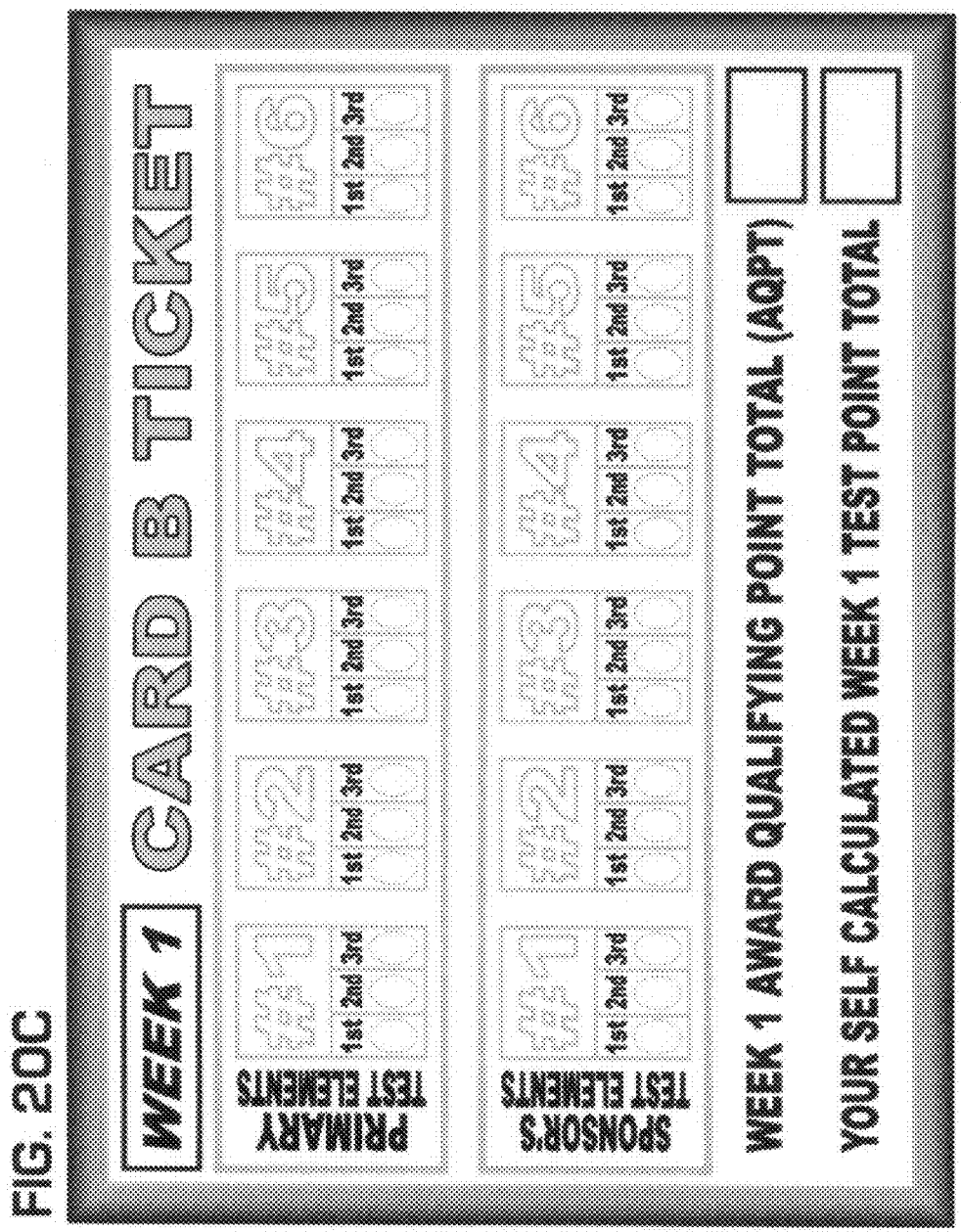
FIG. 20C shows a printed card B ticket of a 2 card 1 ticket response game system.

The following text may be attached to a 2 card 1 ticket printed response game system.
During Phase 1
  Response game producer's and sponsor's game elements are presented on one or more media.
  Player Instructions:
  Step 1: on your card A (FIG. 20A) red rows rank your 3 favorite producer's and sponsor's game elements.
  Step 2: transfer your rankings to a retail card B (FIG. 20B).
  Step 3: submit your card B prior to a submission deadline in order to receive your card B ticket (FIG. 20C).
During Phase 2
  The response point controller's ranked producer and sponsor game elements are revealed. An award qualifying point total (AQPT) is revealed.
  Player Instructions:
  Step 1: on your card A gold rows input the response point controller's ranked game elements.
  Step 2: on your card B ticket in put the AQPT.
  Step 3: on your card A input 20 points in the white area below the red rows each time one of your ranked elements is ranked by the response point controller and in the same ranking order.
  Step 4[: on your card A calculate your response point total.
  Step 5: when your point total meets or exceeds the AQPT submit your card B ticket to qualify to win.

Period & Series Awards
  Up to 1,000 players receiving a period point total that meets or exceeds a period AQPT are awarded $1,000 and 10 players receiving a series point total that meets or exceeds a series AQPT become millionaires.

Figure 21:
FIG. 21 shows an over and under printed player scratch response and a response point controller input response card game system.

The printed player scratch response and response point controller input response card game system shown in FIG. 21 is similar to the previous 2 card 1 ticket system except that a player is required to scratch concealed predetermined player responses located under the scratch off material on the red rows. The player is then required to input the response point controller's response onto the gold rows. This system is designed as a game of chance whereas a response game system that requires a player to input responses to elements based on an evaluation process with or without the use of an evaluation system is designed to measure over time a player's innate ability to respond in-sync with a response point controller. The scratch and input game system, as well as all other previous systems are event drivers whereas participants are driven to an event where a response point controller's responses to elements are revealed.

The following text may be attached to a scratch and input response card game system.
During Phase 1
  Instructions:
    Scratch off the red rows to reveal your ranked producer's and sponsor's game elements.
During Phase 2
  The response point controller's ranked producer and sponsor game elements are revealed. An award qualifying point total (AQPT) is revealed.
  Instructions:
  Step 1: on the gold rows input the response point controller's rankings.
  Step 2: input the AQPT onto the bottom right side of your card.
  Step 3: input 20 points in the white area below your red rows each time one of your scratched ranked elements is ranked by the response point controller and in the same ranking order.
  Step 4: calculate your point total.
  Step 5: when your point total meets or exceeds the AQPT submit your scratch card to qualify to win.

Period & Series Awards
  Up to 1,000 players receiving a period point total that meets or exceeds a period AQPT are awarded $1,000 and 10 players receiving a series point total that meets or exceeds a series AQPT become millionaires.

Figure 22:
FIG. 22 shows a printed player scratch response and a response point controller scratch response card game system.

The over and under scratch card game system shown in FIG. 22 requires a player to scratch off material covering a player's predetermined responses within the red rows and scratch off material covering a response point controller's predetermined responses within the gold rows. The player then is required to assign point values for responses that are at least similar and calculate a point total. The player then may be required to scratch off the material covering the scratch off box located at the lower right side of the system to reveal an award qualifying point total.

The following text may be attached to a scratch card game system.
Scratch Card Game System Type 2 (Instant Winner)
Instructions:
  Step 1: scratch off the red rows to reveal your rankings.
  Step 2: scratch off the gold rows to reveal the controller's rankings.
  Step 3: scratch off the bottom right box to reveal an AQPT.
  Step 4: input 20 points in the white area below the red rows each time one of your scratched rankings matches a scratch point controller's rankings.

Period & Series Awards

Up to 1,000 players receiving a period point total that meets or exceeds a period AQPT are awarded $1,000 and 10 players receiving a series point total that meets or exceeds a series AQPT become millionaires.

Figure 23:
FIG. 23 shows page 1 of a printed response game system fold-out enabling a participant to manually record a response game producer's game element evaluations and rankings.
Figure 24:
FIG. 24 shows page 2 of a printed response game system fold-out enabling a participant to manually record a response game sponsor's game element evaluations and rankings.
Figure 25:
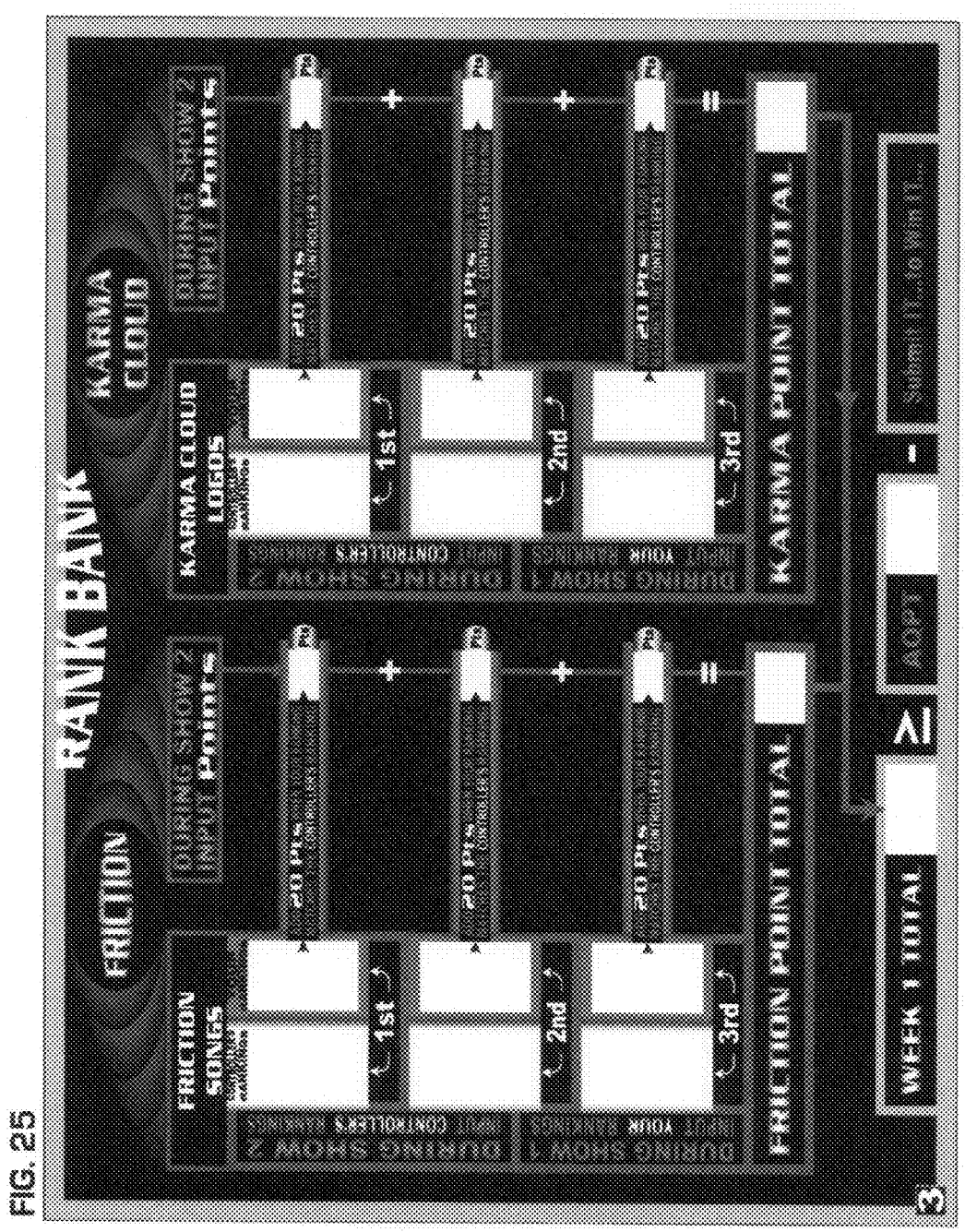
FIG. 25 shows page 3 of a printed response game system fold-out enabling a participant to manually record ranked producer's and sponsor's game elements, self assign response point values for correct responses, calculate a period point total, and input an award qualifying point total/value.

FIGS. 23, 24, and 25 show a printed response game system fold-out. The printed fold-out is a printed replica of, with respect to form and function, the electronic response game systems shown in FIGS. 1 thru 11, excluding the evaluation system. As stated, all response game systems may be offered as electronic or printed games. The electronic games allow a participant to submit responses whereas the printed systems require a participant to access an available response submission platform. Each white area within the system is intended as a manual input area. To create a fold-out effect the bottom of FIG. 23 is attached to the top of FIG. 24 and the bottom of FIG. 24 is attached to the top of FIG. 25. The printed fold-out response game system may be sized as a publication or product insert.

Generally, a printed fold-out or over and under response game system may be combined with a game element presentation media. The game element presentation media may be printed or digital. For example a printed system showing images representing audio game elements may be combined or come with a game element evaluation or presentation CD or DVD.

FIG. 23 is page 1 of the fold-out game system which is similar to the electronic system shown in FIG. 1. This printed response system allows the participants to manually perform the functions of the electronic response system. The white area at the bottom right of each framed image representing a game element enables a participant to record game element evaluations. The white area at the right side of the page enables a participant to record game element rankings. FIG. 24 is a sponsor's game element evaluation and response system. The sponsor's system shown is identical in form and function as the producer's game element evaluation and response system shown in FIG. 23.

FIG. 25 is page 3 of the printed fold-out system. The white areas frame in red are designed to enable a player to input page 1 and page 2 game element rankings. The white areas framed in gold are designed to enable a participant to input a response point controller's rankings during a subsequent presentation event or a show 2. The white areas designated as point input areas are designed to enable a player to self assign point values, input calculated producer and sponsor point totals, and calculate a period point total.

The following text may be attached to a fold-out response game system.

During Phase 1

Response game producer's and sponsor's game elements are presented on one or more media.

Player Instructions:

Step 1. on PAGE 1 RANK your 3 FAVORITE PRODUCER'S TEST ELEMENTS

Step 2. on PAGE 2 RANK your 3 FAVORITE SPONSOR'S TEST ELEMENTS

Step 3. on PAGE 3 input the numbers of your RANKED TEST ELEMENTS into the RED FRAMES Step 4. SUBMIT your RANKINGS prior to the SUBMISSION DEADLINE During Phase 2

The response point controller's ranked producer and sponsor game elements are revealed. An award qualifying point total (AQPT) is revealed.

Step 1. on PAGE 3 input the numbers of the CONTROLLER'S RANKED TEST ELEMENTS into the GOLD FRAMES Step 2. on PAGE 3 input the AQPT into the box located at the bottom middle of the page Step 3. on PAGE 3 input 20 points each time one of your RANKINGS is RANKED in the same order by the CONTROLLER Step 4. on PAGE 3 calculate your PERIOD 1 TOTAL Step 5. when your PERIOD TOTAL meets or exceeds the PERIOD AQPT . . . Submit IT . . . to Win IT!

Period & Series Awards

Up to 1,000 players receiving a period point total that meets or exceeds a period AQPT are awarded $1,000 and 10 players receiving a series point total that meets or exceeds a series AQPT become millionaires.

Figure 26:
FIG. 26 shows a response game show in-studio response point assignment and calculation system.

FIG. 26 Shows a response game and talent show studio presenting a full TV screen image of an in-studio response point assignment and calculation system. The in-studio system shows a response point controller's responses framed in gold located in the center of the system. The colored frames to the left and right of the gold frames are in-studio participants' game element response areas.

Figure 27:
FIG. 27 shows a response game show studio environment.

FIG. 27 shows the in-studio response point assignment and calculation system, in-studio participants and their response point totaling system located below each participant. The in-studio participants may be referred to as in-studio judges. The in-studio judges may have qualified to become in-studio judges by receiving a highest response point total from a current or previous response game. An in-studio participant receiving a lowest point total for one or more periods is dismissed or dissed by their lack of ability to respond in-sync with a response point controller. This type of game and talent show may be referred to as "American Idol" meets "Family Feud" meets "Test The Nation". The "American Idol" reference is due to the talent aspect of the show, the "Family Feud" reference is due to the in-studio participants or teams of participants, the "Test the Nation" reference is due to a nation of viewers utilizing an electronic or printed response game system associated with the game and talent show. The game and talent show generally will present game and talent elements during a show 1. Subsequent to show 1 in-studio judges and at home players' or judges submit responses to a required number and type of responses to a required number of presented elements. At the beginning of a show 2, the in-studio judge's responses are presented. Prior to show 2 at home player may have been able to select one of the in-studio judges as a response point controller for their game. Once the in-studio judge's responses are posted the response point controller's responses are revealed as shown in FIG. 26. Each time a response point controller's response is revealed the in-studio judges are assigned a point value for providing a response to an element that is at least similar to the response point controller's response to the same element. At the end of the show the in-studio judge receiving the lowest point total is dissed or dismissed and the winner is revealed as a prize winner. The winner's next opponent is presented and the show goes on during the same or a next period.

Response games may be utilized not only as the functionality to produce and protect game and talent show formats but may be utilized for all media and formats with an existing or future voting element.

For example, shows like "Survivor", "The Apprentice", or "The Bachelor" which have votes in the can may integrate a response game for at home viewers to participate with the show. But, in this case the response point controller is not the tribal counsel, Mr. Trump, or a bachelor; the response point controller may be a nation of viewers or a segment of a nation of viewers. Therefore, a game element or contestant within the show may be voted-out by a nation but not by the tribal counsel. A player that is in-sync with the tribal council's vote may feel a sense of accomplishment and may even be able to participate in a response game where the tribal council's vote is in real time or able to have been sealed or kept secret, but with a response point controller as a nation the players most in-sync with the nation and not the counsel qualify to become response game winners.

Preferred Embodiments

Novel Response Games and Tests

By utilizing element response periods, a multiplicity of element response games/tests may be incorporated into the periods to provide viewers and participants a significant, compelling and rewarding viewing and interactive experience.

An element response game/test may be considered a game or a test. The combined terms eliminate the conjecture of frivolity the single term game may represent. By no means should an element response test be considered an arbitrary participation event due to the fact that societies and members within may forever be changed for the better.

An element response game/test utilizes the primary functional components of the periods. Generally, the primary functional components of an element response period are one or more element controllers and element response options or response elements.

During an element response game/test, the one or more element controllers determine the fate of the plurality of elements within the game/test while the element response game/test participants provide responses to elements to which the element controllers are also providing responses.

Upon completion of an element response session within an element response test participants are assigned or assign themselves point values for providing correct or nearly correct responses to elements presented during a presentation test phase prior to a response session phase.

A correct or nearly correct response to an element is determined by an element controller's response to the element.

During an element response game/test a participant may be assigned a match or point value each time the participant's response to an element is at least similar to an element controller's response to the same element.

An element response game/test may be comprised of a plurality of element response periods with a plurality of element response categories within each period.

One or more participants with a highest match or point total for the game/test or a highest match or point total with respect to one or more element categories within the game/test, when the one or more element categories are controlled by a different element controller, become the most qualified participants to represent or assist the element controller of the game or the element controllers of one or more categories within the test.

An element response test may include one or more primary tests, one or more secondary tests, or one or more primary and secondary tests. The drawings show a primary and secondary test period.

An element response test allows a test provider and those directly or indirectly associated with the test provider to identify test participants with an ability to respond to test elements in a manner that is at least similar to one or more element controllers.

A primary element response test utilizes one or more primary element controllers to determine correct responses to elements or control the fate or future of elements within one or more test element categories or sub categories, whereas the fate or future of elements are controllable. Primary element controllers are designated based upon one or more primary test objectives with respect to responses to elements to be received by the primary controllers.

During a primary element response test one or more primary element controllers designated to directly or indirectly control the fate or future of one or more elements or provide correct responses to one or more elements within the test are generally required to provide one or more predetermined types of responses to one or more of the one or more elements presented during the test prior to a primary element controller's element response submission deadline.

A test utilizing a plurality of element controllers may be considered a single controller test when participants are allowed to provide a response to match only one of the plurality of controllers. When participants are required to provide a response to match two or more of the plurality of element controllers the test may be considered a multi-controller test.

Element response periods, games, and tests generally designate one or more element categories for one or more revenue providers.

When a test provider, licensee, and or revenue provider is allowed to or required to designate one or more controllers for a plurality of element categories, participants in sync with each controller may qualify to be selected to participate in a future production as an assistant or representative to the controller to which they are in sync.

Example

A test has 4 element categories each controlled by a different element controller.

Category 1 element response options are music lyrics for a future music CD. The lyrics are provided by a music performer. The category 1 element controller is the creator of the music lyrics.

Category 2 element response options are a plurality of designs for the future music CD packaging. The designs are provided by a music CD packaging artist. The category 2 element controller is the music CD design artist.

Category 3 element response options are designs for a new type of footwear. The footwear designs are provided by Nike which happens to be a revenue provider. The category 3 element controller is a mystery controller to be revealed sometime after a response submission deadline.

Category 4 element response options are designs for a new type of automobile. The automobile designs are provided by GM, another revenue provider. The category 4 element controller is also a mystery controller to be revealed sometime after the response submission deadline.

Participants found to be in sync with the category 1 controller, the music performer, qualify to be selected to assist the music performer in a reality Television production showcasing one or more selected participants assisting the performer in determining which music lyrics from a plurality of music lyrics provided by the performer are most suitable to become element response options in a future test.

Participants found to be in sync with the category 2 controller, the artist, qualify to be selected to assist the artist in a reality Television production showcasing one or more selected participants assisting the artist in determining which music CD designs from a plurality of music CD designs provided by the artist are most suitable to become element response options in a future test.

Participants found to be in sync with the category 3 controller, the mystery controller, which was revealed to be a majority of participants from demographic C, qualify to be selected to represent participants from demographic C in a reality Television production showcasing one or more selected participants representing demographic C in determining which elements from a plurality of elements provided by Nike are most suitable to become element response options in a future test.

Participants found to be in sync with the category 4 controller, the mystery controller, which was revealed to be a majority of all participants, qualify to be selected to represent all participants in a reality Television production showcasing one or more selected participants found to be in sync with a majority of participants representing all participants in deciding which elements from a plurality of elements provided by GM are most suitable to become element response options in a future test and a future GM commercial.

A test may result in one or more productions subsequent to the test showcasing participants in sync with various element controllers assisting or representing the element controllers. One or more participants in sync with two or more controllers may be selected to assist or represent the two or more controllers.

A plurality of element controllers may be designated to control elements within the same element category. Participants may be allowed to provide a response to match each of the plurality of controllers. Participants in sync with more than one controller may be selected to assist or represent more than one controller.

A test element controller may be a majority of all participants or viewers from one or more societies, territories, or nations, or a segment of participants or viewers from one or more societies, territories, or nations. Participants comprising the controller may be seen by participants not comprising the controller to have a response advantage. A test provider may not be affected by those not comprising the controller due to the fact that a controller is generally designated according to a test objective or goal. In this instance, the test objective or goal would be to capture data or responses from the designated element controller. The designated element controller may be referred to as a target segment in terms utilized in marketing a target demographic.

A provider may designate a plurality of element controllers for an element response test in order to require entities comprising one or more target demographics to provide subjective responses to an element they control in order to participate in a test whereas said test element is controlled by another element controller or demographic.

A provider may require participants comprising a controller to provide subjective responses to elements they control without consideration, except for a feeling of control, in order to become participants in other tests or element categories controlled by other controllers.

Single Event Test

An element response test may begin and end during a single event or program. A test provider may randomly designate an element controller by methods such as a random selection apparatus or methods similar to balls emitted from an apparatus. The random selection apparatus may be referred to as an element controller identifier. The apparatus or balls may have indicia representing an element controller.

Example

Prior to an Event

Remote participants are afforded access to at least one type of response evaluation, recording, and point calculation system prior to an instant element response game.

A plurality of possible game element controllers and element response game participants are presented with a plurality of game elements. The plurality of element controllers and participants submit a required number of one or more types of responses to a required number of elements prior to an element response submission deadline.

During the Event

A randomly selected or provider designated element controller is revealed. The element controller's responses to elements and a qualifying point total or point range is revealed. Participants with a qualifying point total or range are instructed to resubmit their initial responses prior to a response submission deadline. Participants calculate response points and identify themselves as either qualified or unqualified. Self determined qualified participants' resubmitted initial qualifying responses are received. Self determined qualified participants are revealed. Consideration is provided to self determined qualified participants once qualified resubmitted responses match initially submitted responses.

Example 2

Pre Test Event

A test provider registers (fee or free?) a plurality of possible element controllers and a plurality of test participants whereas the test participants may comprise one or more of the plurality of element controllers. The possible element controller's and test participants are afforded access (fee or free?) to at least one type of element evaluation, response, and response point calculation system. The possible element controllers and test participants are presented with a plurality of test elements. The possible element controllers and test participants are instructed to submit a required number of one or more types of responses to a required number of elements prior to an initial response submission deadline whereas the deadline is prior to the test event. Test participants are instructed to calculate response points during the event each time a selected element controller's response to an element is at least similar to the participant's response to the same element. The test provider receives responses from the possible element controllers and test participants. The test provider stores test participants' initial responses to be compared to qualified test participants' initial response resubmissions.

During Test Event

The test provider presents the plurality of test elements, at least one selected element controller, the at least one selected element controller's responses to elements, and a qualifying response point total or point range. Participants are instructed to calculate response points in order to identify themselves as either qualified or not qualified to receive consideration based on a self assigned point total with respect to their initially submitted responses compared to the selected element controller's responses. Test participants with a qualifying point total are instructed to resubmit (free or fee?) initial responses prior to an initial response resubmission deadline. The provider identifies resubmitted responses as qualified or not qualified. The provider posts or announces one or more self identified qualified participants.

Post Test Event

The provider compares each self determined qualified test participant's resubmitted responses with initially submitted responses. When a participant's resubmitted qualified responses match initially submitted responses the participant is selected or qualifies to be selected to receive consideration based on initially providing responses to elements that match or are at least similar to the selected element controller's responses to the same elements.

"Viewer/Consumer Controlled" Element Response Period, Game, and Test Concept

Viewer/Consumer Auditioned and Cast Host

Generally, an element response test requires a producer or provider of the test to hire a host to communicate to test element controllers and test a participant's information and instructions with respect to the test. In order to further enhance a "Viewer/Consumer Controlled" event or event series the test producer or test provider may utilize the invention to afford viewers an opportunity to receive consideration for auditioning and casting the host of their choice for an upcoming test or test series.

"Viewer/Consumer Controlled" Tests

Viewers/consumers may apply to control various aspects of a test. Viewers chosen as a result of the application or selection process may be allowed to cast element response options for a future element response test.

When a majority of test participants/consumers or a majority of a segment of test participants/consumers is designated as an element controller of elements within the future test or one or more element categories within the future test, the fate or future of elements within the test or within the one or more categories become participant/consumer controlled. When the majority of participants/consumers determine a correct response to one or more elements cast by selected viewers the element receiving the response is totally participant/consumer controlled.

Example

Selected viewers cast competition elements for a future test. The competition elements are contestant hopefuls and competition activity options. Selected viewers choose products or services or aspects of products or services for commercials during the competition or placement in the competition production. Home viewers choose most qualified contestant hopefuls to compete and most suitable competition activities. Home viewers may then determine one or more finalists through an evaluation process. The competition may now be referred to as viewer controlled. Although no test points were offered and viewers received no consideration for their efforts, viewers would have a more intimate level of knowledge of contestants and products versus current methods of viewer interactive competitions. Therefore, a viewer controlled competition allows viewers to control the basic elements and actions associated with a competition which are selecting contestant hopefuls, contestants, competition activities, products for commercials and placement, judging contestants performances, voting for one or more most qualified contestants to become or qualify to become a finalist or winner.

By allowing selected viewers to determine which contestant hopeful options qualify to become contestant hopefuls and which activities options will be available for home viewers to choose from, the pre competition production process may be referred to as viewer controlled.

The elements of the competition production such as contestant hopefuls, activity options, a sponsor's or advertiser's products or service options for commercials or placements may be utilized as element response options in a test with selected viewers as competition production element controllers. The competition element options such as contestant hopefuls, activity options, products or services may be utilized in the same or another element response game or test with home viewers as competition element controllers.

Home viewer selected contestants may be utilized in the same or another test with the home viewers as element controllers.

The above method of viewer controlled competitions may also be utilized for a viewer controlled audition wherein the home viewer determined finalists proceed to a next level of the same competition or audition or is cast to appear in a product such as Television, film, video, or publication.

"Viewer/Consumer Controlled" Element Response Tests

Test elements within one or more element categories made available to receive responses may be directly related to identifying and choosing participants to control the selection process of the same or similar types of elements for an ongoing series of "Viewer Controlled" element response tests.

One or more participants in sync with an element controller with respect to each element category may be chosen to star in a reality series or documentary showcasing the one or more participants controlling the selection process of the same or similar types of elements for a future element response test of the same or similar theme.

When the future test provider designates a majority of participants to control elements within each category of the future test, the future test becomes the World's first "Viewer Controlled" element response test.

Element response test participants may be selected to control various other aspects of preparing a future element response test. For example, participants may be selected to become element response test production executives. The new type of response test executive may control processes prior to and during the future test.

Response test executives may select:
- Response Test Elements
- Element Controllers
- Response Types
- Number of Responses
- Time of Response Test Broadcast
- Revenue Providers
- Types of Consideration Offered Participants Consumer Controlled Production and Events Currently production and event elements are selected by conventional means and methods according to assumed suitability or appeal to a target consumer demographic.

Element response tests provide new and most effective methods and systems for production element selection.

A test provider is enabled to provide consumers with an opportunity to receive consideration for determining which elements within a test will be incorporated into a future production or event. The production or event may be related to entertainment, politics, business, economics, or manufacturing, to name a few.

The test would generally designate a majority of consumers or a majority of consumers from one or more demographics as a production or event element controller. One or more test participants/consumers in sync with the element controller are selected to receive consideration.

Therefore, the production or event results in consumers providing themselves with their favorite production or event elements and at the same time are provided with an opportunity to receive consideration.

A limitation exists with current means and methods of presenting elements from which consumers are able to choose.

Current methods of selecting elements for consumers to choose from would be for one or more individuals, groups, or businesses directly or indirectly associated with the provider, or the provider to select elements. These methods are inefficient when compared to allowing qualified consumer representatives to select elements for other consumers to choose from. Through element response testing resulting consumer representatives may be proven to have an innate ability to identify elements a majority of consumers find most appealing or suitable.

Consumer representatives are identified as a result of an element response test that allows a majority of consumers to control elements within the test.

Consumer representatives are identified when a majority of consumers is designated as a controller of elements presented during an element response test. Test participants (individual consumers) receive a point value each time a response to a test element matches or is at least similar to an element controller's (a majority of consumers) response to the same element. Test participants with a highest point total for a period or series of periods are identified as consumers that are in sync with or have the pulse of the majority of consumers.

One or more consumers in sync with a majority of consumers or a majority of a segment of consumers (i.e., a designated element controller) may be selected to represent the element controller as element casting directors for a subsequent element response test. This way the elements incorporated into the subsequent test for consumers to choose from are selected by consumers representing consumers.

Therefore, when the subsequent test provider allows a majority of test participants/consumers to determine which elements are most appealing or suitable for a future production or event the future production or event elements are totally consumer controlled.

In reference to the above example a majority of test participants/consumers from one or more target demographics may be substituted or incorporated resulting in elements selected for the test and future production or event controlled by consumers from the one or more demographics.

Viewer/Consumer Controlled Event

Conventional and herein novel viewer interactive event/series allows viewers/participants to interact with one or more interactive elements of an event. A "Viewer Controlled" event allows viewers/participants to control one or more interactive elements of an event. An event theme is based upon the type of elements, interactive or not, that are incorporated into the event. Generally an event theme is chosen based upon an event objective or goal. For example, a Television network is in need of a host for a new Television program. The network may license the invention and a related host search Television program format to offer viewers an opportunity to receive consideration for correctly responding to the interactive elements of the host search. The interactive elements for a host search would normally be determined by producers of the search or a producer's one or more associates. Therefore, the theme is a viewer interactive host search. When element response test methods are incorporated into the search viewers may become host search element response test participants. The test provider or host search producer may designate a controller of host search elements placed into the test by the producers to be a majority of test participants.

One or more participants identified as a result of the test as in sync with the controller may be selected to participate in the pre production of a future host search element response test as representative to the controller. The element controller representatives are representing the majority of element response test participants. The selected participants may control aspects of the future host search element response test. The selected participants may determine which future host search elements from a plurality of elements are most suitable to be incorporated into the future test for future test participants to respond to.

When the future test provider designates an element controller of the future host search test elements to be a majority of participants, the elements cast by the representatives of the majority of participants during the pre production of the test become "Viewer Controlled". Therefore, the conventional phrase viewer interactive event may now be replaced by the phrase viewer controlled event.

"Viewer Controlled Event"

The compelling element response game/test format for providers, sponsors, and participants is to provide an ongoing series of games/tests with element response options of a theme or genre that are most enticing for each major demographic of a nation, a continent, or the World.

For example, the major demographics may be children (combined with adult supervision), teens, young adults, and adults.

Announce to each demographic that the initial game/test is "viewer interactive" and all subsequent games/tests are "viewer controlled"

The elements for all initial games/tests are generally cast by casting directors hired by the game/test provider or are cast by the provider themselves.

In order for an element response game/test to provide a most enjoyable and significant experience the element response options cast by the casting director or the provider must provide a compelling and significant game/test experience. To eliminate the chance that element response options are not as compelling and significant as they may possibly be the inventions provide a solution.

Allow the element controller of each game/test to be a majority of the game/test participants. A group of participants with a highest game/test point total qualify to represent the majority of participants (i.e., the element controller) in a subsequent game/test as element casting directors. Therefore, all subsequent games/tests become "Viewer Controlled". Viewer controlled games/tests provide the most novel and compelling game or test format ever provided. The viewer controlled game/test format will become the standard for the most compelling and significant viewer interactive/controlled experience in territories throughout the World.

When the element response options of an element response game/test are audition or competition elements, each viewer interactive audition or competition results in an ongoing series of viewer controlled auditions and competition. By allowing each demographic (children with parent or adult supervision, teens, young adults, and adults) to control auditions for Television and film, the resulting Television and film products will become the most recognizable the World has ever known. By allowing each demographic to control competitions for a nation's or the Worlds favorite elements, the resulting elements will become the most recognizable the World has ever known. The element controller representatives from each demographic will become the most famous game participants the World has ever known. The invention licensee will also become the most recognizable game/test provider the World has ever known.

The element response game/test sponsor and the sponsor's products or services, when the sponsor's products are integrated into the game/test as element response options, will become the most recognizable sponsor the World has ever known.

Therefore, the invention generates more consideration for viewers, providers, and sponsors than ever before offered.

Political Element Response Test

Political element response test participants with a highest point total with respect to a majority of members of one or more societies or a majority of members of one or more segments of one or more societies may be selected or qualify to be selected to star in a future political type of production as representative to the one or more societies or one or more segments of one or more societies.

Political Test

To show a range of an element response game/test (ERG/T) one or more element categories may incorporate a future political candidate presenting well thought out political strategies or stands according to beliefs consistent with past actions. The candidate or candidate hopeful may present a same or similar stance which may show the candidates vision or ability to envision a best strategy which the candidate will not change to appease a new or different polling result.

Free, Fee, or Bid Participation

Element response tests may be free, fee, or bid based. Generally, an element response test requires no fee, although a fee or bid may be required as a test parameter or qualifier.

A fee may be required to identify a participation level. Various participation levels may provide a range of award opportunities. Fees may be based on various test levels. A participant's fee based test selection may be determined by how accessible or assumed ability to be in-sync with an element controller.

Element Response Test Utility

An element response test may be utilized by viewers to identify and select most suitable, viable, qualified, or talented in studio, in audience, and/or at home (local or remote); contestant, element judge, element controller representative, and element controller hopeful options, hopefuls, as well as the ultimate entities.

An element response test may be utilized by test producers to identify and select most suitable, viable, qualified, or talented in studio, in audience, and/or at home (local or remote); contestant, element judge, element controller representative, and element controller hopeful options, hopefuls, as well as the ultimate entities.

The term participant and the terms contestant, element judge, element controller representative, and element controller may be synonymous. The term participant may also refer to individuals or teams hoping or attempting to achieve one or more test or personal goals or objectives.

An element response test may be utilized to identify participant semi-finalists, finalists, and/or winners.

Element Controller Designation

When a plurality of potential primary element controllers are providing one or more predetermined types of responses to a predetermined number of elements within an element response period one or more of the potential primary element controllers may be designated sometime before, during, or after a response submission deadline. One of the one or more potential primary element controllers may be designated at a time consistent with, same as, or after a primary element response test participant's element response submission deadline.

Primary Element Controller Test

An entity or entities comprising one or more primary element controllers of elements within an element response test may be allowed or required to participate in a primary element controllers test. Each entity may receive a point value when the entity's response to an element is at least similar to:

Another entity's response to the same element wherein the other entity comprises another primary element controller.

Another entity's response to the same element wherein the other entity comprises an alternate element controller.

Another entity's response to the same element wherein the other entity comprises an ancillary element controller.

A percentage (generally a majority) of entities' response to the same element whereas the percentage of entities comprises the same primary element controller.

A percentage of entities' response to the same element whereas the percentage of entities comprises another primary element controller.

A percentage of entities' response to the same element whereas the percentage of entities comprises an alternate element controller.

A percentage of entities' response to the same element whereas the percentage of entities comprises an ancillary element controller.

A percentage of primary element response test viewers' response to the same element.

A percentage of ancillary test viewers' response to the same element.

A percentage of primary test participants' response to the same element.

A percentage of alternate test participants' response to the same element.

A percentage of ancillary test participants' response to the same element.

A percentage of polled or surveyed members of one or more societies or one or more segments of one or more societies' response to the same element.

An element response game may utilize one or more segments of a plurality or a universe of element response game participants as element controllers. In this scenario participants may qualify to receive an award, title or recognition based at least in part on their ability to identify and respond to elements in a manner at least similar to the element controller or a segment of a plurality of element response game participants comprising an element controller.

An element controller game/test objective may be to identify an element controller or entities comprising an element controller in sync with an element controller or ERG/T participants.

An element controller game/test may allow or require an entity or entities comprising an element controller to qualify to remain an element controller or an entity comprising an element controller.

An element controller game/test may require the entity or entities to provide a required number and type of responses to a required number of elements in a manner that is at least similar to a majority of all participants or a majority of one or more segments of participants.

When the entity or entities are in sync with participants the entity or entities may be offered an opportunity to remain as an element controller or entity comprising an element controller.

When the entity or entities are in sync with participants the entity or entities may qualify to receive consideration.

An entity or entities comprising one or more element controllers of elements within an element response period may be allowed or required to participate in an element controllers test. Each entity may receive a point value when the entity's response to an element is at least similar to:

Another entity's response to the same element wherein the other entity comprises another element controller.

A percentage (generally a majority) of entities' response to the same element whereas the percentage of entities comprises the same element controller.

A percentage of entities' response to the same element whereas the percentage of entities comprises another element controller.

A percentage of element response period viewers' response to the same element.

A percentage of ancillary test viewers' response to the same element.

A percentage of ancillary test participants' response to the same element.

A percentage of polled or surveyed members of one or more societies or one or more segments of one or more societies' response to the same element.

An element controller game/test objective may be to identify an element controller or entities comprising an element controller in sync with an element controller or ERG/T participants.

An element controller game/test may allow or require an entity or entities comprising an element controller to qualify to remain an element controller or an entity comprising an element controller.

An element controller game/test may require the entity or entities to provide a required number and type of responses to a required number of elements in a manner that is at least similar to a majority of all participants or a majority of one or more segments of participants.

When the entity or entities are in sync with participants the entity or entities may be offered an opportunity to remain as an element controller or entity comprising an element controller.

When the entity or entities are in sync with participants the entity or entities may qualify to receive consideration.

Test Participants as Entities Comprising an Element Controller

A plurality of members of the one or more societies belonging to each of the plurality of segments may be enrolled as both entities comprising test element controllers and test participants. Test participants belonging to each segment may be required to submit a same number of one or more types of response to a same number of test elements prior to a response submission deadline designated for each segment.

The test response platform administrator may group submitted responses from each controlling segment during a designated response session and/or upon completion of a designated response session with respect to each segment. The response platform administrator identifies each element receiving a required number of one or more similar types of response from a highest number (majority?) of test participants from each of the plurality of segments comprising each of the plurality of controllers respectively. The identified elements may be prepared to be revealed during a first segment of a next phase.

The response platform administrator may assign a point value to a test participant each time the participant's submitted one or more responses to an element are at least similar to a test element controller's response to the same element. Therefore, each participant may receive a number of response point totals with respect to a number of test element controllers.

A response test administrator may require test participants to submit initial responses prior to an initial response submission deadline with respect to a segment to which the participants belong and to resubmit initial responses when the initial responses are identified by the participants with respect to points information provided by the administrator as qualifying the participant to receive consideration.

This method may require the administrator to only compare a test participant's self determined consideration qualifying initial response resubmission with the participant's initial response submission to identify the participant as qualified to receive consideration and may not require the administrator to assign point values to either initial response submission or initial response resubmissions.

Test participants with a highest point total with respect to each controller qualify to represent that controller resulting in a test participant possibly qualifying to represent more than one controller. When a plurality of test elements are incorporated into various themed test element categories a participant may receive a highest response point total for one element category with respect to one element controller and a highest response point total for another element category with respect to another element controller. This way the participant may qualify to represent each element controller with respect to each test element category theme. In essence the participant is identified as having an innate ability to provide matching or similar responses to elements of different themes with respect to different controllers.

Element Response Test Preparation

Based on one or more period or test objectives or goals an element response period or test provider designates:

a number of test periods;
a number of test phases for each period;
a day and time to begin each test phase;
an element response submission deadline for each response session;
one or more test revenue providers for each phase;
a plurality of primary test elements for each response session;
a plurality of revenue provider's test elements for each response session;
one or more primary element controllers;
one or more alternate element controllers;
with or without the test providers assistance, one or more element controllers for the revenue provider's test elements;
one or more types of responses the one or more primary element controllers are required to provide test elements;
one or more types of responses the one or more alternate element controllers are required to provide test elements;
one or more types of responses the one or more revenue provider's element controllers are required to provide the revenue provider's test elements;
a number of test elements to which the one or more primary element controllers are required to provide the one or more types of responses;
a number of test elements to which the one or more alternate element controllers are required to provide the one or more types of responses;
a number of test elements to which the revenue provider's one or more element controllers are required to provide the one or more types of responses;
one or more test element observation platforms;
one or more test element response submission platforms;
one or more element evaluation and response recording systems for the test and revenue providers one or more element controllers;
one or more test participant element evaluation, personal response recording, controller response recording, and response point calculation systems;

a number of participants to receive consideration with respect to each response session; and a level of consideration afforded to qualified test participants.

Prior to an element response period the period provider may afford members of one or more societies or member of one or more segments of one or more societies with access to at least one of a period's one or more observation platforms and at least one of a period's one or more response submission platforms, and an opportunity to become entities comprising an initial element controller wherein an element controller is ultimately comprised of a majority of members of one or more societies or a majority of members of one or more segments of one or more societies.

Prior to an element response period with one or more directly or indirectly associated ancillary element response tests, the ancillary element response test administrators may afford members of one or more societies with access to at least one of a period's one or more observation platforms and at least one of a period's one or more response submission platforms an opportunity to become ancillary element response tests participants.

Prior to an element response test, the test provider may afford members of one or more societies or members of one or more segments of one or more societies with access to at least one of a test's one or more observation platforms and at least one of a test's one or more response submission platforms, and an opportunity to become entities comprising one or more element controller and/or element response test participants.

Test Preparation Example

A test provider selects a plurality of elements most suitable to become test elements, according to one or more test element suitability criterions or test objectives, during a future element response test.

A plurality of test element controllers, each comprised of a segment of future test participants belonging to at least one nation, may be designated to directly or indirectly determine the fate/future of the plurality of selected test elements by a number of one or more types of responses the controllers may be required to provide for a number of the plurality of test elements.

Generally, when test elements are capable of having a future and a test element controller's required type of response to an element is a positive response, the controller directly affects the future of that element and indirectly affects the future of elements not receiving the positive response. When a test element controller's type of response to an element is a negative response, the controller directly affects the future of that element and indirectly affects the fate of elements not receiving the negative response. The test element controller's one or more types of responses to an element may also be responses test participants must provide for the same element in order to receive a point value. A test participant may also receive a point value each time the participant's response to an element is at least similar to a controller's response to the same element. Therefore, a test element controller may be designated to directly or indirectly control the future of test elements, when test element futures are controllable and determine correct responses to a number of test elements during an element response test.

Members of the at least one nation may be informed of an opportunity to simultaneously participate in a future element response test as entities comprising one of a plurality of element controllers and element response test participants whereas a plurality of test participants with a highest point total with respect to each of the plurality of controllers are selected to star on Television as a representative to the one or more controllers to which they are in sync and/or receive a one million dollar award.

Ancillary Element Response Test

Ancillary element response tests associated with an element response period generally allow or require ancillary test participants to provide a same one or more types of responses to a same number of elements as at least one element controller presented during the element response period prior to an ancillary element response test participant's element response submission deadline. An ancillary test participant's response submission deadline is generally the same as or prior to an element response period element controller's response submission deadline.

Ancillary Element Response Test Associated with a Primary Test

Ancillary element response tests associated with a primary element response test generally allow or require ancillary test participants to provide a same one or more types of responses to a same number of elements as at least one primary or alternate element controller presented during the primary element response test prior to an ancillary element response test participant's element response submission deadline. An ancillary test participant's response submission deadline is generally the same as or prior to a primary element response period primary or alternate element controller's response submission deadline.

Ancillary Games and Tests

Another objective of an element response period or element response test may be to afford viewers the opportunity to participate in one or ancillary element response games or tests. An ancillary game or test may be directly or indirectly associated with one or more primary element response period or test observation platforms, (e.g., network Television, Video, etc.). By affording viewers of element response periods the opportunity to participate in ancillary element response games directly or indirectly associated with the element response period observation platform, the observation platform provider may garner a higher percentage of viewers when compared to not affording viewers with an opportunity for ancillary game or test participation.

Ancillary game winners may receive recognition or awards from a provider of a primary observation platform or revenue provider associated with the primary observation platform.

Example

An ancillary test provider/administrator affords viewers of an element response period or series of periods an opportunity to participate in an ancillary element response test.

The ancillary game administrator instructs participants to observe and evaluate the element response options presented on the primary observation platform at a certain date and time.

The ancillary game administrator may provide participants with printed or electronic element response systems. An element response system may allow participants to evaluate elements presented on the primary observation platform one or more times subsequent to the primary platform presentation.

The ancillary participants observe the primary observation platform showing the elements available to receive one or more responses from one or more element controllers and participants of one or more ancillary element response games.

Before an element response deadline the element controller submits responses to one or more elements subsequent to an ancillary test participant's response submission deadline when the element controller is other than a percentage of ancillary game participants. When the element controller is a segment of element response game participants the element controller's response submission deadline and the ancillary element response game participant's response submission deadline is the same. The primary provider and the ancillary test administrator may share response submissions. Therefore, the ancillary administrator is able to assign a point value to each participant that responds to an element in a manner that is at least similar to one or more element controllers. The administrator is then able to identify participants with the highest score. The administrator is then able to communicate identities of one or more winners to the period provider.

During an event subsequent to the presentation of the element response options on the primary observation platform the primary provider reveals the controller's responses to one or more elements as well as the element finalist for the period. The primary provider may also reveal one or more winning ancillary game participants. At this time the ancillary provider may reveal the one or more winning participants. The one or more winning participants may receive recognition or an award from the primary provider. The one or more winning participants may also receive recognition or an award from the ancillary administrator.

During a series of element response periods the ancillary administer may allow participants to accrue points. Ancillary participants receiving a highest point total for a series of periods may be revealed on the primary platform.

The ancillary game administrator may not be associated or have a direct relationship with the primary provider. Therefore, the ancillary game winners may be recognized or receive awards in ways other than stated above.

Another example of an ancillary game with an administrator with no direct relationship or association with a primary provider may be a wagering game, pool game, card, lotto, or scratch card, or a combination of two or more games.

Element Response Pool Game

Wagering, Pool, Retail Card, and Retail Card/Lotto Type games may be played by friends and co-workers utilizing printed or electronic element evaluation, response, rating, ranking systems, as well as element controller and participant databases with point calculation system.

Ancillary Element Response Games

Casino Games

Slots

Wagers

Table Games

Board Games

Ancillary games and systems may be utilized by businesses to test executives, employees and applicants. The participants' game/test scores may indicate the participants that are most qualified to represent an element controller of one or more element categories within an element response game when the element controller is targeted by a business.

Primary and Alternate Element Response Test

Primary and alternate element response tests utilize both one or more primary element controllers and one or more alternate element controllers. Participants may be required to participate in a primary test controlled by a primary element controller and may participate in one or more alternate tests each controlled by an alternate element controller. When the primary element controller is a majority of all element response test participants, an alternate element controller may be comprised of a segment or demographic of test participants whereas the segment or demographic may overlap the majority of test participants.

Alternate Element Response Test

During a primary element response test one or more alternate element controllers may be designated to directly or indirectly control the fate or future of one or more elements or provide correct responses to one or more elements within the test. The one or more alternate element controllers are generally required to provide one or more predetermined types of responses to a predetermined number of elements presented during the test prior to an alternate element controllers element response submission deadline.

When a plurality of potential alternate element controllers are providing one or more predetermined types of responses to a predetermined number of elements within a primary element response test, one or more of the potential alternate element controllers may be designated sometime before, during, or after a response submission deadline. One of the one or more potential alternate element controllers may be designated at a time consistent with, same as, or after a response submission deadline for alternate element response test participants.

An alternate element controller of one or more elements within an element response test may not be revealed or may remain a mystery until a same time, a time consistent with, or after an alternate element response test participant's element response submission deadline.

Alternate Element Response Test

When an element response test utilizes a plurality of element controllers for each element within the test or test element category at least one element controller is designated as a primary controller and the remaining element controllers are designated as alternate controllers.

The primary controller is generally to accomplish a primary test objective and the one or more alternate controllers are designated to accomplish at least one alternate test objective.

Test participants may be required to participate in a primary test controlled by a primary controller and may be allowed to participate in one or more alternate tests each controlled by an alternate controller.

When a primary controller is a majority of all test participants an alternate controller may be a majority of a segment all participants.

Alternate Element Controller Test

An entity or entities comprising one or more alternate element controllers of elements within an element response test may be allowed or required to participate in an alternate element controllers test. Each entity may receive a point value when the entity's response to an element is at least similar to:

Another entity's response to the same element wherein the other entity comprises a primary element controller.

Another entity's response to the same element wherein the other entity comprises another alternate element controller.

Another entity's response to the same element wherein the other entity comprises an ancillary element controller.

A percentage (generally a majority) of entities' response to the same element whereas the percentage of entities comprises a primary element controller.

A percentage of entities' response to the same element whereas the percentage of entities comprises the same alternate element controller.

A percentage of entities' response to the same element whereas the percentage of entities comprises another alternate element controller.

A percentage of entities' response to the same element whereas the percentage of entities comprises an ancillary element controller.

A percentage of primary element response test viewers' response to the same element.

A percentage of ancillary test viewers' response to the same element.

A percentage of primary test participants' response to the same element.

A percentage of alternate test participants' response to the same element.

A percentage of ancillary test participants' response to the same element.

A percentage of polled or surveyed members, of one or more societies or one or more segments of one or more societies' response to the same element.

Alternate Element Response Test Associated with Primary Test

Alternate element response tests associated with a primary element response test generally allow or require alternate test participants to provide a same one or more types of responses to a same number of elements as at least one primary or alternate element controller presented during the primary element response test prior to an ancillary element response test participant's element response submission deadline. An alternate test participant's response submission deadline is generally the same as or prior to a primary element response period primary or alternate element controller's response submission deadline.

Response types are identified on a response platform and by an element response host during an element response option presentation.

One or more element controllers (one or more primary or one primary and one or more alternates) designated to one or more element categories and element response game participants may be required to provide a required number and type of responses to a required number of elements within the category. The type of responses may be announced by an element response game host and presented on an element response platform corresponding to each element within the category.

Example

An element response game host presents 8 element response options from one element category.

One or more element controllers designated to the one element category and element response game participants are instructed to rate/evaluate each element from the one category on a 1.0 to 10.0 scale and rank 4 elements in the order of 1st thru 4th place according to at least one criterion. Each element will receive at least one rating or evaluation response and 4

Example 2

Controller(s) and participants are instructed to rate each element from the one category on a 1 to 10 scale according to three criterions and rank One or more types of responses to elements within a specific element category or element sub category An element response period, a series of element response periods, an element response period in combination with one or a series of element response periods may incorporate a game/test for one or more element controllers or entities comprising separate or the same element controllers of element response options within one or more element categories, element sub categories, or one or more elements category regressions of the period or series of periods.

The term game and test may be synonymous.

An element response game provider may reveal the identity of one or more element controllers prior to a participant element response submission deadline. A provider may not reveal the identity of one or more element controllers until after an element response submission deadline. A controller not revealed until after an element response submission deadline may be identified before the submission deadline as a secret or mystery controller.

An element response game may have a plurality of element categories. One or more categories may have controllers that are identified to participants before an element response session or element response submission deadline. One or more other categories may have controllers that are not identified to participants until after an element response submission deadline.

An element response game may have one or more categories of element response options. Each category may have one or more element controllers.

A controller for one category may be identified to participants before an element response session or before an element response submission deadline.

An element response game may utilize a plurality of element controllers (identified, mystery, or identified and mystery) and a plurality of element categories. Element controllers may be required to provide a specific number and type of responses to a specific number of elements within all categories or within one or more designated categories. Generally, element response game participants are required to provide the same number and type of responses to the same number of elements within all categories as the controllers. Participants may be allowed or required to select one or more element controller for their specific game or test and may be allowed or required to select one or more element categories.

When a plurality of element controllers exists, participants may be required to provide a required number and type of objective responses to a required number of elements within each category.

One or more consideration opportunities may correspond to all or different controllers.

When award opportunities correspond to different controllers, participants may be allowed to select one or more controllers for their game based upon identifying with the one or more controllers or identifying with the one or more award opportunities corresponding to a specific identified or mystery controller.

When a plurality of element controllers exist within an element response game, participants may be allowed to One or more types of awards may correspond to one or more element controllers, identified or mystery.

One or more types of awards may correspond to one or more identified or mystery controllers. Participant may be allowed to select one or more element controllers according to the award opportunities associated with each controller.

An element response game may have one or more element categories with one or more identified and one or more mystery controllers. A participant may be required or allowed to submit objective and subjective responses to elements within the one or more element categories resulting in the provider capturing a participant's objective and subjective response data.

An ancillary element response test may be associated with a secondary element response test or one or more secondary element response test element categories.

Consideration

Consideration may be offered to viewers/consumers for registering to become test participants.

Consideration

One of the most notable things a participant may receive is an employment offer. An employment offer may be combined with a salary commensurate with a Television network executive. The employment offer may be an element casting director for a subsequent or future element response period or game. One or more most qualified participants may by selected to represent one or more of the element controllers to which the participant relates to on an element response level higher than all other participants.

When an element controller of an element response game is a segment or a majority of a plurality of element response game participants, one or more participants with a highest point total may qualify to represent the segment or the majority of participants in a subsequent or future element response period or games as an element casting director.

A plurality of most qualified element response game participants may be selected to participate in the production of a subsequent or future element response period or game as element casting directors for one or more periods of the game when the game consists of a plurality of periods. Therefore, the one or more periods of the game may be referred to as viewer/consumer controlled. When participants are from diverse social backgrounds and ethnicities the game or test may be referred to as diversely controlled.

A multiplicity of most qualified element response game participants may be selected to participate in a subsequent or future element response period or game as a plurality of entities comprising an element controller.

An element response game may allow participants to audition and cast entertainers or contestants for Television programs or series. The most qualified participants may then be selected to participate in the program or series.

Example

A Television network provides an element response game with the main objective of allowing participants to audition and cast one or more leading, supporting, or walk on roles in a future Television series. The future Television series has one or more element response option incorporated into one or more episodes of the series. Various programs may incorporate one or more element response options into every or every other program. A multiplicity of the most qualified participants from the previous game responds to a required number of the element response options within the program.

Therefore, a television program or series that normally provides little or no interactivity may allow and multiplicity of most qualified element response game participants to interact with the program or series they helped to cast.

Generally, the game/test is utilized to engage participants or teams of participants that qualify to represent one or more element controllers of the game/test in a future game/test as an element controller assistant or representative. One or more participants most qualified to represent or assist a controller in a subsequent game/test are generally participants with the ability to identify element that an element controller will have an affinity to.

An element response game may have a plurality of element response options from a plurality of categories or sub categories. Each category or sub category may be assigned to a different element controller.

An element response game or element response category may allow a participant to response to elements objectively, partially objectively, subjectively, or partially subjectively. When an element controller is known, a participant may provide objective responses to elements. When an element controller is partially known, a participant may provide partially objective or partially subjective responses to elements. When an element controller is unknown, a participant may respond to elements subjectively.

A provider may wish to garner subjective response data to element response options. Therefore, the provider may keep the element controller a secret until an element response deadline has passed. This may provide a more suspenseful game format.

A plurality or multiplicity of participants most qualified to represent one or more element controllers may participate in a future production as an element controller representative from a remote location such as from home, school, or office. One or more most qualified participants may also represent the one or more element controller on a .production site.

Participants qualified to receive an award may become an element response option, an element casting director, an element casting coordinator, an element casting assistant, an element casting consultant, an entity which determines element placement.

Consideration
Gift Certificates
Product Certificates
Discounted Product or Gift Certificates
Event Tickets
Cash Prizes Awards
Response Test Point Total Certification
Titles
Entered into a Sweepstakes or Drawing
Selected to Become A High Level Participant or Contestant
Award/Prize Products responded to by an element controller may be provided as prizes to be received by winning or most qualified ERG/T participants.

Employment or Contract Opportunities

Employment or contract opportunities may include, but are not limited to: casting director, celebrity judge, consultant, executive, assistant, representative, focus group leader.

When a predetermined number of most qualified participants is exceeded award winners may be determined by time taken to submit responses, number of periods the participant has previously participated in, number of elements responded to that did not require a response.

Consideration

A test may provide one or more most qualified participants or participants in sync with a controller to become an element controller assistant or representative.

A test objective may be to identify and award a specific number or range of most qualified participants. A provider may increase the number of elements, element categories, element controllers (when participants are required to be in sync with more than one controller to receive consideration), phases within each period, periods within each series, or series. When a number of most qualified participants exceed a desired number a provider may require the excessive number of most qualified participants to participate in one or more additional tests in order to achieve a manageable number of most qualified participants. The higher the number of responses participants are required to provide will result in a lower number of most qualified participants.

A test objective may be to identify or search for participants or teams to assist, represent, replace, or become one or more element controllers or entities comprising an element controller.

Test participants and teams will generally receive consideration (including, but not limited to, prizes, awards, certifications, recognition) based at least in part upon a participant's or team's ability to subjectively, objectively, or subjectively and objectively provide responses in sync with one or more element controllers controlling elements within one or more test element categories, element sub categories, or one or more combinations of element categories, or element sub categories.

Game Show Contestants

A test prize or award may be consistent with one or more of the test provider's objectives. A provider's objective may be to identify applicants most qualified to participants on a game show as contestants and to allow various other games to exist utilizing the elements of the test.

Participants of various themes of element response tests with a highest point total or a highest number of matches may be selected or qualify to be selected to participate in a range of future productions or businesses which may or may not be directly or indirectly related a test theme or genre.

Various test themes may garner actions or responses conducive to identify participants who qualify for an almost unlimited number of future positions or opportunities that are directly or indirectly related to each theme.

A test provider may allow participants to receive consideration based on a participant identified as being in sync with a plurality of element controllers whether the element controllers are designated to controller elements or provide correct responses to elements within one or more of the same element categories or different element categories.

Example

A test provider designates two element controllers for one element category. The one element controller, controller A, is corporate executive, the other element controller, controller B, is predefined as comprised of a plurality of test participants. Controller B is ultimately defined by responses received by a majority of the plurality of participants.

The test provider's objective is to identify a group of participants qualified to be selected to receive a salary while assisting the executive and representing the plurality of participants simultaneously during a future production. The objective is accomplished by requiring participants to provide a set of responses to elements within one element category with respect to controller A and controller B.

The two controllers; the executive and the plurality of participants, are instructed to provide the same one or more types of responses to a same number of elements within the one element category. In essence, test participants are instructed to provide a set of responses, response A to correspond to controller A and response B to correspond to controller B. Participants are informed, each time a participant's response A response to an element matches or is at least similar to controller A's response to the same element the participant is allowed to assign them self or is assigned a point value. And, each time a participant's response B response to an element matches or is at least similar to controller B's response to the same element the participant is allowed to assign them self or is assigned another point value. And, participants with a highest point total with respect to controller A (the executive) combined with a highest point total with respect to controller B (the majority of participants) qualifies to be selected to receive a monetary award and/or assist the executive and represent the participants simultaneously during a future production.

The test provider inquires: Who would be more qualified to assist the executive and represent a nation than those who are most in sync with the executive and the nation? The provider exclaims, that's right . . . no one!

Providing test participants with consideration based on receiving a highest point total with respect to multiple controllers may be accomplished in many ways.

Consideration

Test participants with a highest or passing score with respect to an element controller may receive a certificate or be acknowledged as qualified to represent or assist the element controller.

Example 1

Donald Trump is designated as a controller of one or more themes of test elements. Participants that provide responses to test elements that match or are at least similar to Mr. Trump's responses to the same elements a higher number of times than all other participants receive certification acknowledging them as qualified to assist or represent Mr. Trump with respect to the element themes.

Example 2

A majority of viewers is designated as a controller of one or more themes of test elements. Participants that provide responses to test elements that match or are at least similar to the majority of viewer's responses to the same elements a higher number of time than all other participants receive certification acknowledging them as qualified to assist or represent the majority of viewers or the nation to which the viewers belong.

Award

Most qualified test participants may be awarded products or product discounts.

Consideration

Participants with a highest test score may be selected or qualify to be selected to participant in a pre production, production, or post production of an event or event series. A participant's part or position in the event or series may be as an assist or representative of the element controller to which the participant has a kinship to, which was proven when the participant was able to identify and respond to elements to which the element controller has an affinity.

Consideration

A test objective (primary) may be to identify and award at least one participant most qualified to receive a prize, award, title, certificate, recognition, employment, etc. (i.e. consideration). Various means may be utilized in conjunction with matching one or more element controller's responses to identify most qualified participants especially when one or more most qualified participants are selected to receive employment such as in a future production in order to qualify the production or aspects of the production and/or event subsequent to the production as viewer controlled when all participants or a segment of participants comprises an element controller.

By allowing participants to become employed or act as an independent contractor in a future event or series production a participant's commitment level should generally be established prior to engaging the participant. When elements are presented allowing a participant to increase their prize level or commitment level and are not capitalized on by a participant the participant may be seen as not qualified or uncommitted.

Example

Prior to each test viewers are afforded an opportunity to register to participate in the process of auditioning and casting one or more hosts for the test (allowing participants to audition and cast their own host adds to a viewer/participant controlled concept) and the test as well. Those who participate in the auditioning and casting process of the one or more hosts may be seen as most committed or serious and potentially qualified when compared to those who elect not to participate in all aspects of a test when participating in all aspects is either revealed or not by a provider as a qualification prerequisite.

Consideration Based on a Percentage of Revenues

Awards provided to winning participants or qualified participants of not only element response tests but all types of games and tests may be determined by a percentage of revenue generated during or after the game or test.

By allowing participants to assist in the creation of a product or participate in a test allowing participants to respond to elements that may or may not have been incorporated into a future product, participants may be inclined to consume or purchase the products in order to increase the revenue generated by the products in order to increase the amount of awards provided when the amount of awards provided are in a direct or indirect relationship to the revenue generated by the product.

If the game show, Who Wants To Be A Millionaire, allowed members of one or more societies to participate in a game or test relating to the pre production of the game show and participants were to receive 20 percent of the revenues generated from the game show in the show's first 18 months of production, 200.MILLION DOLLARS in prizes and awards would have been received by winning or most qualified participants.

Test participants with a highest test score at the conclusion of a test series may be awarded 10 percent of revenues generated up to one week from the time the product is made available or when the product generates $100,000.00. The highest scoring or most qualified participants would share $10,000.00

In essence, awards may be a percentage of revenues generated over a period of time. The period of time may be before, during, or after a game/test series or one or more combinations of before, during, or after the game/test.

A test may provide consideration to participants before, during, or after a phase, period, or series. Consideration may include, but is not limited to: recognition, certification, a prize, an award, employment, etc.

Participants and viewers may receive consideration based on a prize pool. A prize pool may consist of a percentage of revenues directly or indirectly associated with the game or test. Products sale may be directly associated the test and may include elements presented for consumption during a commercial or within the test. Products associated with a test may be incorporated into the test as element response options. Therefore, revenue providers, test licensees, element controllers, viewers, and participants may directly or indirectly contribute to a prize pool. For example, viewers are informed that 10% of revenues generated from the sales of element response options during a period are entered into a prize pool to be offered to 1,000 participants with a highest score during the period. The element response options generate 10 million dollars in sales resulting in 1,000 participants with a highest score receiving 1000 dollars each. Another example is when viewers and participants are informed that a sponsor provided 10 million dollars in revenues to run commercials, place products into the test, and to capture marketing data and that 20 percent of the 10 million is given back to participants that are identified as in sync with the sponsor's controller. The sponsor's revenue provides 2 million dollars for the prize pool to be divided amongst 1,000 highest scoring participants.

Viewers and participants may be afforded an opportunity to purchase products directly or indirectly associated with the test at a discount. A percentage of revenues generated from discounted product sale may be entered into a prize pool.

A retailer may provide discounted products to viewers and participants to facilitate methods for participation. A percentage of revenue generated from the products may be entered into a prize pool. For example, Sony may offer discounted DVD and CD players to participants to enable viewers and participants to view and listen to element response options.

Test participants identified as in sync with an element controller may be required to participate in further testing with element response options controlled by the same or a different element controller. For example, 200,000 participants are identified as in sync with an element controller that happens to be a celebrity. The 200,000 participants may then be required to participate in a test that is controlled by a majority of viewers (non participants). Consideration may be offered to participants that are in sync with both the celebrity and the majority of viewers.

Participants consuming products prior to or during a test or game may be offered consideration of a higher value than participants that do not consume products prior to or during a test or game series. Products available for purchase prior to a test may provide an advantage to participants. For example, a test series is televised each week presenting music products as element response options. Test participants are afforded an opportunity to consume the products before and during a response session. Participants purchasing one or more of the available products relating to the test will qualify to receive consideration of a higher value than participants who do not purchase the related products. A percentage of revenue generated from the purchases products by consumers and/or test participants may be entered into a prize pool.

A revenue provider may pay a fee to garner survey data from participants. Participants who provide survey data may be offered consideration of a higher value than participants who do not provide survey data. Participants who provide data for a plurality of surveys may qualify to receive consideration of a higher value than participants who only provide less survey data. In essence, when a revenue provider pays a fee to garner marketing or direct marketing data from viewers or participants, or pays a fee for each participant that answers a survey or questionnaire, or pays a fee for a quantity of data, (viewers may be element controllers not qualified to receive consideration and participants may be element controllers who do qualify to receive consideration) a percentage of revenue generated from the revenue provider may be entered into a prize pool.

When participants are informed they may qualify to receive consideration of a higher value for providing data or performing actions that are or are not directly or indirectly related to one or more test or game objectives, a percentage of participants may provide the data or perform the actions to qualify to receive consideration of a higher value than participants who do not provide the data or perform the actions.

Currently, direct marketing spend is over 200 billion dollars per year. A revenue provider may pay 100 million dollars of revenue during 10 week test series to have a direct marketing relationship with 5 million test participants.

A company may pay a fee to acquire various types of data from test participants. Participants may be informed that a percentage of the fee is entered into a prize pool. Participants may be more likely to provide data when no prize pool or consideration is offered. This method creates a positive relationship between the company and participants.

Stocks

Participants receiving a qualifying point total may be offered shares of a test providers company or one or more companies associated with a provider. Participants who become owners or share holders may be more likely to consume products directly and indirectly associated with the one or more companies.

Response Points

Element response tests are utilized by test providers to identify test participants that are in sync with one or more controllers of elements within a test. Generally, an element response test provider or administrator requires one or more designated element controllers and test participants to submit a predetermined one or more types of responses to a predetermined number of test elements prior to an element response submission deadline. Each time a participants submitted response to an element is at least similar to an element controller's response to the same element the participant is assigned or qualifies to be assigned a point value. Participants with a highest number of points with respect to one or more elements controllers are identified by the test provider as in sync with the one or more element controllers.

A participant's response to an element may be at least similar to an element controller's response to the same element when the element controller and participants are required to submit similar types of responses to a plurality of elements. Similar types of responses may be ranking, placing, grading, judging, evaluating, and rating.

Test with Multiple Point Methods

A test may incorporate a plurality of element categories and one or more categories may utilize different response test point assignment methods. In one category participants may begin with a positive point value, another category may start participants with a negative point value, and when combined participants with a zero point value may be identified as most qualified.

In essence, a test may utilize unconventional point schemes, such as most negative points for positive consideration, most positive points for negative consideration, and zero points for positive or negative consideration.

Response Point Values

Similar response point values may be weighted according to a degree of similarity. A participant that submits a same ranking response to an element as an element controller may receive a higher point value than a participant that submits a ranking response to the same element but is one or more ranks off from the controller's ranking response. A participant that ranks the same element an element controller ranks but is two ranks off from the controller's ranking response may receive a higher point value than a participant that is three ranks off and a lower point value than a participant that is one rank off.

Example

An element response test provider presents twenty test elements. The provider instructs an element controller and test participants to rank their three favorite elements in the order of $1^{st}$ through $3^{rd}$ place. The provider informs test participants each time a participant's ranking response to an element matches the controller's ranking response to the same element the participant is assigned 20 points; each time a participant's ranking response to an element is one rank off from the controller's ranking response to the same element the participant is assigned 15 points; each time a participant's ranking response to an element is two ranks off for the controller's ranking response to the same element the participant is assigned 10 points.

The element controller ranks element one in 1st place, element two in 2nd place, and element three in 3rd place.

Participant A ranks element one in 1st place, element three in 2nd place, and element two in 3rd place. Participant A receives:
  20 response points for matching the controller's ranking response to element one.
  15 response points for ranking element two one rank off from the controller's ranking response to element two
  15 response points for ranking element three one rank off from the controller's ranking response to element three.
Participant A receives a total of 50 response points.

Participant A ranks element one in 1st place, element four in 2nd place, and element three in 3rd place. Participant A receives:
  20 response points for matching the controller's ranking response to element one.
  No response points for not ranking element two.
  20 response points for matching the controller's ranking response to element three. Participant B receives a total of 40 response points.

Therefore, participant A with 50 response points is identified as more in sync with the element controller than participant B with 40 response points even though participant A only matched the element controller's ranking response to an element once and participant B matched the element controller ranking response to an element twice.

Weighted Response Points

A test element controller's response to an element is determined by a test provider to be correct response to the element. Correct responses may be weighted according to a degree of innate response ability a participant is required to possess in order to provide a correct response to an element. Generally, a higher number of test elements available to receive a response requires participants to have a higher degree of innate response ability in order to provide a correct response when compared to a lower number of test elements available to receive a response.

Generally, when one or more of a plurality of elements are made available to receive evaluation or ranking responses, the evaluation or ranking response may be weighted.

When the test provider determines a higher number of elements qualify to receive a lowest ranking than a highest ranking the test provider may allow participants to receive a higher point value for correctly responding to lower ranking elements. When a test provider determines a higher number of elements qualify to receive a highest ranking the test provider may allow participants to receive a higher point value for correctly responding to higher ranking elements.

Example

A test provider may incorporate five related theme test elements into one element category and twenty related theme test elements into another element category. The provider may instruct an element controller and test participants to select their favorite element from each category. Participants may be allowed or required to assign them self or assigned a higher point value for correctly selecting their favorite element from the category with a higher number of elements than the category with a less number of elements.

A correct response to an element within a category with five elements may provide participants with an opportunity to receive a higher point value than a correct response to an element within a category with twenty elements when each element within the five element category requires plurality responses and one element in the element category with twenty elements requires one response.

The following is an example of how a test provider may utilize the weighted response point assignment method.

A test provider designates an element controller comprised of a majority of test participants. The provider presents twenty test elements. The provider instructs participants (through out this document the inventor includes at this point the term element controller in conjunction with test participants even when participant and element controller are synonymous) to rank five of the most appealing elements in the order of 1st through 5th place. Test participants are informed they will receive a highest point value for matching the element controllers fifth place element and progressively lower point values for matching the controllers fourth, third, second, and first place elements respectively. It is explained to participants that a higher point value is provided for matching the controllers 5th place element due to the fact that a higher number of elements qualify to receive a 5th place ranking than elements that qualify to receive a 1st place ranking.

Beginning a Test with Points (Plus and Minus)

An element response test provider may assign test participants with a number of points prior to a test. A test participant may receive a point value each time the participant provides a correct response to an element. And, a point value may be deducted from a participants beginning point total each time the participant fails to provide a correct response to a test element. Test participants with a response test point total closest to their beginning point total are identified as the most qualified test participants.

Beginning a Test with Points (Plus and Static)

An element response test provider may assign test participants with a number of points prior to a test. A test participant may receive a point value each time the participant provides a correct response to an element. And, a point value may not be deducted from a participants beginning point total each time the participant fails to provide a correct response to a test element. Test participants with a highest response test point total are identified as the most qualified test participants.

Beginning a Test with Points (Static and Plus)

An element response test provider may assign test participants with a number of points prior to a test. A test participant may not receive a point value each time the participant provides a correct response to an element. And, a point value may be added to a participants beginning point total each time the participant fails to provide a correct response to a test element. Test participants with a response test point total closest to their beginning point total are identified as the most qualified test participants.

Beginning a Test with Points (Static and Minus)

An element response test provider may assign test participants with a number of points prior to a test. A test participant may not receive a point value each time the participant provides a correct response to an element. And, a point value may be deducted from a participants beginning point total each time the participant fails to provide a correct response to a test element. Test participants with a response test point total closest to their beginning point total are identified as the most qualified test participants.

Beginning a Test with Points (Minus and Plus)

An element response test provider may assign test participants with a number of points prior to a test. A test participant may receive a negative point value each time the participant provides a correct response to an element. And, a point value may be added to a participant's beginning point total each time the participant fails to provide a correct response to a test element. Test participants with a response test point total closest to their beginning point total are identified as the most qualified test participants.

Beginning a Test with Points (Minus and Static)

An element response test provider may assign test participants with a number of points prior to a test. A test participant may receive a negative point value each time the participant provides a correct response to an element. And, a point value may not be deducted from a participants beginning point total each time the participant fails to provide a correct response to a test element. Test participants with a lowest response test point total are identified as the most qualified test participants.

Beginning a Test with Negative Points (Plus and Minus)

An element response test provider may assign test participants with a number of negative points prior to a test. A test participant may receive a positive point value each time the participant provides a correct response to an element. And, a negative point value may be added-to a participants beginning point total each time the participant fails to provide a correct response to a test element. Test participants with a response test point total closest to their beginning negative point total are identified as the most qualified test participants.

Beginning a Test with Negative Points (Plus and Static)

An element response test provider may assign test participants with a number of negative points prior to a test. A test participant may receive a positive point value each time the participant provides a correct response to an element. And, a negative point value may not be added to a participants beginning point total each time the participant fails to provide a correct response to a test element. Test participants with a lowest negative response test point total are identified as the most qualified test participants.

Beginning a Test with Negative Points (Static and Plus)

An element response test provider may assign test participants with a number of negative points prior to a test. A test participant may not receive a point value each time the participant provides a correct response to an element. And, a negative point value may be added to a participants beginning negative point total each time the participant fails to provide a correct response to a test element. Test participants with a response test point total closest to their beginning negative point total are identified as the most qualified test participants.

Beginning a Test with Negative Points (Static and Minus)

An element response test provider may assign test participants with a number of negative points prior to a test. A test participant may not receive a point value each time the participant provides a correct response to an element. And, a positive point value may be added to a participants beginning point total each time the participant fails to provide a correct response to a test element. Test participants with a response test point total closest to their beginning point total are identified as the most qualified test participants.

Beginning a Test with Negative Points (Minus and Plus)

An element response test provider may assign test participants with a number of negative points prior • to a test. A test participant may receive a positive point value each time the participant provides a correct response to an element. And, a negative point value may be added to a participants beginning negative point total each time the participant fails to provide a correct response to a test element. Test participants with a response test point total closest to their beginning point total are identified as the most qualified test participants.

Beginning a Test with Negative Points (Minus and Static)

An element response test provider may assign test participants with a number of negative points prior to a test. A test participant may receive a positive point value each time the participant provides a correct response to an element. And, a point value may not be deducted from a participants beginning point total each time the participant fails to provide a correct response to a test element. Test participants with a highest response test point total are identified as the most qualified test participants.

Beginning a Test with Zero Points (Plus and Minus)

An element response test provider may not assign test participants with a number of points prior to a test. A test participant may receive a point value each time the participant provides a correct response to an element. And, a point value may be deducted from a participants beginning point total each time the participant fails to provide a correct response to a test element. Test participants with zero response points are identified as the most qualified test participants.

Beginning a Test with Zero Points [Standard] (Plus and Static)

An element response test provider may not assign test participants with a number of points prior to a test. A test participant may receive a point value each time the participant provides a correct response to an element. And, a point value may not be deducted from a participants beginning point total each time the participant fails to provide a correct response to a test element. Test participants with a highest response test point total are identified as the most qualified test participants.

Beginning a Test with Zero Points (Static and Plus)

An element response test provider may not assign test participants with a number of points prior to a test. A test participant may not receive a point value each time the participant provides a correct response to an element. And, a point value may be added to a participants beginning point total each time the participant fails to-provide a correct response to a test element. Test participants with zero response test points are identified as the most qualified test participants.

Beginning a Test with Zero Points (Static and Minus)

An element response test provider may not assign test participants with a number of points prior to a test. A test participant may not receive a point value each time the participant provides a correct response to an element. And, a point value may be deducted from a participants beginning point total each time the participant fails to provide a correct response to a test element. Test participants with zero response test points are identified as the most qualified test participants.

Beginning a Test with Zero Points (Minus and Plus)

An element response test provider may not assign test participants with a number of points prior to a test. A test participant may receive a negative point value each time the participant provides a correct response to an element. And, a point value may be added to a participants beginning point total each time the participant fails to provide a correct response to a test element. Test participants with zero response test points are identified as the most qualified test participants.

Beginning a Test with Zero Points (Minus and Static)

An element response test provider may not assign test participants with a number of points prior to a test. A test participant may receive a negative point value each time the participant provides a correct response to an element. And, a point value may not be deducted from a participants beginning point total each time the participant fails to provide a correct response to a test element. Test participants with a highest negative response test point total are identified as the most qualified test participants.

Example 1

A controller ranks element number ten in first place and a participant ranks the same element in fifth place. The participant's response to the element ten is four responses off from the controller's response to the same element. The participants may assign them self or may be assigned a four off point value.

Example 2

Element controllers and participants are required to utilize the universal 1.0 to 10.0 scale to rate a plurality of test elements. Participants may assign them self or may be assigned a point value each time a response to an element matches or is at least similar to an element controller's response to the same element. Participants are informed a response that is ten tenths or 1.0 off from the controller's response to the same element is the farthest off a response to the element may be and still allows the participant to assign them self or be assigned a point value. Participants are informed the highest point value possible is a match point value and the lowest point value possible is a ten off point value.

A controller evaluates/rates element number nine with a 7.9 and a participant rates element number nine with an 8.4. The participant's response is to element number nine is five off or five tenths from the controller's response to element number nine. Therefore, the participant is allowed to assign them himself or is assigned a five off point value.

Point Assigned Upon Registration

Test participants may be afforded an opportunity to receive points prior to a test by performing one or more tasks requested by the test provider. Participants may be presented with a survey or questionnaire during a test registration or at the beginning of a test period. Those who complete the survey or questionnaire may receive a beginning point value or may be allowed to participate in a higher level test with consideration of a higher value than participants who refuse to fill out the survey or answer the questionnaire.

Free Response Points

Test participants may be presented with various free point element categories. A free point element category allows a participant to receive a point value for simply responding a number of one or more elements within the category. For example, a revenue provider may incorporate a plurality of elements into a free point element category. The elements within the category when responded to by a number of participants may provide the revenue provider with direct marketing data.

Captive Points

A test participants assigned point values may be held captive until the participant perform one or more tasks which may or may not be relative to the test. By performing the one or more tasks the participants captive point values may be released.

The various point assignment methods explains within this document may utilized in, but not limited to: games of chance, other games of skill, and other tests requiring objective and subjective responses.

Matching/Pairing Point Value

Element controllers and participants may be required to match one or more elements to or with one or more other elements from a same or one or more other element categories in order to receive a matching or pairing point value.

The fact that participants with a highest test point total qualify or qualify to be selected to assist or represent an element controller and draw a salary in the process shows that an element response test requires innate response ability or skill on a higher level than all other forms of interactive games and tests.

The test may allow a controller or an entity comprising a controller to receive a point value each time the controller or entity responds to an element within a period that matches, nearly matches, or is at least similar to an entity, a plurality of entities with one voice, a segment of a plurality of entities, a percentage (generally a majority) of a segment of a plurality of entities, a percentage of a segment of a segment of a plurality of entities, etc.

Match Points

An element response game participant may receive a match point value each time the participant's response to an element matches a controller's response to the element.

Near Match Points

An element response game participant (viewer or entity comprising an element controller) may receive a near match point value each time the participant's response to an element is one response type from a controller's response to the element.

Regressive Near Match Points

An element response game participant may receive a regressive near match point value each time the participant's response to an element is two or more response types from a controller's response to the element.

A correct or almost correct response to an element is determined by an element controller's response to the element.

For Example:

8 element response options are presented.

An element controller and element response game participants are instructed to rank 4 of the 8 elements in the order of 1st thru 4th place.

| Rankings | Controller | Participant | Points |
| --- | --- | --- | --- |
| $1^{st}$ place | Element 1 | Element 1 | X |
| $2^{nd}$ place | Element 4 | Element 2 | X-A |
| $3^{rd}$ place | Element 2 | Element 3 | 0 |
| $4^{th}$ place | Element 5 | Element 4 | X-B |

The participant ranked element 1 in 1st place and the controller ranked element 1 in 1st place. The participant's response to element 1 matches the controller's response to element 1. The participant receives a match point value of X.

The participant ranked element 2 in 2nd place and the controller ranked element 2 in 3rd place. The participant's response to element 2 is 1 rank off from the controller's response to element 2. The participant receives a near match point value of X–A.

The participant ranked element 3 in 3rd place and the controller ranked element 2 in 3rd place. Since the controller did not respond to element 3 the participant receives no points.

The participant ranked element 4 in 4th place and the controller ranked element 4 in 2nd place. The participant's response to element 4 is 2 ranks off from the controller's response to element 4. The participant receives a regressive near match point value of X–B.

The participant ranked element 1 in 1st place and the controller ranked element 1 in 1st place: The participant's response to element 1 matches the controller's response to element 1. The participant receives a match response point value of X.

The participant ranked element 2 in 2nd place and the controller ranked element 2 in 3rd place. The participant's response to element 2 is 1 rank off from the controller's response to element 2. The participant receives a closest or most similar response point value of X–1.

The participant ranked element 3 in 3rd place and the controller ranked element 2 in 3rd place. Since the controller did not respond to element 3, the participant receives no points.

The participant ranked element 4 in 4th place and the controller ranked element 4 in 2nd place. The participant's response to element 4 is 2 ranks off from the controller's response to element 4. The participant receives a close or similar response point value of X–2.

The participants point total=$X+(X-1.)+0+(X-2)$

When variable X is 5 the participant's point total is 5+4+0+3=12.

Therefore,

The participant received a highest point value for matching the controller's response to an element and regressive point values for closely, similarly or almost matching the controller's responses to an element.

The participant is 1 rank off from the controller's 2nd place element to receive 5–1 points.

The participant did not respond to the controller's 3rd place element and receives 0 points.

The participant is 2 ranks off from the controller's 4th place element and receives 5–2 points.

When variable X is 5 the participant's point total is 5+4+0+3=12.

Total=$X+(X-1)+0+(X-2)$

The participant receives:

A match response point value for matching the controller's 1st place element;

A close or similar response point value for almost matching the controller's 2nd place element;

And, no points for failing to respond in a manner that is at least similar to the controller's 3rd place element, of the 8 elements that are most qualified to become element response options during a subsequent period.

Match Response Points Vs. Similar Response Points

Participants may receive a point value for matching a controller's response to an element response option. This type of response may be referred to as a match response.

Participants may also receive a point value for almost matching a controller's response to an element. This type of response may be referred to as a close or similar response and may be of a lesser value than a match response for responding to an element.

An element response game provider may allow participants to receive a point value each time the participant's response to an element is at least similar, or within a regressive limit, to an element controller's response to the same element.

Generally, when participants receive a point value each time a response to an element is close or is at least similar to an identified element controller, the participant responds to elements with objectivity. When participants receive a point value each time a response to an element is close or is at least similar to a mystery controller, the participant responds to elements with subjectivity.

Objective and Subjective Response Points

When an element category has at least one identified controller and at least one mystery controller, participants may be required to provide one or more objective responses to one or more element and subjective responses to one or more elements within the same category. Participant's objective response points and subjective response points may result in a combined point total. Participant's objective and subjective points may not be combined resulting in separate point totals.

With a plurality of element controllers, the plurality of controllers for the one or more categories may be identified before an element response session or element response submission deadline. One or more of the plurality of controllers for one element category may be identified controllers and one or more other controllers for the same category may be mystery controllers. When an element category has at least one identified controller and at least one mystery controller, participants may be required to provide one or more objective responses to one or more element and subjective responses to one or more elements within the same category. Participant's objective response points and subjective response points may result in a combined point total. Participant's objective and subjective points may not be combined resulting in separate point totals.

An element response game participant may win an award for, but not limited to, receiving the:
Highest objective point total for one or more categories
Highest subjective point total for one or more categories
Highest objective and subjective point total for one or more categories
Highest objective point total for one or more categories combined with a highest subjective point total for one or more other categories
Highest objective and subjective point total for one or more categories and a highest objective point total for one or more other categories
Highest objective and subjective point total for one or more categories and a highest subjective point total for one or more other categories Points A provider may allow a participant to receive a free match or point value for simply responding to an element. This may be an effective way of gathering subjective response data, but is less enjoyable than revealing an element control the participant may qualify to assist or represent because of the subjective response.

Element response game participants may be assigned a match or point value each time a response to an element is at least similar to an element controller's response to the element.

Participants with a highest match or point value may qualify to be selected to assist or represent the element controller during a subsequent or future event or series of events.

Points

Generally a match or point value is assigned to an element response game participant each time the participants response to an element is at least similar to an element controller's response to the element.

The types of responses to elements may be determined by a game provider. The types of response to elements may be predicated upon the data or response information the provider intends to garner. (see uploading responses into an element response game/test system) Generally, response types may be positive, evaluating, ranking, or negative. Each type of response may have a plurality of variations. For example, a positive response may be good, very good, or excellent. An element response game participant may be assigned a match or point value to an element when the participants response to the element is at least similar or is at least the same type as the element controller's response to the element.

For example, an element controller response to an element may be excellent. An element response game participant's response to the element may be good. The participant's response and the controller's response may be considered to be at least similar when the responses are the same type.

A participant maybe assigned a higher match or point value when a response to an element is an exact match to the controller's response to the element. A participant may receive a match or point value of a lower value than an exact match when the response is at least similar or a similar type.

A participant may be assigned a perfect score for elements in one or more categories or sub categories. Each time a participants response to an element matches or is at least similar to a controllers response to the element the participant may keep the assigned points. Each time a participant fails to match or response in a similar mariner, the participant may have points deducted. A less point deduction may occur when the participant response is of a similar type and a higher point value may be deducted for a different type.

Generally, an element controllers element response submission deadline is after an element response game participant's element response submission deadline. When an element controller is a segment or a majority of element response game participants, the element controllers element response deadline and the participant's element response deadline coincide.

Response Test Points

A test participant may receive a point value each time the participant responds to an element.

A test participant may receive a point value each time the participant submits a response to an element.

A test participant may receive a point value each time the participant submits a number of response to an element.

A test participant may receive a point value each time the participant submits a response to a number of elements.

A test participant may receive a point value each time the participant submits a number of response to a number of elements.

A test participant may receive a point value each time the participant submits a positive response to an element determined by a test provider to be qualified or suitable according to an expressed qualifying or suitability criterion.

A test participant may receive a point value each time the participant submits a positive response to an element determined by an element controller to be qualified or suitable according to an expressed qualifying or suitability criterion.

A test participant may receive a point value each time the participant submits a negative response to an element determined by a test provider to be unqualified or least suitable according to an expressed qualification or suitability criterion.

A test participant may receive a point value each time the participant submits a positive response to an element determined by an element controller to be unqualified or least suitable according to an expressed qualification or suitability criterion.

A test participant may receive a point value each time the participant submits a response to an element that is revealed during a future event.

Lowest Point Totals

Test participants may have points deducted for providing or submitting incorrect responses to elements. Participants with a lowest point total or a lowest point range may be eliminated or dismissed from a test event, event segment or event series and/or may not qualify to participate in one or more subsequent test events, event segments or event series.

Bonus Points

Bonus points may be assigned to a participant with a perfect score for a test, test phase, test period, test series, or a category within the test, test phase, test period, or test series.

Bonus Points

Test participants assigned a perfect test score, a highest test score, or a test score within a range may be assigned bonus points. Participants who participate in one or a predetermined number of test periods may receive bonus points.

Team Participation

Teams may consist of groups of individuals participating with a network such as the NTN network available at restaurants and pubs.

Team Participation

A test may require team participation when two element controllers are utilized for one element category. Each team may be comprised of two participants. One team member may be assigned to one element controller and the other team member may be assigned to the other element controller. When each member is in sync with their assigned controller the team may qualify to receive consideration.

Printed and Electronic Response Recording and Response Point Calculation Systems Generally element response period and test providers afford entities comprising element controllers, primary, secondary, and ancillary test participants and viewers (listeners when applicable) access to one or more electronic and/or printed personal element response recording, personal and controller's element response database, and personal response point calculation systems for one or more periods. The printed systems may be utilized for a plurality of periods or games/tests. Some electronic or printed system users may be allowed to utilize one or more element response platforms for response submissions.

Printed System

The printed test system includes two sub systems. The first sub system is an element evaluation and personal response recording system. The second sub system is a personal and element controller response recording, and response point calculation system.

Business Applications

Employee and Applicant Testing

Domestic and international businesses may take a particular interest in element response tests whereas one or more designated element controllers for elements within a particular test may be comprised of members of one or more societies or one or more segments of one or more societies to which the businesses provide or target entertainment, products, consumables, services, news, data, and etc. The businesses may wish to identify employees or applicants with an ability to objectively or subjectively respond to elements within an element response test in a manner that is at least similar to one or more controllers of elements within the test. Businesses may also be interested in element response tests Individuals and teams seeking employment with various businesses may identify themselves or be required to identify themselves as in sync with one or more element controllers when an element controller is comprised of entities a business targets.

Individuals and teams with an ability to be in sync with an element controller may have a higher value to the company than those not in sync with an element controller.

Example

An animated film production company is preparing to enter into a pre production phase for a new animated film. The film will target consumers of animated films and animated characters. The company announces a search for animated character and product designers and character and product casting directors who are in sync with consumers and fans of animated films, characters, and products. Twice a year an element response test provider with an exclusive one year license conducts a search for "The Worlds Favorite Animated Characters" and "The Worlds Most Qualified Animated Character and Product Casting Directors". The element response options incorporated into the test are various types of animated characters and products. The element controllers designated to control elements within the test are entities comprised of current and future fans and consumers of animated films, characters, and products. The company prepares to engage those who can prove they are able to identify and respond to the element controllers favorite animated characters and products in a manner that matches or is at least similar to the element controller. Therefore, the company's next animated film team will consist of test participants who are in sync with the companies target audience and consumer base. Due to the cute throat nature of the entertainment businesses the company and many others will form teams of IP design around experts in an attempt to produce their own element response tests that closely resembles but does not infringe on the patents, copyrights, trademarks, and various program format registrations of the test. But, when the company an all others come to realize the inventor went not only the extra mile but an extra million miles to protect not only the basic systems, methods, and format of the test but all commercially viable permutations the company and all others will then be compelled to participate in a bidding war to garner a lifetime exclusive license once the current licensees one year license agreement expires.

Due to the unlimited types of elements that may be incorporated into element response games/tests, and the various types of targeted viewers and consumer that may be designated to control elements within the games/tests, companies that provide elements to or capture data from viewers and consumers will benefit by developing a relationship with element response test licensees or becoming element response test licensees which will ultimately result in developing relationships with and providing consideration to viewers and consumers throughout the World in a manner never before offered.

Various businesses that may benefit from developing relationships with element response game/test licensee or becoming element response test licensees include, but are not limited to:

Television Networks
Television Production Companies
Film Production Companies
Video Production Companies
Music Labels
Radio Stations
Print Media Publishers
Advertising Agencies
Gaming Producers
Retailers
Wholesalers
Service Providers
To Name a Few . . .

Companies within virtually all fields of business may identify current employees and future applicants who are qualified to directly or indirectly represent the needs and desires of targeted consumers.

Employees in sync with the one or more element controllers may receive or qualify to receive bonuses and/or salary increases.

Employees not completely in sync with the one or more element controllers may receive or qualify to receive training to become more in sync with the one or more element controllers. Employees with an average point total may not receive or may not be selected to receive bonuses or salary increases.

Entertainment companies may wish. to identify various executives/employees with a lowest point total for an element response test phase, period, series of periods, or series of series with respect to one or more element controllers. Employees oblivious to the expressed desires and needs of the one or more element controllers may qualify to be put on probation, fined, or released from the company.

Employee Testing

Business executives and employees with a highest response test point total with respect to one or more element controllers as a result of one or more response sessions may receive company bonuses or a salary increase.

Business employees with a highest response test point total with respect to one or more element controllers as a result of one or more response sessions may qualify to become executives.

Business executives and employees with a lowest response test point total with respect to one or more element controllers as a result of one or more response sessions may not receive company bonuses or a salary increase'.

Business executives and employees with a lowest response test point total with respect to one or more element controllers as a result of one or more response sessions may be put on probation, fined, or released from the business.

Business executives and employees with a highest response test point total with respect to one or more element controllers as a result of one or more response sessions may be hired as executives or executive consultants.

The above businesses may be directly or indirectly related to an industry with a consumer base. For example, a few businesses that would benefit by identifying executives, employees, and application that are in sync with a consumer base may those in the entertainment industry or those who provide data to the entertainment industry.

Business Employees and Applicants

An element response test enables an employer or employer representative to identify employees and applicants with an objective, subjective and/or innate ability to respond to elements in a manner that is at least similar to one or more element controllers. Generally, a most effective element controller for this purpose is one who is comprised of the employer's consumer base or target audience.

Example

The employer or employer representative directs or affords applicants access to an element response system. The system presents to the applicants a plurality of element response options controlled by the employer's consumer base. Each applicant receives a point value each time a response to an element is at least similar to the element controller's responses to the same element. One or more applicants with a highest point total are determined to be the most qualified to represent the element controllers.

Therefore, an element response test ultimately results in an element controller determining the most suitable test elements and identifying participants most qualified to represent the element controller.

Applicant Interview and Hiring System

Another embodiment of the inventions may enable employers to interview company applicants without direct interaction. A plurality of applicants may provide photos and bios to an employer. The employer's administrator may upload applicant's photos and bio into the company's interview and hiring system. The employer may select a plurality of the most qualified applicants and choose plurality business situations or problems selected applicants would be required to define or find solutions to. The applicants may be informed electronically of the business situations and problems and define situations or provide solutions in the way of text or videos. The employer may RATE selected applicants definition or solution to each problem by giving each applicant a grade. The employer may hire the applicant with the highest grade or invite 2 or more applicants with the highest grades to be interviewed in person. Therefore, the inventions may provide employers with a way to interview and qualify the top applicants in a time effective manner.

Personnel Review and Promotion System

Another embodiment of the inventions may enable employers to review and promote company employees. The employer's administrator may upload employee's photos, upgraded bios, accomplishments and reprimands into the company review and promotion system. The CEO may select a plurality of the most qualified employees and choose a plurality of business situations or problems for selected employees to define or find solutions to. The employees may define situations or provide solutions in the way of text or video demonstration. The CEO may RATE selected employees definition of each situation or solution to each problem by giving each employee a number or letter grade. The CEO may promote the employee with the highest grades or invite 2 or more employees to compete for the promotion through a series of alternate tasks the.CEO may rate. Therefore, the inventions may provide employers with a way to review and promote employees in a more effective manner.

Advertisement and Promotion Tool

A test objective may be to promote and market a product or consumable. Movie studios generally spend between 50 and 100 million for World wide promotion of a movie (consumable). An element response test incorporating movie or film elements is not only a World wide promotional tool but a revenue generating promotional tool when revenue providers are brought into the test equation. Therefore, a test may be referred to as a "Revenue Generating Promotional Tool" (RGPT).

Element response tests are poised to become a standard tool for consumable producers to generate revenues during a consumable branding period and allow revenue providers to develop a relationship with consumers on a level never before offered.

Tests Resulting in Consumables

A test may result in manufacturing or producing products, such as, automobiles, shoes, Television programs, Television game shows, films, video games, songs, and etcetera. The resulting product may be different for each society, territory, continent, etc. when a product manufacturing or producing controller (i.e., element controller) is comprised of members of one or more societies or members of one or more segments of one or more societies.

Example

A test is offered with an objective of allowing participants to controller and participate in the production of a music CD by a soon to be World famous artist "FRICTION". Element response options are music beats, lyrics, and CD cover design. The test is licensed to a producer/provider within each continent. All providers designate a majority of participants within their respective continent as an element controller for the beats, the lyrics, and the CD cover design. The controller from each continent may determine their favorite beats, lyrics, and CD design which may be the same or different from other controllers within other continents. Therefore, the music and art may be tailored to the desires of a majority of participants from each continent. Therefore the music artist and associated label would have an advantage over other artists and labels not utilizing this method of tailored production.

This method may also apply to various segments (graphics) within a society.

By allowing members of different parts of the World to participate in their own music production the music produced for members within each part of the World may have a higher consumption rate than music produced for all parts of the World.

Assistant and Representative Testing

Participants contracted or employed to participate in a future production as an assistant or representative to one or more element controller may be required to pass an element response test during or after their participation in order to qualify to remain contracted or employed.

Most Qualified Test Participant Attrition

A provider may allow or require participants to take part in a succession of periods or series of a succession of periods in order to achieve a suitable or manageable pool of most qualified participants to select from to receive an award or consideration. When a test is comprised of a plurality of phases or periods, each phase or period may result in a number of winning or most qualified participants as a result of each phase or period that qualify to win or receive a prize, award, consideration, and etc. Each successive phase or period prize, award, consideration, etc. may be of a higher value than a previous phase or period. Each phase, period, or series results in or achieves a lesser number of winning or most qualified participants and will eventually result in a desired or manageable number of winning or most qualified participants.

For example, a primary test and an ancillary test associated with the primary elements of the primary test may exist. The two tests may each utilize one observation platform. Primary test participants are allowed to participate in the ancillary test. Therefore, primary and ancillary test participants utilize the same observation platform. The primary test participants with a lowest point total as a result of each period of a series of periods are disqualified from participating in a subsequent period. The ancillary test allows random period participation whereas participants with a highest point total for each period and all periods combined qualify to receive or qualify to be selected to receive consideration. Therefore, participants disqualified from the primary test prior to a final period will still have an incentive to remain viewers of the observation platform by remaining ancillary test participants or becoming new ancillary test participants.

Although the number of primary test participants has been reduced throughout the series, the number of viewers of the observation platform may remain constant.

Test Tie Breakers or Attrition Methods Sweepstakes
Drawings
Additional Game/Tests
Revenue Providers When a test licensee engages a revenue provider with an ability to reach consumers, the revenue provider may not only promote the test they are part of but also promote the one or more consumables resulting from the test. For example, a test provider allows McDonalds to become a revenue provider. McDonalds may directly or indirectly provide revenues. McDonalds may directly provide revenues by paying a sponsorship fee. McDonalds may indirectly provide revenues by advertising the one or more consumables within the test in each of their stores. McDonalds currently has over 20 million customers everyday. During a period of one week, providing each customer visits McDonalds only once a week, McDonalds may have the ability to advertise tests and related consumables to over 140 million potential test element consumer and test participants. If one percent of McDonalds weekly customer base (14 million) registers to become a test participant as a result of McDonalds advertising the test, another revenue provider, such as Nike, may now provide revenues based on a number of participants (14 million) from which to capture data to element response options incorporated into the test by Nike. Therefore, McDonalds is an indirect provider of revenues and Nike is a direct provider of revenues. In essence a synergy has been created between two revenue providers and consumers.

Television Programming with Imbedded Element Controllers

Producers and providers of Television programming with elements receiving a response by an element controller within the programming (think "The Apprentice" or "The Bachelor") may provide viewers with a test wherein the test provider may designate an element controller other than the controller within the programming which may result in a set of one or more winning elements when the controller within the programming and the controller designated by the test provider both determine winning elements.

Example

A provider of a reality program series based on an element controller determining a regressive number of winning element finalists during each period of the series prior to broadcasting each period may allow viewers to participate in a test with an element controller other than the element controller the series is based on in order to eliminate a chance of fraud.

Current Types of Events and Series with Imbedded Element Response Options and Element Controllers Currently, several Television series exist which are based on allowing an element controller to provide responses to element response options to elements within the program series. Programs such as "Joe Millionaire", "The Bachelor", "The Bachelorette" and "The Apprentice" to name a few, allow viewers to observe an imbedded element controller within the program to determine which elements within the program are most qualified with respect to at least one program objective. Each of these programs are finished taping prior to allowing viewers to observe the program, wherein viewers are observing a response session that has already been completed. If viewers were allowed to respond to elements within the program after the element controller, some viewers would have the privilege of knowing the element controllers response prior to the broadcast of the program. Therefore, these programs are not capable of allowing viewers to participate in an element response game based on matching the imbedded element controller's responses to elements but are capable of providing other types of element response tests. For example, each existing and future program with an imbedded element controller and element response options may allow viewers to participate in element response tests by designating one or more other element controllers to provide one or more responses to element response options within each program. One of the one or more other element controllers may be comprised of a majority of viewers. For example, NBC, the network on which "The Apprentice" is broadcast becomes an element response test licensee in order to allow viewers to participate in "The Apprentice" as if they were Donald Trump. NBC or the Donald may designate a majority of American viewers as an element (apprentice hopeful) controller. The element controller and test participants vote out their least favorite or the least qualified apprentice hopeful each week. During the next program Donald Trump says to one unlucky apprentice hopeful "Your Fired" and the majority of viewers say to one apprentice hopeful "Your Fired". The apprentice hopeful that Mr. Trump fires goes home and the apprentice hopeful the majority of Americans fired may or may not go home, but, viewers in sync with the majority of viewers, i.e. the element controller, assign themselves or are assigned a point value for matching the element controller's response. One or more test participants with a highest point total, i.e., in sync with the element controller, at the conclusion of the apprentice series may be selected or qualify to be selected to participate in a future production as a representative of the majority of American viewers.

When Mr. Trump reads this application he may be motivated to rearrange aspects of the execution of each show to prevent knowledge of his firing decisions in order to allow a nation to participate in the voting process with the Donald himself as the element controller. As a result, viewers in sync with Mr. Trump's firing decisions but a plethora of other types of responses as well, may qualify to become an apprentice hopeful candidate or an assistant to Mr. Trump. Viewers identified as in sync with the Donald may be offered opportunities that have yet to be thought of.

Utilizing Elements from Past Events and Series as Element Response Options for Future Tests Elements within or inserted into past events and series may be utilized as element response options or response elements for future tests. For example, the owner for the rights to "I Love Lucy" may license an element response test system, method, and format. The licensee may then extract element response options from one or a series of episodes. The licensee may then designate an element controller for extracted elements. Participant may then win prizes and awards for responding to extracted elements from past "I Love Lucy" episodes in a manner that is at least similar to the element controller.

Test System and Element Downloading

Test participants utilizing various observation and response platforms including, but not limited to, ITV, Internet, and Web connected DVD and CD, may be allowed to download test systems and/or element response options.

Game Show Concept

An element response test/game show may require element controllers to respond to elements while connected to a lie detector.

Test Levels

Test participants identified as most qualified from one test may be required to participate in a subsequent or series of subsequent tests in order to achieve a manageable number of most qualified participants.

Response Platform Response Capacity

Prior to a response platforms response capacity is exceeded registering participants may be directed to one or more other response platforms.

Tests with Multiple Audio Platforms
Tests with Multiple Audio and Visual Platforms
Tests with Multiple Visual Platforms A test utilizing a plurality of observation platforms may have revenue providers incorporating elements into all or specific observation platforms.

An observation platform may afford participants with a code or indicia to allow a participant to identify them self as observer of one or more observation platforms. For example, participants viewing one or more observation platforms may be allowed or required to input a code into a response platform which identifies the observation platform(s) utilized by the participant's. A participant utilizing a specific observation platform, such as DVD, may qualify as a higher or lower level participant with prizes and awards of a higher or lesser value.

Participants proving they utilize a plurality of observation platforms may qualify to receive consideration of a higher value than participants who utilize fewer observation platforms.

Various observation platforms may have one or more coordinated response platforms. A revenue provider may wish to identify a number of participants utilizing an observation platform to which the revenue provider is associated.

One or more response platforms may incorporate one or more element response options unique to the one or more response platforms.

One or more response platforms may be associated with revenue providers unique to the one or more response platforms.

One or more test observation platforms may have a plurality of response platforms each with a different administrator.

Example

An observation platform may be network Television. Participants may be afforded a choice of available response platforms. The response platforms are IN and Internet. The ITV response platform has two specific revenue providers. The two IN revenue providers are allowed incorporate element response options into the response platform for participants to respond to in conjunction with the element response options presented on network Television. The Internet response platform has one revenue provider other than the one of the two ITV revenue providers.

Generally, a test observation platform presents elements that satisfy one or more primary objectives. When a plurality of response platforms are available, each platform will generally allow element controllers and participants to provide a predetermined required one or more types of responses to a predetermined required number of elements in order to satisfy the one or more primary objectives. Primary objectives may be determined by one or more businesses or entities associated with the test. One or more response platforms incorporating element response options not available on other response platforms may allow participants to receive prizes or awards associated with the elements unique to the one or more platforms. In essence, each response platform may provide a unique test. Participants may be incentivized to seek as many response platforms as possible in order to qualify to win prizes and awards associated with each platform.

Companion Test

Individuals seeking a companion, mate, or date may wish to participate in companion test. A companion test provider may utilize one or more observation platforms and a plurality of element response platforms to identify participants most in sync with a companion test element controller. Generally the provider will maintain a companion test element controller a mystery in order to ensure participants provide subjective responses to elements. Sometime after a response submission deadline one or more mystery controllers are revealed. Participants with a highest point total with respect to being in sync with one or more controllers are presented to the one or more controllers for companion consideration.

Example

A companion search test provider presents a plurality of element categories and within each category is a plurality of element response options. Element categories include apparel, cloths washing methods, hygiene methods and frequencies, jewelry, child rearing methods, automobiles, shoes, and vacation destinations. The provider designates a plurality of qualified females and qualified males seeking a companion as mystery controllers for elements within each category. The provider affords a plurality of individuals an opportunity to become companion search test participants. Various criteria are established to identify most suitable companion search test participants for each controller. The criterion is a fee and background check. Designated mystery controllers and qualified participants are afforded access to one or more test systems. Controllers and participants submit a required type of responses to a required number of elements prior to an element response submission deadline. Each mystery controller and their respective responses to elements are revealed to test participants sometime after the response submission deadline. Controllers are afforded an opportunity to contact participants in sync with their responses.

The companion test provider may also incorporate element response options into a plurality of tests for individuals and teams not qualified or interested in becoming companion search test participants.

Mate Search

A function of an element response game/test may be to allow an element response game/test provider or administrator to identify participants most qualified to assist, represent, escort, date, marry, or receive recognition or certification for being qualified to assist, represent, escort, date, or marry one or more element controllers of the game/test or one those who are similar to the one or more element controllers.

Response Cards

Two Part Element Response Cards

An element response test may utilize two part response cards. The response cards may be purchased at a retail outlet or incorporated into a publication.

The response cards consist of card A and Card B. Card A and card B are similar. Both card A and card B allow participants to input responses to element response options. The element response options are presented on one or more media.

Card B also allows participants to input a controller's responses to elements and to calculate self assigned point values.

Upon evaluating element response options participants input responses to element into card A and then transfer responses from card A to card B. Participants purchase an element response test ticket with card A prior to a card A response submission deadline. Sometime after the deadline a controllers responses to elements and a qualifying point total are revealed. Participants input the element controller responses into card B. Each participant utilizes the response point calculation system on card B to assign themselves a response point total. If a participants assigned point total meets or exceeds a qualifying point total the participants submits their ticket to receive or qualify to receive consideration.

Participants may be required to accumulate a plurality of qualifying tickets to receive or qualify to receive consideration.

Test Card Method

Members of one or more societies are afforded access to a two card response system. The two card response system may be printed or electronic. Each card, card A and card B, provides an area representing a plurality of elements associated with an ERG/T. Participants utilizing the two card system and method are required to mark areas on card A representing a required number and type of responses to a required number of elements. Participants are then required to record responses made on card A onto card B. Participants are required to submit card A to the ERG/T provider prior to a card A submission deadline.

The provider receives responses from at least one controller and identifies A cards that meet or exceed a qualifying number of matches or point total.

The provider affords participants access to the at least one element controller's responses and informs participants of the qualifying number of matches or response point total.

Participants compare the controller's responses to the responses they recorded on card B which is identical to their responses submitted to the provider on card A.

Participants with a qualifying number of matches or point total are required to submit card B or communicate their qualifying number of match or point total prior to a deadline.

The provider compares submitted B cards or communicated match or point total with qualified A cards. Winning or most qualified participants are contacted or posted.

The two card response system and method may have a code or key.

Response Card Test

A response card test may include both a response test and a lottery type game, wherein participants may be required to have a qualifying test score to win the lottery or may be required to win the lottery to receive test consideration.

Card Test Data

Data captured from an element response card test may allow a test provider to designate a majority of card participants as an element controller for the card test and/or one or more other types of tests to which the card test is associated.

Lotto Card Type Games

Lotto type games allow an element response period provider or associated element response game administrators to utilize elements presented during the period as lotto type game elements. The provider utilizes one or more observation platforms to present a plurality of elements from one or more categories to viewers. Generally, observation platforms may be Television, video (DVD, CD, etc.), or printed material. Viewers are afforded electronic or printed material to respond to a required number of presented elements. An example of an electronic platform may be interactive Television. An example of printed material may be a publication and a card picked up at a retail outlet or received by mail. A viewer may or may not be required to register to become a participant.

The following is an example of an element response lotto type game not requiring participant to register.

An element response game provider presents a plurality element response options on printed material at a multiplicity of retail outlets. The printed material also identifies each element by a number. The printed material also identifies an element controller. A lotto type card with numbers corresponding to each element on the printed material is attached to the printed material or is made available at the retail outlet location. Participation instructions are placed on the printed material and/or the card. Participants are instructed to rank (respond) a required number of elements and each time a ranking matches the element controllers ranking the participant is awarded a point value. Each time a ranking for an element is one rank off from the controller the participant receives a point value less than a matching point value. Each time a ranking for an element is two ranks of from the controller the participant receives a point value less than a one rank off point value. A date and time the element controller's responses will be revealed is provided. A date and time of a response submission deadline is provided. The printed material and/or card utilize an element response point calculation system. The system allows a participant to determine a point value based ranking for responses that are matching, one rank off, or two ranks off from the controller's responses. A participant with a perfect score receives a prize or award of a highest value. A participant with a less than perfect score receives a prize or award of a lesser value than a perfect score. A plurality of prize or award levels may exist. (see lotto type card FIGS. 15A thru 17F.)

The above example may also utilize various observation platforms with or without printed material. For example, element response period available on Television or video may allow viewers to evaluate element response option more effectively than one or more images of each element presented on printed material.

The provider also affords access to one or more lotto type cards with numbers representing or corresponding to the elements presented on the printed material. A viewer of the elements on the material is afforded the opportunity to respond to a required number of the elements before a response deadline.

Test Requiring Element Matching or Pairing

A test may require one or more element controllers and participants to match or pair elements. Each time a participant matches or pairs one or more elements to one or more other elements in a manner that is at least similar to an element controller the participant may be assigned a point value.

Response Platform

An element response platform may have a limited participation capacity. A response platform may afford priority to targeted participants. A number of participants targeted or not, may exceed a response platform participation capacity. A predetermined number of participants may be allowed to register when registration is required or necessary. When the predetermined number is met those who wish to become participants may be directed to one or more alternate response platforms.

Viewers desiring to utilize a specific response platform may be directed to one or more alternate response platforms when the desired platform has reached a registration capacity.

A response platform targeted at specific viewers/consumers may provide a registration period prior to allowing non targeted viewers/consumers to register.

Generally, at least one response platform is utilized by a provider for element controllers to utilize when at least one element controller is a percentage of participants or a percentage of a segment/graphic of participants.

Generally, a test provider will garner the use of at least one high response capacity response platform for at least one element controller. When the at least one element controller is a percentage of participants or a percentage of a segment of participants the provider may afford future controllers a time period in which to register. Once the time period has expired, non targeted viewers/consumers may be afforded the opportunity to register if the response platform registration capacity has not been exceeded.

Initial Response Resubmission/Communication Method

A qualifying score may be announced during a final phase of a test period or a final phase of a series of test periods. Participants with a qualifying score may be required to communicate their score to a provider or administrator in order to receive consideration.

Element response test participant may be required to submit or communicate a predetermined one or more types of responses to a predetermined number of elements multiple times.

First participants are generally required to submit initial responses to elements prior to a response submission deadline. When By requiring qualified participants to communicate a qualifying score, participants must have access to the controllers responses or the controller's response information subsequent to the controller's response submission deadline and must calculate response point totals.

This method of first submitting responses prior to a response submission deadline and communicating qualifying point totals requires participants to interact with elements on a deeper level than simply submitting responses and waiting to receive consideration when consideration is warranted. This method not only allows participants to identify themselves as being in sync with one or more element controllers but identifies participants who are willing to perform a series of required tasks which may be required by participants selected to assist or represent one or more element controllers of which they are in sync.

Additional Task Requirement

The test provider may or may allow participants to assign themselves point values or assign point values to participants for submitting correct responses. Participants who identify themselves as most qualified to receive consideration may be required to perform one or more tasks before consideration is offered. The one or more tasks may be to respond to a plurality of elements, which may or may not be the same elements utilized in the test but may be controlled by the same one or more element controllers the participant claims to be in sync with. When products or consumables or elements of products or consumables are utilized as test elements, participants required to communicate a qualifying score may achieve a deeper level of element knowledge and attachment which may also result in higher percentage of element attraction and potential consumption.

The above method may be utilized when a test allows a high number of participants to be recognized as qualified to be selected to receive consideration. Participants qualified to be selected to receive consideration may be required to perform one or more additional tasks or participate in or more addition tests that identify consideration recipients.

Initial (Redundant) Response Resubmission Method

An ERG/T provider may require participants to submit responses to elements on a plurality of element response platforms. By requiring response submissions on a plurality of element response platforms the provider and participants are afforded a built in back up in case of technical difficulties on one platform.

A test provider may allow or require test participants to provide responses to elements prior to an initial element response submission deadline and prior to an initial element response re-submission deadline when the participant's initial response submission qualifies the participant to receive consideration. The provider is not required to identify participant's initial response(s) as either correct or incorrect until a participant re-submits the first response based on the participant identifying the first response as correct.

Example 1

Ten million tests participants submit responses to elements. A test provider or administrator would normally identify which of the ten million participants submitted a number of correct responses in order for participants to receive or qualify to receive consideration. By requiring participants to re submit their responses only if their responses are determined by themselves to be correct or within a correct range, the administrator is not required to labor with initial responses from the ten million participants but a number which may be far less. In essence, this method of redundant response submissions requires participants to do a percentage of work the administrator would usually be required to perform when utilizing conventional response submission methods.

Example 2

Members of one or more segments of one or more societies are afforded an opportunity to participate in an element response test. Members are afforded access (Fee or free?) to one or more registration platforms. Registered and non registered participants are afforded access (Fee or free?) to at least one element response recording and response point calculation system. A test provider/administrator presents a plurality of element response options on one or more media (Free or fee?). Participants are instructed to record one or more types of responses to a number of elements. Participants are instructed to visit one or more response submission platforms (Free or fee?) to submit responses prior to a response submission deadline A and re visit the one or more response submission platforms (Free or fee?) to re submit responses prior to a response re submission deadline B when a qualifying response point total is calculated. The one or more response submission platform administrators receive participant's response submissions prior to the response submission deadline A. The one or more administrators store participant's submitted responses. Provider announces/posts correct responses and one or more qualifying point totals on one or more media. Participants calculate response points to identify a qualifying point total. Participants with a qualifying point total re visit one or more response submission platforms (Free or fee?) to re submit responses prior to the response re submission deadline B. An administrator identifies participants re submitted responses as either qualified or unqualified. Administrator compares each participant's qualified re submitted responses with the participants previously submitted responses. Participants are identified as qualified to receive consideration or qualify to be selected to receive consideration when qualifying re submitted responses match previously submitted responses.

When a plurality of response combinations are possible to achieve a qualifying primary, alternate, or ancillary game or test score the game or test provider or administrator may not be able to effectively post or announce the possible combinations of responses that may achieve a qualifying score. The provider or administrator may allow or required game and/or test participants to utilize response point calculation systems one, two, or three in order for each participant to determine when a qualifying point total is achieved.

A provider or administrator may be directly or indirectly associated with an element response period with no primary game or test. An administrator may be a friend, school mate, or office co-worker.

Example

An element response period is made available on network Television. Viewers are afforded access to one or more response point calculation systems. A percentage of viewers organize ancillary tests associated with the period. Participants of each test elect or allow an administrator to receive responses to elements prior to the element response period element controller's response submission deadline. The administrator stores each initially submitted response. When the element controller's responses are revealed each participant calculates response point totals and re-submits their initial responses and the calculated point totals to their respective administrators.

The administrator identifies participants with a self assigned highest point total attached to re-submitted initial responses. The administrator recalculates each re-submitted response with a highest point total. When each participant's re-submitted responses with a highest point total are determined by the administrator to be calculated correctly, the administrator compares the participants correctly calculated highest point total re-submitted responses with the participant's stored initially submitted responses. When a participant's re-submitted responses with a highest point total match stored initially submitted responses the participant is determined to be most qualified compared to all other participants with a lower point total.

Honor Response Submission Method

Afford viewers and participants access to honor response and point calculation systems (printed and electronic). Winning participants may be asked to present their archived data during a documentary production showing their chosen method of recording responses and point data which may promote the use of honor response and point calculation systems. These systems when compared to response data capture may be utilized by participants to present to employers or business partners to show their innate ability to match responses with one or more element controllers.

Initial Response Re-Submission Method (Added Sep. 18, 2004)

A plurality of at home test participants re-submitting self determined consideration qualifying initial response submissions are selected for initial response re-submission consideration qualification verification. A plurality of selected test participant's response re-submissions verified as consideration qualified are selected for initial response comparison verification. Test participants satisfying the initial response comparison verification receive or qualify to be selected to receive consideration.

Viewer Interactive Commercial or Advertisement

A test provider may present a plurality of elements available to be incorporated into a commercial/advertisement as test elements. The test elements may be provided by a commercial element provider. The commercial element provider may also be a provider of test revenues. The test provider or element provider may designate one or more commercial element controllers comprised of a majority of viewers or participants or a majority of one or more segments of viewers or participants. The one or more controllers may be instructed to select one or more of the commercial elements from the plurality commercial elements that are most suitable to be incorporated into a commercial production based in part upon one or more defined commercial objectives.

Therefore, when an element controller of elements incorporated into a commercial is comprised of viewers or element response test participants the commercial is "Viewer Interactive".

When one or more test participants in sync with one or more of the above commercial element controllers are selected to participate in a pre production of a future test to represent the viewers or participants they are' proven to be in sync with as commercial element casting directors for the test and one or more designated commercial element controllers of the elements cast by selected viewers is comprised of viewers the future commercial may be referred to as a "Viewer Controlled" commercial.

The term commercial and infomercial may be synonymous.

Compelling Response Tests

Incorporate elements into a game/test to attract a highest number of viewers and participants. Designate a majority of participants as an element controller.

Designate a celebrity as an element controller.

Television and Film Audition and Casting Game

An element response game/test may incorporate audition elements. Main audition elements may be entertainers or entertainer hopefuls. Secondary audition elements may be actions, activities, scenarios, or situations for entertainers or entertainer hopefuls to perform during an audition. Secondary elements may also be a sponsor's products or services for entertainers to interact with during an audition.

The main audition elements, entertainers and entertainer hopefuls for example, may be single session multi response elements.

The audition element may be multi session multi response elements.

Element Response Game/Test Board

Viewers of element response periods and viewers and participants of element response tests may be afforded an opportunity to access a game/test board or element response board game. The board may be similar to a monopoly board whereas the board is packaged with a plurality of board pieces. The board pieces may represent each board player. Board players position pieces according to responses provided elements presented on a period or test observation platform.

Playing or testing pieces representing each participants and an element controller may be utilized. The board may be used by a group of viewers or test participants to arrive at a group response consensus.

Response Wagering/Gaming
Or
Element Response Wagering

Ancillary wagering game platforms associated with element response periods may include, but are not limited to:
Telephone
ITV
SMS
Internet
Single Event Retail Response Card Combination lottery
Multiple Event Retail Response Card Combination Lottery
Single Event Retail Keno
Multiple Event Retail Keno
Single Event Sweepstakes (printed and electronic)
Multiple Event Sweepstakes (printed and electronic)
Single Event Pool (printed and electronic)
Multiple Event Pool (printed and electronic)

Printed Element Response Test Systems

A printed element response test system may be made available in magazines, newspapers, periodicals, cards, printed from the Internet, and printed from ITV.

Combining Phase 1 and Phase 2 into One Session

A three phase element response period or test begins with a period initiation phase and ends with a period result or objective accomplishment phase.

Generally, during phase one, the period initiation phase, a plurality of single and multi response session elements are presented. At least one element controller and game participants (ancillary game participants when the primary element response period has no game) submit a predetermined one or more types of responses to a predetermined number of elements prior to an element response submission deadline.

During phase two the element controller's one or more responses to a number of elements are revealed.

The controller's responses to phase one elements directly or indirectly determine one element's at least one phase two element response option.

Generally, the at least one phase two element response option is a multi response session element from phase 1 made available by the element controller to receive one or more responses during another response session, hence the term "multi response session element". The at least one element response session element presented during phase two may or may not be attached to a single response session element from phase one.

When the at least one phase 2 element response option is attached to one or more single session element response option from phase one or attached to one or more other elements presented during phase two the attached elements will generally influence the number and type of responses the at least one multi response session element will receive during phase two.

The above example requires a provider to coordinate at least one multi response session element from phase one to be available to receive at least one response during phase two.

Phase one and phase two may be combined allowing the phase one multi response session elements to receive two sessions of one or more responses during one sitting.

This is accomplished by videoing or taping all phase one multi response session elements being influenced by all phase one multi response session elements. Participants would be required to provide an initial response to a plurality of multi response session elements without single response session element influence. Participants would then be required to identify their plurality of multi response session elements being influenced by the attached single response session elements. Participants would then be required to submit initial responses to multi response session elements and subsequent responses to initially responded to elements prior to a single sitting multi response session element response deadline.

Example of a single sitting multi response session.
Sitting One—Session One

A plurality of single and multi response session elements are presented.

An element controller and game participants record a required number and type of responses to a required number of elements.

Sitting One—Session Two

All multi response session elements are presented with attached single response session elements from phase 1, and/or one or more new attached elements.

The controller and participants refer to their session one record and make a session two record in relationship to the elements they may or may not of responded to during session one.

If session one required controllers and participants to respond positively to a required number of multi response session elements during session one, the elements receiving the positive session one response will generally be the elements they will respond to during session two.

If session one required controllers and participants to respond negatively to a required number of elements during session one, the elements receiving no negative response will be the elements they are required to provide a response during session two.

Therefore, when a controller and participants are required to record a negative response to a required number of elements during session one, the elements may not be referred to as multi response session elements due to the fact that a negative response to an element during session one by an element controller may exclude the element from receiving a response during a subsequent session.

A provider may also utilize a live broadcast to combine phase 1 and phase 2 into one sitting by making all element response options from phase 1 available to be incorporated into phase 2.

Example

A plurality of element response options are presented during phase one of a live or live to tape broadcast.

Controllers and participants are instructed submit a required number and type of responses to a required number of elements after each element is presented during the broadcast.

Controllers and participants are required to submit their responses to elements before a response submission deadline during the broadcast.

When the required response is a positive, the elements receiving the positive response from the element controller will become element response options during phase 2 during the live broadcast.

When the required response is negative or eliminating, the elements receiving the negative response from the element controller will be excluded from becoming an element response option during phase 2 and the elements not receiving the negative or eliminating response will become element response options during phase 2.

Keep in mind, elements indirectly made available by an element controller to become element response options during a subsequent phase/session within a period may only be referred to as multi response session elements when another phase/session is incorporated into the period where elements receiving a positive response and not eliminated from the period are made available during the subsequent phase/session to receive a response.

Innate Skill

An element response game/test objective may be to identify participants with cognitive or innate skill to identify elements the element controller finds most appealing or suitable for a particular function, objective, or criterion.

A participant with the ability to respond to a plurality of elements during one phase in a manner at least similar to an element controller, when the participant's responses are made without considering the element controller, has what may be considered as an innate response ability.

A participant with the ability to respond to a plurality of elements during a plurality of phases in a manner at least similar to an element controller, when the participant's responses are made without considering the element controller, has what may be considered a higher level of innate response ability when compared to a participants with the innate ability for one phase.

Innate Skill

A test participant with an ability to match responses with an element controller over a period of time is considered to have an innate skill.

The odds of a participant being in sync with an element controller over a period of time are contradictory to a game of chance.

Skill Versus Chance

An element response game/test participant providing random responses to elements may be considered a participant in a game of chance.

Innate
Cognitive

An element response game is a game of skill based on an innate or learned skill. Participants may inquire to entities comprising an element controller when the element controller is a segment of a plurality of entities accessible to the participant. The participants may be provided information based upon the element controller. Participants may be provided or seek out past responses by an element controller or entities An element response game or a category or sub category within a game may have a secret or mystery element controller. A participant is left with no information to base responses to elements. The participant may provide subjective responses to elements. A participant receiving a highest point total may have inherent responding to elements that match or are at least similar to the mystery controller and have inherent response instincts.

Participants receiving a highest match or point total of a plurality of periods within an element response game have a proven ability.

Element response options for an element response period within an element response game may be limited to a number not sufficient to allow the most qualified participants to rise above other participants. A segment or a majority of participants may achieve a highest point total for a period. But, when a plurality or a series of periods exist the number of participants with a high accumulative point total will lesson with each period. Therefore, when the number of element response options for a period are limited to a number insufficient to identify the most qualified participants a series of period may be most suitable.

Example

An element response period within an element response game presents 10 element response options available to receive one or more evaluation response based on one or more evaluation criterion and a ranking response based on a combined evaluation total. An element controller and participants are required to evaluate each element one a 1.0 to 10 scale and rank 5 elements based on evaluations. The total number of responses is 15, 10 evaluation responses and 5 ranking responses. The number of participants is 10 million. Out of 10 million participants an estimated 100,000 participants may provide responses that match the element controller. The 100,000 participants may be entered into a sweepstakes or drawing. The 100,000 participants may receive an award. The 100,000 participants During a subsequent period another 100,000 participants may receive a highest point total with 50,000 participants receiving a highest point total for the two periods combined. At the end of 10 periods and by decreasing the number of most qualified participants by 50% after each period Generally, an element response game provider may awards one or more all participants with a highest point total One or more additional game/test may be administered to participants from each period or a series of period with a highest point total until a number of most qualified participants is achieved that is suitable to the provider.

In the UK a particular type of wagering game pays out to the highest number of participants ever.

A gaming platform more technically advanced than other platform may be a main game platform offering element controller and element response game participant to interact

Example

An element response period is broadcast on FOX cable Television. One or more element controllers and element response game participants are Participants may utilize DirecTV, Internet, Telephone, SMS, or future response platforms: The DirecTV participant may receive a higher value award than participants utilizing other response platforms.

Therefore, participants utilizing other platforms are incentivized to subscribe to DirecTV not only to win higher value awards than other platforms but to participate as element controllers, casting directors, and judges.

Consensus

When a game controller (element controller) is accessible, such as a majority of game participants, participants may approach a number of participants to receive a majority consensus.

Imagine you are approached by a person at a grocery store asking you to respond to a number of elements posted on a printed element response test system. You may be one of a plurality of individuals the person is approaching to acquire a consensus regarding test elements.

Subsequent Product Participation and/or Interaction

The inventions provides viewers and consumers of entertainment products an opportunity to receive consideration for participating in the casting and auditioning and casting processes for the products and at times may enable the viewers and consumers an opportunity to participate in and/or interact with the product they helped to create (Think Video, TV, Film, Print, etc.)

Most Qualified Test Participant Re-Testing

Test participants with a highest score from one test or test series may be required to participate in another test or test series in order for the test provider to determine most qualified test participants or to achieve a more manageable number of qualified test participants when the number of qualified test participants is unmanageable.

Revenues

Category or Sub Category Space Sales

Category or sub category space may be sold or leased to businesses wishing to gather marketing data and build one to one relationships with consumers from all segments of domestic and international societies.

Test participants may be offered an opportunity to enter preferences into a preference survey or enter answers into a questionnaire within one or more categories that may constitute a different game level offering a higher or lower value award which may be more or less desirable for different segments of a society. Participants may be required to provide information not related to a game but may be related to a business associated with the game.

Test participants may have a dual role when an element controller is a segment of test participants or a percentage of a segment of test participants.

Test Data Backup

When a primary test provider allows one or more ancillary tests to exist the provider may announce winners, most qualified participants, or a highest point total from the primary test and at least one of the one or more ancillary tests. When technical and/or production difficulties arise with respect to the primary test or one or more of the ancillary tests the provider is able to announce or post winners, most qualified participants, or a highest point of one or more of the tests without technical or production difficulties.

When technical or production difficulties occur a provider may distribute points equally amongst participants. The provider may allow ancillary test participants to carry over points from one platform to another when the one platform is not functioning properly. Therefore, participants are provided a method of backing up points and data.

Information From Outline

Element Response Game/Test Participant Consideration
Sweepstakes/Drawing Entering
Employment Opportunities
Contestant Opportunities
Celebrity Judge Opportunities
Producer
Casting Director
Awards
Prizes
Certification
Recognition
Acknowledgement
Controller Assistants
Consumer Assistants
Controller Representatives
Consumer Representatives
Becoming a Controller
Replacing a Controller
Element Response Period Provider
   Contract
   Employment
   Production Participation
   Production Preparation Participation
Element Response Game/Test Provider
   Contract
   Employment
   Production Participation
   Production Preparation Participation
Revenue Provider
   Contract
   Employment
   Production Participation
   Production Preparation Participation
Industry Employment
Business Employment Fame
Fortune
Fame and Fortune
Element Response Game/Test Points
Match Response Points
One Off Response Points
Two Off Response Points
More Than Two Off Points
Match First Place Element Points
   A higher number of elements are determined to be qualified to receive a first place response than a response less than first place.
Match Less Than First Place and Higher Than Last Place Element Points
   A higher number of elements are determined to be qualified to receive a second or lower place response but higher than a last place response.
Match Last Place Element Points
   A higher number of elements are determined to be qualified to receive a last place response than a response higher than last place.
Single Level [Phase] Participation Points
   Single Phase Participation
      No Revenue Provider's Element Responses
      With Revenue Provider's Element Responses
Multi Level [Phase] Participation Points
Free Points
Captive Points Response Methods
Entity or Entities Comprising Element Controller Preferred Embodiments Response Game/Test Elements The phrases element response options, response elements and the term elements may be synonymous and generally identify elements made available to receive one or more types of responses from:
- Element controllers during element response periods with no primary game or test;
- Participants of ancillary element response games and tests associated with the element response period;
- Element controllers during primary element response games and tests; Participants of primary element response games and tests;
- Element controllers of alternate or secondary element response games and tests; Participants of alternate or secondary element response games and tests;
- Element controllers of ancillary element response games and tests; and Participants of ancillary element response games and tests.

An element is anything within the universe that can receive a response or be responded to. The types of element response options incorporated into an ERP or ERG/T are generally determined by an ERP or ERG/T provider according to one or more objectives of the period or game/test. A period or game/test revenue provider may also incorporate elements into the period or game/test of which may be directly or indirectly generated. The elements a revenue provider incorporates into a period or game/test may or may not be consistent with the period or game/test provider's objectives.

Generally, during a period or game/test a plurality of elements made available prior to the period or game/test are presented: Period element controllers and game/test element controllers and participants are instructed to provide one or more types of responses to a number of elements presented prior to an element response submission deadline. The instructions may require element controllers and participants to provide a response to all or less than all elements presented. The number of elements required to receive a response is generally predicated by the period or game/test provider or a period or game/test revenue provider.

When a period exists with no game/test the responses to elements are received by one or more element controllers only. Therefore the element controller is instructed to provide responses to elements.

When a period is associated with one or more ancillary game/tests the participants of the ancillary game/test receive the same response instructions by the provider of the period or administrator of the game/test as the element controller receives. Entities comprising an element controller and game/test participants may be one in the same. When entities comprising an element controller and game/test participants are the same, element controllers and participants will receive the same response instructions. The instructions are the same due to the fact that participants assign themselves or are assigned by a game/test provider or administrator a point value each time a response to an element matches or is at least similar to a response received a percentage of entities or a percentage of one or more segments of entities comprising an element controller.

Ancillary game/tests administrators may be allowed by a primary game/test provider or period provider to incorporate additional elements into the ancillary game/test which may allow the ancillary game/test administrator or ancillary game/test revenue provider to achieve one or more objectives. When an ancillary administrator is allowed to incorporate elements for ancillary participants to respond to, the ancillary elements may or may not have a designated controller. When the elements have no controller the ancillary administrator may require ancillary participants to provide one or more types of responses to a number of elements with no controller in order to the participants to qualify to be assigned points for correctly responding to elements with a controller. An ancillary administrator may be allowed to designate at least one controller for the incorporated elements which may allow ancillary participants to assign themselves or be assigned a point value each time a response to an administrator incorporated element matches or is at least similar to an ancillary administrator designated element controller. The ancillary administrator may also provide various other types of games or tests in conjunction with the element response period. The above methods may also be utilized by ancillary game/test administrators associated with primary element response game/tests.

The following are examples of, but not limited to, types of elements an element response period, game, or test provider and revenue providers to each may incorporate into an element response period, game, or test respectively.

Polls
Questionnaires
Most Preferred Type
Least Preferred Type
Advertising Related
Marketing Related
Names
Titles
Designs
Logos
Slogans
Audio Type
Visual Type
Audio and Visual Type
Audio/Visual Type
Touchable
Tangible
Sensory
Sixth Sense?
Music
Lyrics
Beats
Instruments
Lyrical compositions
Poetry Artwork
Revenue Related
Current Element Replacement Options
Television programs
Scenes or Elements within a Television Program
Films
Scenes or Elements with a Film
Video
Games
Print
Commercials
Advertisements
Music
Statistics
Sociology
Psychology
Research
Element Response Options An element response option response element may be anything that can be incorporated into an element response period, game, or test. Generally, the term element response option refers to one of a plurality of elements made available to receive a response and a response element may refer to an element made available to receive a response. The terms element response option and response element described herein may be synonymous. Elements incorporated into a period, game, or test may be referred period, game, or test elements respectively.

Element response options or response elements may also be responses.

For example, an element response period provider may presents to entities comprising an element controller a plurality of response options or response types to a method of, a way, or how one or more elements were integrated into or responded to with respect to integration into a production. Therefore, the period element is a response that may require a response.

Element response options may be tangible, visual, and/or audible. Element response options may be types of thoughts, opinions, and/or evaluations. An element response option may be a response to a response. An element response option may be a response to a response or a method.

The following are but a few types of elements that may be incorporated into an element response period, game, or test.

Event Elements Products
    Product accessories
    Product designs
    Product accessory designs
    Services
    Service variations
Competition Elements
    Contestant options (add confidence level)
        Persons
        Characters
        Character designs
        Products
        Product designs
        Future products
        Future product designs
        Services
        Service supports
        Future services
        Future service supports
    Activity options
    Action options
    Scenario options
    Scene options
    Set options
Product options for integration
    Product integration options
        Responses to product integration
Product options for placement
    Product placement options
        Responses to product placement
Product options for interaction
    Product interaction options
        Responses to product interaction
Services options for integration
    Service integration options
        Responses to service integration
Service options for placement
    Service placement options
        Responses to service placement
Service options for interaction
    Service interaction options
        Responses to service interaction
Evaluate selected contestants
    Persons
    Characters
    Character designs
    Products
    Product designs
    Future products
    Future product designs
    Services
    Service supports
    Future services
    Future service supports
Rank selected contestants
    Persons
    Characters
    Character designs
    Products
    Product designs
    Future products
    Future product designs
    Services
    Service supports
    Future services
    Future service supports
Evaluate selected activities
Rank selected activities
Evaluate selected actions
Rank selected actions
Evaluate selected scenario(s)
Rank selected scenario(s)
Evaluate selected scene(s)
Rank selected scene(s)
Evaluate selected set(s)
Rank selected set(s)
Evaluate selected (interactive) products
Rank selected (interactive) products
Evaluate selected (placement) products
Rank selected (placement) products
Evaluate selected (interactive) services
Rank selected (interactive) services
Evaluate selected (placement) services
Rank selected (placement) services
Evaluate sponsor's selected (interactive) products
Rank sponsor's selected (interactive) products
Evaluate sponsor's selected (placement) products
Rank sponsor's selected (placement) products
Evaluate sponsor's selected (interactive) services
Rank sponsor's selected (interactive) services
Evaluate sponsor's selected (placement) services
Rank sponsor's selected (placement) services
Audition elements
Evaluation elements
Award show elements
Game show elements
Political elements
Corporate elements
Business elements
Economic elements
Manufacturer elements
    Products
    Product designs
Survey Questions
Survey Question options
Answers to Survey Questions Responses to Survey Answers
Element Response Options (ERO)
Multi Response Elements
Single Response Elements
Contestant options
Contestants
Character options
Characters
Activity options
Activities
Product options
Products to be interacted with
Products to be placed
Products to be embedded
Service options
Services to be interacted with
Services to be placed
Services to be embedded
Award nominee options
Award nominees
Applicant options
Applicants
Political issue options
Political issues
Political proposition options
Political propositions
Political resolution options
Political resolutions
Political propositions
Propositions
Business Tasks
Sets
Scenes
Scenarios Situations
Element Interaction/Consumption A game/test may allow or require participants to view in person, interact with, or purchase elements for evaluation and subsequent response.

Element viewing in person, interaction, or purchasing may be a prerequisite to a higher level of participation when compared to viewing still images or element videos made available on one or more element evaluation or observation platforms. This method of a higher level of participation may require a participant to prove an element was viewed in person, interacted with, or purchased. A game/test may require participants to obtain or access one or more categories of element response options. An ERG/T may allow a participant to advance to a higher level of participation when the participant proves one or more obtainable or accessible elements have been obtained or accessed.

A required number of elements may require one or more responses according to one or a combination of senses.

One or more elements from a plurality of elements may require one or more responses according to how the elements look, feel, smell, sound, and/or taste when a controller and participants are afforded reasonable access to see, touch, smell, hear, and/or taste the plurality of elements. In essence, element response options or response elements may be things that require a controller or entities comprising a controller and participants to utilize one more senses in order to provide one or more required responses to a required number of the plurality of elements When accessing or obtaining each of a plurality of elements is unaffordable for all members of a society, member that can afford to access or obtain each element or prove they accessed or obtained each element may qualify to participate in an ERG/T at a different or higher level than other participants.

Participants may be allowed or required to form teams which may make accessing or obtaining a plurality of elements more affordable or reasonable.

Elements required to be seen, touched, heard, smelled, or tasted may be made available for purchase or for free at an accessible location or destination.

As humans become more advanced other senses not currently or commonly utilized may be incorporated into a future ERG/T.

Terms

The terms rank, grade, and evaluate may be synonymous.

Corporate Elements

Example

Coca-Cola prepares to replace 50% of its board members. Shareholders are allowed to select two or more future board member hopefuls from a plurality of future board member hopeful options that qualify to compete to fill one or more board member seats. Shareholders are then allowed to choose one or more elements (activities) for their selected board member hopefuls to perform, discuss, or debate in order for share holders to determine which selected board member hopefuls qualify to fill the one or more available board member seats.

Element Categories

When a plurality of secondary elements are required to influence or satisfy a primary element evaluation criterion one or more categories of a plurality of secondary evaluation elements are generally needed for one or more controllers to choose from in order to determine which are most suitable according to the primary element evaluation criterion.

Element Preparation

An ERP or ERG/T may incorporate elements requiring preparation or production. The elements may be entirely or partially prepared or produced in order for a controller and participants to provide a sufficient response according to an ERP or ERG/T objective. A provider of elements requiring preparation or production will generally dictate whether a product determined by an element controller to be a most suitable element from a plurality of elements may be produced and ready for distribution prior to being presented to receive a response. For example, an ERG/T licensor utilizing music elements may designate an element controller for the music elements to be a music performer. The music performer will generally complete one or more songs. The performer may produce variables to the one or more completed songs as element response options. Although the performer has already decided which elements from the variables are within the completed songs, participants are then presented with the music variables or options. Participants that choose the same elements for the songs that the performer/controller has already incorporated into the produced songs or final product are identified as most in sync with the performer/controller. The songs are then released to the public for consumption within a shortest time possible. A percentage if not all participants in sync with the performer/controller as well as music consumers that may or may not have participated in the event and may or may not be somewhat in sync with the performer/controller may also consume the performer's/controller's product.

When a designated controller for the songs elements is a majority of all participants or a majority of a segment of participants the performer may prepare or produce elements to be incorporated into the songs according to the desires of the controller. The final songs may be partially completed and may take more time to release than when the songs are completed but less time than when the songs are not partially completed and ready to become completed songs.

As stated within this document/application, these methods of pre-producing songs and song options are suitable for simultaneous World wide release of music according to the desires of element controllers around the World.

These methods of pre-produced products and product options may be applied to all types and themes of productions, including but not limited to; Television, film, video, video games, publications, products, productions etc.

A product may include an entity or a plurality of entities.

An element controller may determine which elements from a plurality of elements that will become game/test elements.

A game/test objective may be to allow an element controller to determine which one or more element response options from a plurality of element response options are to be incorporated into a product or become a product ready for consumption as a result of a game/test period or game/test series.

A product may be manufactured or produced prior to a game/test utilizing elements comprising the product a game/test element response options when the product manufacturer or producer, or associate of the manufacturer or producer, are pre determined to be designated as the element controller of the element response options comprising the product.

Phrase/Sentence Insertions or Completions

Game/test participants may be required to insert a word or phrase into an uncompleted phrase or sentence, provide answers, opinions, and/or solutions.

Element Category Themes

During each phase prior to a final phase of an element response period or an element response test period a plurality of elements made available to receive at least one response each are presented. The plurality of elements may consist of various themes. Theme elements may be placed into element categories or sub categories with respect to a theme.

Examples

A plurality of an element response test revenue provider's placement product options may be incorporated into a revenue provider's product placement category.

A plurality of contestant options may be placed into a contestant category.

A plurality of contestant activity options may be placed into a contestant or competition activity category.

A plurality of a sponsor's interactive product options may be placed into a sub category of a competition activity category whereas the interactive products are made available for an element controller to select one or more of the products for contestants to interact with during a competition.

Free Point Element Responses

When a plurality of free point elements are incorporated into an element response test participants may or may not be required to provide a response to one or more of the free point elements.

When participants are required to respond to free point elements the response may allow participants to acquire or receive point values for correct responses to element controlled by an element controller. The free points and correct response points may be added to achieve a point total.

When participants are not required to respond to free point elements the participants may be entered into a higher level of test participation for responding to a number of free point elements. A participant may even be entered into yet an even higher level of test participation for responding to a highest number free point elements.

Various elements may or may not require participants to provide a response but when responded to may allow a participant to acquire or receive point values for correct responses to elements controlled by an. element controller.

When elements such as surveys or questionnaires incorporated into a test by a revenue provider the test provider's elements may be free point elements, higher level elements, or captive elements. Captive elements are elements a test participant is required to respond to have order to acquire or receive point values for correct responses.

Various types of element response options may be incorporated into a test which afford participants an opportunity to receive consideration or consideration of a higher value.

Single Response Session Elements

One or more phase one single response session elements may be a revenue provider's products or services. At least one of the revenue provider's products or services receiving a positive response from the element controller or not receiving a negative response from the element controller may be integrated into phase two.

Single response session elements may be part of a revenue provider's survey or questionnaire.

New single response session elements may be presented during phase two. The new single response session elements may also be a revenue provider's products, services, or survey questions. Newly introduced single response session element may be incorporated into phase three.

When a revenue provider's elements are integrated into an element response test the revenue provider may utilize the same or a different controller for the revenue provider's elements. Participants in sync with the revenue provider's controller may receive consideration directly from the revenue provider. Participants in sync with both the test provider's element controller and the revenue provider's element controller may receive consideration based on being in sync with both controllers.

Viewers most in sync with the test provider's or revenue provider's element controller may be selected or qualify to be selected to assist or represent the element controller in a future production or pre production.

The future production may be a future test production. Participants selected to participate in a future production may represent or assist an element controller they are most in sync with as a celebrity judge of elements presented during the future test.

The future pre production may be a pre production of a future test. Participants selected to participate in the future test pre production may represent or assist an element controller they are most in sync with as a production executive or casting director.

Participants most in sync with an element controller may participate in a future test as test elements.

Free Point Elements

During phase one and phase two of an element response test the provider may present a plurality of free point elements to which test participants may provide a response. Free point elements may be incorporated into a test by a revenue provider to allow participants to increase their overall point total.

Entertainment and Consumption Elements

An element response period begins with an element controller and a plurality of elements. The element controller responds to one or more elements whereby the one or more responses directly or indirectly determine which one or more elements from the plurality of elements the public is provided for entertainment or consumption.

Example 1

A product/element is provided to the public for consumption. The element is a result of an element response period whereby an element controller is presented with a plurality of elements. The controller determines which element from the plurality of elements is most suitable for public consumption. In essence, the controller is more often than not a self appointed consumer representative.

Example 2

An entertainer/element is presented to the public for entertainment. The element is a result of an element response period whereby an element controller is presented with a plurality of elements. The controller determines which element form the plurality of elements is most suitable or appealing for entertainment purposes. Therefore, the controller is a viewer representative.

Example 3

Contestants/elements are provided to the public for interactive entertainment. The elements are a result of an element response period whereby an element controller is presented with a plurality of elements. The controller determines one or more elements form the plurality of elements that most suitable for viewer interaction. The element controller is viewer representative.

Every so often a consumer or viewer representative may get it right, which is truly unacceptable.

Therefore, a need exists for businesses to engage viewer and consumer representatives with an innate ability to consistently identify elements that are most appealing and suitable to viewers and consumers.

Multi and Single Response Session Elements

A 3 phase element response period or game/test begins with a period initiation phase (phase 1) and ends with a period ending phase (phase 3). Generally, during phase 1 a plurality of single and multi response session elements are presented. At least one element controller and game participants (ancillary game participants when the primary element response period has no game) submit a required number and type of responses to a required number of elements prior to an element response submission deadline. During phase 2 the element controller's required number and type of responses to a required number of elements are revealed. The controller's responses to one or more phase 1 elements directly or indirectly determines at least one phase 2 element response option. Generally, the at least one phase 2 element response option is a multi response session element from phase 1 made available by the element controller to receive one or more responses during another response session, hence the term "multi response session element". The at least one element response session element presented during phase 2 may or may not be attached to a single response session element from phase 1. When the at least one phase 2 element response option is attached to one or more single response session element response options from phase 1 or attached to one or more other elements during phase 2 the attached elements will generally influence the number and type of responses the at least one multi response session element will receive during phase 2.

The above example requires a provider to coordinate at least one multi response session element from phase 1 to be available to receive at least one response during phase 2. Generally, this is how phase 1 and phase 2 of a 3 phase element response period is executed.

Single Sitting Multi Response Session

However, phase 1 and phase 2 may be combined allowing the phase 1 multi response session elements to receive two sessions of one or more responses during one sitting.

This is accomplished by videoing/taping all phase 1 multi response session elements as if they were directly or indirectly responded to by an element controller and making the record available during a single sitting.

Example

Sitting One—Session One

A plurality of single and multi response session elements are presented.

An element controller and game participants record a required number and type of responses to a required number of elements.

Sitting One—Session Two

All multi response session elements are presented with attached single response session elements from phase 1, and/or one or more new attached elements. The controller and participants refer to their session one record and make a session two record in relationship to the elements they may or may not of responded to during session one. If session one required controllers and participants to respond positively to a required number of multi response session elements during session one, the elements receiving the positive session one response will generally be the elements they will respond to during session two. If session one required controllers and participants to respond negatively to a required number of elements during session one, the element receiving no negative response will generally be the elements they will respond to during session two. Therefore, when a controller and participants are required to record a negative response to a required number of elements during session one, the elements may not be referred to as multi response session elements due to the fact that a negative • response to an element during session one by an element controller may exclude the element from receiving a response during a subsequent session.

A provider may also utilize a live broadcast to combine phase 1 and phase 2 into one sitting by making all element response options from phase 1 available to be incorporated into phase 2.

Example

A plurality of element response options are presented during phase 1 of a live broadcast. Controllers and participants are instructed submit a required number and type of responses to a required number of elements after each element is presented during the broadcast. Controllers and participants are required to submit their responses to elements before a response submission deadline during the broadcast. When the required response is positive, the elements receiving the positive response from the element controller will become element response options during phase 2 during the live broadcast. When the required response is negative or eliminating, the elements receiving the negative response from the element controller will be excluded from becoming an element response option during phase 2 and the elements not receiving the negative response will become element response options during phase 2. Keep in mind, elements indirectly made available by an element controller to become element response options during a subsequent phase/session within a period may only be referred to as multi response session elements when another phase/session is incorporated into the period where elements receiving a positive response and not eliminated from the period are made available during the subsequent phase/session to receive a response.

Element Response Options

Element response options are a primary factor in the functionality of element response periods and element response games and tests. Generally, the types of element response options incorporated into an element response period, game, or test are determined by one or more of the period, game, or test themes and objectives. An element response period, game, or test may have a plurality of themes and objectives.

An element response period, game, or test provider or administrator may incorporate element of one or more themes into the period, game, or test to attract fans or consumers of the themes.

A period, game, or test theme may have a plurality of dimensions or categories. Themes with a plurality of dimensions or categories may include, but are not limited to: entertainment, political, business, corporate, economics, scholastic, and manufacturing, to name a few.

For example, an element response game provider may target fans or consumers of video games by providing a search for a favorite video game character. Therefore, the element response options of a video game character search may be, but are not limited to: animated or three dimensional characters, character activities/actions, character supporting elements such as sets, scenes, and apparatus, and character interaction elements such as products or props.

In essence an element response period or game provider may utilize an almost unlimited number of genres and themes of elements to attract viewers, fans, or consumers to the period, game, or test. All demographics of our World's societies may find one or more genres or themes of elements compelling to view, interact with, or consume.

The primary objective of an element response period, with or without incorporating an element response game, is to allow an element controller to respond to one or more element response options to determine one or more element semi finalists, element finalists or winning elements for the period. An element controller's response to an element may be, but are not limited to a: positive response, evaluating response, ranking/placing response, or negative response. An element controller's response to an element may be subjective, partially subjective, objective, or partially objective.

During an element response period, the element controller's responses to elements are subjective. During an element controller's element response game an element controller's responses to elements may be objective. This is due to the fact that an element controllers element response game allows an entity or entities within a segment of a plurality of entities comprising an element controller to receive a match or point value each time the entity's response to an element is at least similar to another entity or a segment of a plurality of entities.

Elements may be categorized according to a one or more types and number of responses each element in a category an element controller is instructed to provide to the elements within the category.

Elements within an element response period or game may be categorized as main elements or secondary elements. Generally, main elements are elements an element controller may determine to be element semi finalists, element finalists or winning elements for a period or a series of periods. Secondary elements are generally elements that may be independent or dependant on main elements. An element that is independent of main elements may be an element an element response period or element response game/test provider requires a response to for data capture.

An element that is dependant on main elements may be an element that is available to be attached to a main element. By attaching a secondary element to a main element the main element may receive one or more additional response during a response session or during a subsequent or future response session.

Example 1

A plurality of contestants and activities are presented during an element response period. The contestants are main elements and the activities are secondary elements. An element controller may select one or more contestants (main elements) to perform one or more activities (secondary elements). Therefore, secondary elements are attached to main elements.

Example 2

A plurality of sponsors products and contestants are presented during an element response period. The sponsors products are main elements and the contestants are secondary elements. An element controller may select one or more sponsor's products (main elements) to be interacted with by one or more contestants (secondary elements). Therefore, the secondary elements are attached to main elements.

Example 3

A plurality of manufacturer's products and product accessories are presented during an element response period. The manufacturers products are main elements and product accessories are secondary elements. An element controller may select one or more manufacturer's products (main elements) to be displayed with one or more product accessories (secondary elements). Therefore, the secondary elements are attached to main elements.

Generally, a main element may receive an additional response influenced by one or more attached secondary elements. Secondary element may be referred to as single response elements. Main elements may be referred to as multi response elements when the main element is available to receive one or more additional responses during a same or subsequent response session.

Element Response Options

Element response options may be categorized according to the number of responses each element may receive during an element response period. Elements available to receive a single response during a single response session of a period may be referred to as single session single response elements. Elements available to receive multiple responses during a single response session of a period may be referred to as single session multi response elements. Elements available to receive a single response during two or more response sessions of a period may be referred to as multi session single response elements. Elements available to receive one or more responses during two or more response sessions of a period may be referred to as multi session multi response elements.

Element Types:
Type A—Single Session Single Response
Type B—Single Session Multi Response
Type C—Multi Session Single Response
Type D—Multi Session Multi Response Type E—Multi Session Single and Multi Response Generally, a type A element, a single session single response element, may receive a single response during a single response session or phase within an element response period.

A type B element, a single session multi response element, may receive a plurality of responses during a single response session or phase within an element response period.

A type C element, a multi session single response element, may receive a single response during a plurality of response sessions or phases within an element response period.

A type D element, a multi session multi response element, may receive a plurality of responses during a plurality of response sessions or phases within an element response period.

A type E element, a multi session single and multi response element, may receive a single response during one or more response sessions and a plurality of responses during one or more response sessions within an element response period.

Type A and B elements may be referred to as single session response elements.

Type C, D, and E elements may be referred to as multi session response elements.

Generally, when a plurality of element categories or sub categories exist, each category or sub category will contain the same element response types.

Example

A plurality of entertainers, audition activities, and sponsor's interactive products are presented as element response options. The entertainers may be grouped into category 1. The audition activities and sponsors interactive products may be grouped into category 2. The audition activities may be grouped into sub category 2A and the sponsor's products may be grouped into sub category 2B.

All entertainers are taped performing each audition activity and interacting with each sponsor's interactive product.

An element controller selects one or more entertainers from element category 1 to perform one or more activities from element category 2A and interact with one or more sponsor's products from element category 2B. At this point, the controller has made a single response to one or more elements from category 1, 2A, and 2B.

The selected entertainers are now available to receive a response for performing selected audition activities and interacting with selected sponsor's products.

In order for the entertainers to receive additional responses during the session, the entertainers will have to perform during a single live broadcast or would be required to be taped, in advance of the session, performing every activity and interacting with each product.

Entertainers (category 1 elements) selected by the element controller are transferred to a selected entertainer category (category 3). Element category 3 allows the element controller to respond to selected entertainers according to how well they performed the one or more selected activities and interacted with the one or more products. The element controller rates each entertainer's activity performance and product interaction. Therefore, the element controller has responded to main elements one or more times subsequent to an initial response. Therefore, the entertainers are single session multi response elements and the activities and products are single session single response elements.

An initial response to a multi response element may be a high level response and one or more additional response to the multi response element may be low level responses, allowing progressive main element response knowledge and intimacy.

Therefore, a single response element attached to a multi response element generally results in the multi response element receiving a subsequent response influenced by the attached single response element.

Single response elements may be one or more sponsor's products or services available to be placed by a controller into the production of an element response period phase. The products may be placed into a live or taped period or a subsequent or future period.

Multi session multi response elements may be options of element response options during one session and elements during a subsequent session.

The following is an example of how one or more element controllers may respond to elements multiple times during a plurality of sessions.

A plurality of options of award nominee options are presented during response session one as multi response elements. An element controller selects (initial response) the most talented or qualified award nominee options:

The award nominee options selected by the element controller are presented during response session two. The element controller selects (second response) a plurality of the most talented award nominees.

The award nominees selected by the element controller are presented as element response options during session three. The element controller selects (third response) at least one award winner.

The one or more award winners selected by the element controller are presented during a final phase of the period.

Therefore, the multi session multi response elements (award show elements) received a single response during a plurality of sessions.

An element response period, game, or test may consists of element response options within two categories wherein one category is a primary element category and another category is a supporting or attachment element category. The primary element category may contain elements that will ultimately be determined by an element controller to become winning elements for the period. The supporting or attachment element category may contain elements available to be selected by an element controller to support or be attached to primary elements selected by the same or different element controller during a subsequent phase or response session. A period, game, or test supporting element attached to a primary element allows a controller to evaluate and/or respond to the primary element during a subsequent phase or response session in a subsequent progression response from the initial response.

Element Categorization

During an element response period or element response game a plurality of element response options are presented. Elements may be grouped into categories or sub categories according to a period theme or objective. Elements may be categorized according to a match or point value a participant assigns to himself or is assigned for providing a correct response to the one or more elements within the category.

Free Point Elements

Element response game and test elements may be free point elements. A free point element may be an element a participant responds to in order to assign to himself or receive one or more free points. A participant's response to a free point element may be a subjective response. A subjective response to elements may be required by a game or test provider or revenue provider when the element response options are within a questionnaire or survey category.

An element response option may receive an objective or subjective response during an element response period, game, or test according to one or more objectives determined by the period, game, or test provider or revenue provider.

Casting Elements

Element response options incorporated into an element response period, game, or test may be cast by the period, game, or test provider or a person, group, or business directly or indirectly associated with the period, game, or test provider.

Element response options incorporated into an element response period, game, or test may be cast by the period, game, or test revenue provider or a person, group, or business directly or indirectly associated with the period, game, or test revenue provider.

Element Casting Directors

Element response options are generally cast according to suitability or appeal to the target audience demographic or participant demographic determined by conventional casting directors and casting methods.

A period, game, or test provider's objective may be to allow an element controller to cast elements for a subsequent event or series. The subsequent event or series may be a film, Television program; video game, or publication. The provider may designate a majority of viewers as an element controller. Therefore, the majority of viewers become entities comprising the casting director for the subsequent event or series. The subsequent event or series will then present viewers with the most appealing or qualified elements according to the viewers. A limitation may exist by the types of elements the viewers are presented with to control. The elements cast for the element controller to select from are generally cast by individuals, groups, or businesses directly or indirectly associated with the provider. The individuals, groups, or businesses may or may not be qualified whereas the later is generally the consensus. In order to provider viewers with the most appealing or qualified elements to select from the provider may allow qualified viewer representative to cast the most appealing or qualified elements.

Viewers representative are identified when a majority of viewers are designated as an element controller of elements presented during an element response test. Test participants (viewers) receive a point value each time a response to a test element matches or is at least similar to an element controllers (a majority of viewers) response to the same element. Test participants with a highest point total for a period or series of periods are identified as viewers in sync with the majority of viewers. One or more viewers in sync with the majority of viewers (element controller) are selected or qualify to be selected to represent the majority of viewers as casting directors during a future test production. This way the elements cast for the future production are cast by the most qualified viewer representatives. During the future test a majority of viewer may again be designated as an element controller. The future test objective is to allow an element controller to cast elements for a subsequent event or series. Therefore, the casting process for the subsequent event or series is viewer controlled. This method assures the provider the most appealing or qualified elements are cast for the subsequent event or series when compared to conventional or current methods. When a test provider targets a segment of viewers the segment may be designated as an element controller which may allow viewers most in sync with the segment to cast element for a future test with the segment designated again as element controllers resulting in the future test becoming controlled by the segment.

Revenue Provider's Element Categories

A period, game, or test provider may allow a revenue provider, such as a sponsor or advertiser, to incorporate elements the period, game, or test. The revenue provider may be presented by a provider to viewers comprising a period element controller, viewers comprising a .game or test element controller and game or test participants as a provider of prizes and awards and at times fame and fortune.

Ancillary game/test participants associated with a period and primary game/test participants may be allowed or required to respond to elements the revenue provider brought to the game/test. The provider will generally designate at least one mystery controller to determine the fate elements. Participants assign themselves or are assigned point value in a manner that is at least similar to when they respond to elements of the game or test. In essence a revenue provider's elements become elements of the game or test. The revenue provider's objectives may be to identify one or more participants in sync with the controller of the revenue provider's elements. The revenue provider may select one or more participants in sync with the controller to become a controller representative or assistant or to receive a type of consideration consistent with being in sync with the controller. This method creates a never before offered synergy between viewers/participants/consumers and the revenue provider.

Period/Game/Test Revenue Provider's Elements

"Partially Viewer Controlled" Commercial Presentations

An element response game/test provider may allow a revenue provider to incorporate commercial production elements into the game/test with an objective of allowing a majority of viewers (element controller) to determine which elements are most suitable to be placed into a future commercial produced by the revenue provider. Therefore, the primary elements within the future commercial production are "partially viewer controlled"

"Viewer Controlled" Commercial Presentations

One or more game/test participants/viewers most in sync with the above element controller (majority of viewers) may be selected to participate in the production of a future game/test to cast elements for a subsequent game/test utilizing commercial production elements for yet another future commercial. The revenue provider may again designate a majority of viewers as an element controller of the commercial production elements. Therefore, the primary elements within the future commercial production are "Totally Viewer Controlled".

Contestants—
Activities—
Judges—
Sponsors
Person—
Place—
Thing
Animated Film Characters—
Cartoon Characters—
Comic Book Characters—
Video Game Characters—
TV Game Show Contestants—
Realty TV Contestants—
Beauty & Talent Contestants—
Theme Contestants—
Genre Contestants—
Actors & Actresses (auditioning for roles/parts for stage, TV, film, video)—
Political Candidates (state, local & federal)—
Corporate Board Members—
Individuals Seeking Employment—

Groups Seeking Employment—
Economic Proposals—
Services
Manufactures Products—
Consumable Products—
Product Designs—
Product Designers—
Vacation Destinations—Real Estate
Element Response Options
Lyrics, Beats, Music, Poetry, Logos or elements relating to music, music production, and music promotion.
Element Response Options
Product Prices
Prices of products resulting form an ERG/T. For example, viewers may be allowed to select the price, from a plurality of price options, a product will be sold for. When participants are proud of the product they helped to produce they may set a higher market price for the product and subsequently be compelled to pay the price they set.
Multi and Single Response Session Elements A plurality of element response options presented during an element response period may be referred to as multi response session elements when the elements are available to receive one or more responses during two or more response sessions generally during a same period. Elements presented during an element response period may be referred to as single response session elements when the elements are made available to receive one or more responses during one response session of a period.

A 3 phase element response period may also incorporate single response elements. A single session response session element is an element that is allowed to receive one or more responses during or after a single phase or response session during a 2 or 3 phase period.

A single response session element is generally integrated into phase 1 of a 2 phase period or phase 1 or 2 of a 3 phase element response period.

A plurality of single response session elements may incorporated into one or more phases of a multi phase element response period (two or more phases) to compliment or be placed into a subsequent phase or period.

A plurality of single response session elements may be integrated into an element response period with the objective of allowing an element controller to attach one or more of the single response session elements to one or more multi response session elements during a subsequent period.

An element controller may be allowed to determine one or more single response session elements from a plurality of single response session elements that are most suitable to be placed into a subsequent phase or period, whereas the plurality of single response session elements may anything that can be placed into a phase or period, such as, but not limited to persons, products or consumables.

An element controller may be allowed to determine one or more single response session element from a plurality of single response session elements that are most suitable for a multi response session element to perform during a subsequent phase or period, whereas the plurality of single response session elements may be anything that can be performed by a multi response session element, such as, but not limited to: actions, activities, and scenarios.

An element controller may be allowed to determine one or more single response session element from a plurality of single response session elements that are most suitable for a multi response session element to interact with during a subsequent phase or period, whereas the plurality of single response session elements may be anything that can be interacted with by a multi response session element, such as, but not limited to: persons, products, or consumables.

A single response session element may add to the content of a subsequent phase or period or may influence an element controllers response to a multi response session element subsequent to the element controller's first response to the multi response session element.
Information from Outline
Element Response Options/Response Elements
Single Response Elements
Multi Response Elements
Single Response Session Elements
Multi Response Session Elements
Single Controller Elements
Multi Controller Elements
Single Phase Elements
Multi Phase Elements
Single Period Elements
Multi Period Elements
Single Series Elements
Multi Series Elements
Single Game Elements
Multi Game Elements
Single Test Elements
Multi Test Elements
Single Observation Platform Elements
Multi Observation Platform Elements
Single Listening Platform Elements
Multi Listening Platform Elements
Audio Elements
Visual Elements
Audio and Visual Elements
Audio/Visual Elements
Single Response Type Elements
Multi Response Type Elements
Element Response Point Captive Release Elements
Free Point Elements
Textual/Numerical Input Response Elements Placement Elements
    Placement Element Options
        Responses to Placement Element(s)
            Responses to Element Placement
                Response to Element(s) Utilized for Placement
                    Suggestions for Placement Elements
                        Suggestions for Element Placement
Integration Elements
    Integration Element Options
        Responses to Integration Element(s)
            Responses to Element Integration
                Responses to Element(s) Utilized for Integration
                    Suggestion for Integration Elements
                        Suggestion for Element Integration
Interaction Elements
    Interaction Element Options
        Responses to Interaction Element(s)
            Responses to Element Interaction
                Responses to Element(s) Utilized for Interaction
                    Suggestions for Interaction Elements
                        Suggestions for Element Interaction
Placement Methods
    Placement Method Options
        Responses to Placement Method(s)
            Responses to Method(s) of Placement
                Responses to Method(s) Utilized for Placement
                    Suggestions for Placement Methods
                        Suggestion for Methods of Placement
Integration Methods
    Integration Method Options
        Responses to Integration Method(s)

-continued

```
        Responses to Method(s) of Integration
            Responses to Method(s) Utilized for Integration
                Suggestions for Integration Methods
                    Suggestion for Methods of Integration
Interaction Methods
    Interaction Method Options
        Responses to Interaction Method(s)
            Responses to Method(s) of Integration
                Responses to Method(s) Utilized for Integration
                    Suggestions for Interaction Methods
                        Suggestion for Methods of Integration
Attachment Elements
    Attachment Element Options
        Responses to Attachment Element(s)
            Responses to Element Attachment
                Response to Element(s) Utilized for Attachment
                    Suggestions for Attachment Elements
                        Suggestions for Element Attachment
Tailored Attachment Elements
    Tailored Attachment Element Options
        Responses to Tailored Attachment Element(s)
            Responses to Element Attachment Tailoring
                Response to Element(s) Utilized for Tailored
                Attachment
                    Suggestions for Tailored Attachment Elements
                        Suggestions for Tailored Element
                        Attachment
Influence Elements
    Influence Element Options
        Responses to Influence Element(s)
            Responses to Element Influence
                Response to Element(s) Utilized for Influencing
                    Suggestions for Influence Elements
                        Suggestions for Element Influencing
Tailored Influence Elements
    Tailored Influence Element Options
        Responses to Tailored Influence Element(s)
            Responses to Element Influence Tailoring
                Response to Element(s) Utilized for Tailored
                Influencing
                    Suggestions for Tailored Influence Elements
                        Suggestions for Tailored Element
                        Influencing
Tailored Elements
    Tailored Element Options
        Responses to Tailored Element(s)
            Responses to Element Tailoring
                Response to Element(s) Utilized for Placement
                    Suggestions for Placement Elements
                        Suggestions for Element Placement
```

Responses to Responses to Elements
Response Types
Positive
Negative Evaluating Ranking
Multi Response [Rate'n Rank, etc.]
Subjective
Partially Subjective
Objective
Partially Objective
Innate
Skill
Chance
Predictive
Suggestive
Provider of Elements
Element Response Period Provider's Elements
Element, Response Period Associate's Elements
Element Response Period Revenue Provider's Elements
Primary Game/Test Provider's Elements
Primary Game/Test Revenue Provider's Elements
Ancillary Game/Test Provider's Elements
Ancillary Game/Test Revenue Provider's Elements
Listener's Elements
Viewer's Elements
Participant's Elements
Period, Game, and Test Participation Methods
Single Controller Single Response Column Elements
Single Controller Multi Response Column Elements
Multi Controller Single Response Column per Controller
Multi Controller Multi Response Column per Controller
Viewer Interactive
Partially "Viewer Controlled"
Totally "Viewer Controlled"
Listener Interactive
Partially "Listener Controlled"
Totally "Listener Controlled"
Viewer and Listener Interactive
Partially "Viewer and Listener Controlled"
Totally "Viewer and Listener Controlled"
Viewer/Listener Interactive
Partially "Viewer/Listener Controlled"
Totally "Viewer/Listener Controlled"
Single Controller
Multi-Controller
Primary ERG/T [One or More Primary Controllers]
Secondary ERG/T [One or More Secondary Controllers]
Alternate ERG/T [One or More Alternate Controllers]
Ancillary ERG/T [One or More Ancillary Controllers]
Mystery ERG/T [One or More Mystery Controllers]

Preferred Embodiments

Response Point Controllers

An element controller may be anything capable of providing at least one response to one or more elements within an element response period or element response test.

An element response test provider generally requires a known, assumed, or mystery element controller and element response test participants to provide a same one or more types of responses to one or more of a plurality of elements within a test or one or more test element categories based at least in part on one or more objectives with respect to the test or test element categories. Test participants may be allowed or required to assign themselves and/or are assigned by a test provider or an administrator associated with the test provider a match or similar point value each time a participant's response to an element matches or is at least similar to an element controller's response to the same element.

An element controller's one or more responses to one or more elements within a test or test element category may directly or indirectly determine the fate or future of each element within the test or test element category when elements are capable of being controlled or having a future. An element controller's response to an element may be determined by a test provider or test revenue provider a correct response to the element with respect to the test.

An element controller's response to an element is generally a correct response to the element and an element the element controller does not response to is generally determined to be an incorrect response.

An element controller may be one or more persons, places, or things, or a percentage of a plurality of persons or things. An element controller may be animate or inanimate. An element controller may be designated or selected at random. An element controller may be designated by, but not limited to, a test provider, a test revenue provider, other element controllers, test viewers, Ancillary test participants, or primary test participants. An element controller may be selected as a result of a testing or qualification process. An element controller may be pre designated or designated through conventional processes. An element controller may be designated through unconventional or future types of testing, qualifying, or selecting processes. An element controller may be designated by means other than the means described herein.

Element Controller Information/Data

Element response test participants may be allowed or required to seek information on an element controller in order to provide An element controller may include, but is not limited to the following:

An Entity
A Plurality of Entities with One Voice
A Segment of a Plurality of Entities with One Voice
A Sub Segment of a Segment of a Plurality of Entities with One Voice and so on.
A Percentage of a Plurality of Entities
A Percentage of a Segment of a Plurality of Entities
A Percentage of a Sub Segment of a Segment of a Plurality of Entities and so on.
A Random or Calculated Response Machine, Apparatus, Generator, and Etc. (The machine, apparatus, or random response generator may be similar to what one may see utilized within a random indicia selection machine or apparatus or during a random drawing event or casino game.)
A Calculated Response Method
A Random Response Method An element controller may be comprised of one or more viewers, game participants, or consumers. An element response game/test provider allowing test participants to' utilize a specific response platform may designate one or more non participants/viewers or participants of one or more other response platforms as an element controller.

An element controller may be a percentage of consumers, wherein consumer purchases or responses may determine a correct response to elements.

Element Controller (6-19)

Generally, a test element controller determines correct responses to test elements and if applicable controls the fate or future of test elements. An element receiving a response submitted by the controller may be identified as a response point assignment element. A response point assignment element is an element a test participant must submit a response to in order to be assigned and/or assign themselves a response point value. An element response test provider may determine a most suitable element controller to be a majority of test participants. When the majority of test participants submit a response to an element, that element is identified as receiving a response from the element control and subsequently becomes a response point assignment element. The element response test may require the element controller to designate a plurality of test elements to become response point assignment elements. Although a majority of test participants is referred to as "The Element Controller", the majority of participants determining each of the plurality of response point assignment elements will in all probability not be the same majority from one response point element to the next.

A test participant correctly responding to the plurality of test elements is in essence a participant that is in sync with a plurality of a majority of test participants referred to as "The Element Controller".

Revenue Element Categories

A period or test provider may designate one or more elements categories for one or more sponsors, advertisers, marketers, retailers, wholesalers, manufacturers, researchers, or other types of revenue providers to incorporate elements in order to capture response data from entities comprising an element controller and/or test participants.

When a revenue provider is also a commercial producer or advertiser the revenue provider may incorporate products or aspects of a commercial into a test in order to garner data from entities and/or participants as to which aspects or products are most suitable or appealing and should or should not become commercial advertisement elements.

Synergy Between Consumer and Revenue Provider

A commercial or advertisement may be referred to as viewer interactive or partially viewer controlled when elements incorporated into the commercial or advertisement are utilized as a result of period or test data received by viewers and/or test participants.

When an element controller for elements within a revenue provider's element categories is comprised of a percentage of all test participants or a percentage of a segment of test participants and one or more test participants most in sync with the element controller are selected to participate in a future commercial or advertisement production the future production may become or referred to as viewer controlled. This method facilitates a new type of consumer to revenue provider synergy and subsequent revenue provider brand awareness.

When a plurality of segments of a society are designated as test element controllers test participants belonging to a segment may be required to respond to elements controlled by another element controller. The other element controller may be part of the same or a different test.

A segment of a plurality of test participants may comprise test element controller A and all test participants may comprise test element controller B. Test participants identified as being most in sync with test element controller A may receive or qualify to receive consideration with respect to test element controller A. Test participants identified as being most in sync with test element controller B may receive or qualify to receive consideration with respect to test element controller B. Test participants identified as being most in sync with both test element controller A and B may receive or qualify to receive consideration with respect to both test element controller A and B.

Multi Controller Test

A plurality of test element controllers may be utilized to control elements within a multi controller test. A multi controller test may have a plurality of element controllers. Each element controller may directly or indirectly determine the future of the same or different elements. Each element controller may determine correct and incorrect responses to test elements. Therefore, an element may have a positive future with respect to one element controller and a negative future with respect to another element controller. And, an element may be a correct element to respond to with respect to one element controller and the element may be an incorrect element to respond to with respect to another element controller. Each element controller may be comprised of a different segment of test participants. Each test participant within an element controlling segment may be required to respond to elements controlled by their segment. The element controller with respect to a segment of which a participant belongs may be determined to be a participant's primary controller. The element controller with respect to a segment of which the participant does not belong may be determined to be the participant's secondary controller. Test participants may be allowed or required to provide responses to elements with respect to a primary controller and may be allowed or required to provide responses to elements with respect to one or more secondary controllers. Therefore, an element response test may be comprised of a plurality of tests within a test.

A test participant may receive primary points with respect to their primary controller and may receive secondary points with respect to one or more secondary controllers. Participants may receive an award or consideration based on a number of primary points combined with a number of secondary points.

Participants with a highest combined point total may be referred to as participants most qualified to receive an award/consideration based at least in part on being in sync with multiple controllers.

When an element response test utilizes only one controller and the controller is comprised of a segment of participants, participants belonging to the controlling segment may be the test provider's primary target for element response data capture.

A test provider may designate members of one or more societies or a segment of members of one or more societies to become entities' comprising one or more element controllers who may not wish to or, be allowed to receive consideration or become test participants (primary or ancillary). For example, viewers participating as entities comprising an element controller in the voting process for events such as "American Idol" or "Survivor" may not wish or be allowed to become test participants whereas other members may wish to or be allowed to become test participants with an opportunity to receive consideration based on being in sync with the members not wishing to or allowed to become test participants.

Participants, players, test subjects, applicants, voting viewers, or related terms may be synonymous. Although terms such as player and applicant may be synonymous they are generally not used in the same context. The term player may refer to an entity/person seeking to win a prize and an applicant or participant may be referred to an entity/person seeking to receive an award or consideration such as employment whereas employment may consist of participation in a subsequent or future production. The employment may allow participants to assist or represent one or more element controllers the participant is identified as being in sync with as an element controller assistant or representative.

Members of a segment of a society designated as entities comprising an element controller may have an advantage as participants over participating member of other segments of the society which are not designated as entities comprising an element controller when a majority of the designated controlling entities responses to elements are determined to be correct responses to elements and point values and subsequent prizes and awards-are provided based at least upon assigned point values.

To provide members of non-controlling segments a level playing field with members of the controlling segment the provider may require controlling members to control designated elements in order to participant and respond to elements controlled by other controllers. Although a provider's objectives may not be consistent with or allow a level playing field for controlling and non-controlling members.

Element Controller Information/Data

An element response period or test provider may offer viewers and participants access to information/data or directions to garner information/data with respect to an element controller. Viewers- and test participants may wish to seek information on an element controller in order to provide more objective responses to test elements.

An element response period or test element controller may provide responses to elements based upon period viewer's or test participant's responses when viewer's or participant's responses to elements are accessible to the controller prior to an element controller's response submission deadline.

Viewer/Participant Designated Element Controller

Generally an element response period or test provider or period or test revenue provider designates one or more element controllers based upon one or more objectives or goals. A period, test, or revenue provider may allow viewers or test participants to designate one or more element controllers when a plurality of potential element controllers exists.

Example 1

A plurality of element controller options for one or more element categories within one or more future element response periods or series of periods may be presented to members of one or more societies prior to the period or series of periods. Unregistered or registered members of the one or more societies may be allowed to select one or more element controllers from the plurality of element controller options for the one or more element categories within the one or more periods or series of periods that are most suitable or appealing. One or more elements controllers selected by a majority of members of each or all societies for the one or more element categories of the one or more future periods or series of periods may become viewer determined element controllers.

Example 2

Two or more test element controller options for a plurality of test element categories are presented during an element response test registration process. Each registered participant is required to select one or more element controllers for one or more of their specific test element categories. A test participant's one or more selected element controllers control elements for them specifically. The participants are then required to respond to elements in a manner that is at least similar to their one or more selected element controllers. Participants identified to be in sync with their selected element controllers may selected or qualify to be selected to receive consideration based at least in part on being in sync with their one or more controllers.

A test provider may designate a primary element controller and present a plurality of alternate element controller options. Participants may be allowed or required to select one or more alternate element controllers. Participants may then be required to respond to elements controlled by the primary element controller and to elements they selected as an alternate element controller.

When more than one element controller exists within a test, and participants are allowed or required to respond to elements controlled by more than one element controller, each element controller may represent a sub test within a primary test. Each sub test may provide prizes and awards to participants with respect to a participant being in sync with each element controller. The primary test may provide prizes and awards to participants with respect to a participant being in sync with a highest number or all element controllers. The primary test prizes and awards may be of a higher value than each sub test.

Supreme Element Controllers ("Supreme Team")

Test participants may be offered a chance to become a member of a group or a team of entities comprising a supreme element controller. The team may be comprised of participants that meet one or more qualifications or criterions. One of the criterions may be to consistently receive a highest point total or a range of points for one or more test periods or series. The point total or range may be with respect to points received for being in sync with an element controller comprised of a majority of entities/participants from one or more societies or one or more segments of one or more societies. The team may bethought of as judges who may have ultimate or supreme powers similar to Supreme Court Judges in terms of making executive decisions for tests. The team may be referred to as the "Supreme Team". The Supreme Team may held in a higher regard than all other element controllers designated by a provider.

The "Supreme Team" may receive a salary or may be paid as independent contractors. The Supreme Team may or may not be required to star on Television as representatives of the controller(s) for which they are most in sync. For example, The "Supreme Team" with a highest esteem may be a group of participants that have proven they have their finger on the pulse of a nation. A "Supreme Team", but with less esteem, may be a group of participants that have their fingers on the pulse of a segment of a nation.

Imagine if you will a team consisting of members of one or more societies that when asked they have the ability to determine elements that are most suitable or appealing to a majority of members of one or more societies or a majority of one or more segments of one or more societies. Members of the Supreme Team will most likely be approached by corporations and businesses through out the World to become members of their team. This is why the Supreme Team may be required, by a licensing agreement, to be compensated in such a way to ensure their tenure is without disruption.

Mystery Controller

A mystery controller is generally an element controller that is not revealed until some time after a test participant's element response submission deadline. When an element controller is presented prior to a participant's response submission deadline the element controller may influence the participant's responses to elements. The participant's influenced responses may be referred to as objective responses. When an element controller is unknown or a mystery the participant's responses to elements are referred to as subjective or from the heart responses.

When a mystery controller is utilized for a plurality phases, period, or series a participant's assigned point points may be revealed to the participant during each phase, period, or series, or a participants points may be accumulated and kept secret or inaccessible by the participant until the mystery controller is revealed.

A test provider may designate a plurality of mystery controllers for an element category and require teams to consist of the same number of team members as the number of mystery controllers. Therefore, each participant may provide subjective responses to elements. The test may require each team member to be in sync with, a controller in order for the team to qualify to receive consideration.

The test provider may allow each member of a team in sync with a controller to receive consideration with respect to the controller the member is in sync with.

The mystery controller may be revealed at the conclusion of a response phase or period wherein the mystery controller is no longer utilized or is no longer utilized for the same element category. When one or more mystery controllers are utilized for a plurality of periods the mystery controller may only be revealed during a final period of the plurality of periods unless the controller is randomly designated to control elements within other element categories.

An element controller may provides responses to elements based at least in part on participant's responses to elements when participant's responses to elements are accessible to the element controller prior to the element controller's response submission deadline.

Seek and Find Element Controller

A test provider may provide clues to participants with respect to one or more element controllers of which the provider may utilize. The effects of this method may be similar to a provider utilizing a mystery controller.

A test provider may designate one or more element controllers for one or more element categories sometime before or after a test participant's response submission deadline.

Test participants may be allowed to select one or more element controllers for one or more element categories before or after a response submission deadline but prior to a predetermined time when controller's responses are revealed.

Multi-Controller

When multiple element controllers exist participants may be allowed or required to respond to elements controlled by two or more element controllers.

An element response test provider, a test providers partners or associates, or revenue providers may .designate one or a plurality of element controllers to control elements and/or determine correct responses to elements within one or a plurality of element categories assigned to the test provider, the test providers partners or associates, or the revenue provider.

Generally an element response test provider will designate one or more element controllers to control elements and/or provide correct responses to elements within the test providers one or more element categories or assigned one or more element categories when other categories are allocated or assigned to the test one or more associates or one or more revenue providers.

A test providers one or more partners or associates may designate one or more element controllers to control elements and/or provide correct responses to elements within the one or more associate's one or more assigned, element categories when the test provider allows one or more partners or associates to incorporate elements into the test.

One or more of the one or more associates may incorporate one or more elements into a test providers one or more element categories or one or more assigned element categories. Therefore, the one or more associates may or may not designate an element controller or assist in designating an element controller for elements within the providers one or more element categories or one or more assigned element categories to which the one or more associates incorporated the one or more elements.

A test providers one or more revenue providers may designate one or more element controllers to control elements and/or provide correct responses to elements within the one or more revenue providers one or more assigned element categories when the test provider allows the one or more revenue providers to incorporate elements into a test. One or more of the one or more revenue providers may incorporate one or more elements into a test provider's one or more element categories or one or more assigned element categories or into one or more of the test provider's associates one or more assigned element categories. Therefore, the one or more revenue providers may or may not designate an element controller or assist in designating an element controller for elements within the test provider's one or more element categories or one or more assigned element categories or one or more associate's one or more assigned element categories to which the one or more revenue providers incorporated the one or more elements.

A test provider may allow or require test participants to respond to one or more elements within one or a plurality of element categories wherein the elements within the one or each of the plurality of categories may be controlled by one or a plurality of element controllers.

Element Controlling Societies and Society Segments

When a test provider designates a percentage of all participants or interactive viewers from one or more societies, a. percentage of a segment of participants or interactive viewers from one or more societies, or a percentage of a segment of a segment of participants or interactive viewers from one or more societies, etc. as an element controller, the participants or viewers within the one or more societies or the one or more segments of the one or more societies comprising an element controller may have a response advantage over participants within other societies or segments. A provider may require those comprising an element controller (segment, etc.) to respond to elements that are controlled by one or more other element controllers. The other element controllers may be within the same or other test.

Polled Controller

Element controller element response data may be captured by means of polling surveys, questionnaires, or other similar means or means to achieve response data from a designated controller when an entity or entities comprising a controller are accessible to provide data, This method of designating an element controller may be similar to how the Nielson rating are garnered.

Imagine a retail or lottery type of test with element controllers responses to elements garnered from a survey similar to the survey information presented on a Television game show such as Family Feud. Imagine the host presenting correct responses to elements with the phrase, Controller Said . . . versus the family feud phrase "Survey Said"

Element Controller

During an element response period one or more element controllers designated to directly or indirectly controller the fate or future of one or more elements or provide correct responses to one or more elements within the period are generally required to provide one or more predetermined types of responses to a predetermined number of elements presented during the period prior to an element response submission deadline.

When a plurality of potential element controllers are providing a predetermined one 'or more types of responses to a predetermined number of elements within an element response period one or more of the potential element controllers may be designated sometime before, during, or after a response submission deadline. One of the one or more potential element controllers may be designated at a time consistent with, same as, or after a response submission deadline for ancillary test participants.

An element controller of one or more elements within an element response period may not be revealed or remain a mystery until a same time, a time consistent with, or after an ancillary test participant's element response submission deadline.

Celebrity Element Controller

A test provider may announce that an element controller of elements within one or more element categories is a celebrity. The celebrity may be presented prior to a participant's response submission deadline or may remain a mystery until after the participant's response submission deadline. By affording test participants an opportunity to qualify to assist or represent the celebrity in a future production or pre production a number of viewers may enroll to become test participants who would normally not enroll when other types of element controllers are utilized.

Element Controllers

An element controller may be anything that can respond to an element.

An element controller may be, but is not limited to:

An individual

A segment of individuals from a group

A segment of individual from a group may be a majority of individual, a demographic of individuals, a psycho graphic of individuals, to name a few.

A designated group with one controlling voice

A segment of a group wherein the segment is the controlling voice

A segment of viewers

A segment of viewers may be a majority of viewers, a demographic of viewers, a psycho graphic of viewers, to name a few.

A segment of game participants

A segment of game participants may be a majority of game participants, a demographic of game participants, a psycho graphic of game participants, to name a few One or more element controller designated to controller elements within one or more element categories of an ERP or ERGIT phase may or may not be designated to controller elements within the same or different element categories during a subsequent or future phase or period. Therefore, an element controller may or may not remain throughout a plurality of phases within a period or throughout a series of periods.

Example 1

An individual may be designated to control an element category containing a plurality of contestants and a segment of voting viewers may be designated to control elements within a category containing a plurality of survey preference options.

Example 2

During one period a council may be pre-designated to control an element category containing award nominee options and a segment of a plurality of registered ERG/T participants may be designated to control an element category containing survey questions.

Example 3

A segment of voting viewers may be designated to control elements within one or more element categories for a plurality of periods and an individual may be designated to control elements within the same one or more element categories for a period subsequent to the plurality of periods.

Example 4

A plurality of segments of voting viewers, a majority of voting viewers, and a plurality of individuals may be designated to control elements within one or more element categories for a plurality of periods When one or a plurality of element controllers are available to be designated to controller elements within one or more element categories an ERP or ERG/T provider or revenue provider or administrator may secretly designate one or a plurality of element controllers to control elements within the one or more elements categories before or after a response submission deadline for ancillary ERG/T participants or primary ERG/T participants. An element controller kept secret from participants and viewers may be referred to as a mystery controller. A mystery controller may be revealed during a period, a period during a series of periods, or a final period of a series of periods.

Example 5

A majority of ERG/T participants may be designated to controller an element category containing a plurality of animated characters and a plurality of mystery controllers (celebrities) may be designated to controller an element category containing a plurality of product (Nike Shoes) design options.
Types of Responses Generally element controller are instructed or required to provide one or more types of responses to a required number of elements within their designated element categories. The required one or more types of responses to the required number of elements is generally determine by an ERP or ERG/T provider or revenue provider prior to the ERP or ERG/T according to one or more period or game/test objectives. The one or more types of responses may be positive, negative, evaluating/rating, ranking, etc.

When an element controller is required to provide a positive response to one or more elements but less than all elements during a period phase prior to a final phase of the period, the one or more elements receiving the positive response may become element semi-finalists, element finalists, or winning elements for the period.

When an element controller is required to provide a negative response to one or more elements but less than all elements during a period phase prior to a final phase of the period, the one or more elements receiving the negative response may become losing elements for the period or dismissed from the series when a plurality of periods exist.

When an element controller is required to provide an evaluating or rating response to one or more elements the element controller is generally also required to provide a positive response to one or more highest rated elements, a negative response to one or more lowest rated elements, a positive ranking response to a plurality of highest rated elements, or a negative ranking response to a plurality of lowest rated elements.

An element controller may be required to provide two or more of evaluating responses to a required number of elements. Each evaluating response is generally based on an evaluation criterion. The two or more evaluating responses to each element are generally combined to determine an overall evaluation. Evaluation responses may be weighted with respect to the evaluation criterion.
Points An element controller's response to an element is determined to be a correct response to an element with respect to an ERG/T. Generally, both element controllers and participants are instructed/required to provide/submit one or more types of responses to a number of elements within one or more element categories prior to a deadline. Each time a participant provides a response to an element that is at least similar to a controller's response to the same element the participant assigns to himself or is assigned a point value.
Innate Ability to Respond In Sync with an Element Controller ERG/T participants may be able to match responses to elements with an element controller a plurality of times. A game/test objective may be to identify and engage participants with an innate ability to match responses with an element controller more time than a high percentage of other participants. Participants with an innate ability to match responses with an element controller may be identified as being in sync with the element controller.
Weighted Elements with Respect to Points Element response options within one element category or sub category may have a higher or lower point value than element with another element category or sub category.
Response Sweepstakes Sweepstakes participants may be required to match a required number of a controller's responses to be entered into the sweepstakes
CASTING DIRECTOR Employment as a Prize The game may award most qualified participants with an employment opportunity versus a game wherein something of tangible value changes hands. In essence, a game that provides nothing tangible as a prize may be scrutinized less by local and federal gaming restrictions.
FUTURE PARTICIPATION as a Prize
SKILL Show how a participant's ability to identify and respond to elements in a manner at least similar to an element controller constitutes a participant skill level especially when a participant responds to elements in a manner at least similar to an element controller over a plurality of response sessions.
Element Controllers An element response period may have a plurality of objectives. Each objective may be weighted according to the desires of the period provider. The period may have one or more element controllers. Generally, when a period has a plurality of element controllers, one element controller is a primary controller and one or more other element controllers are alternate element controllers. The function of a primary controller may be to determine the fate of primary objective elements and the function of an alternate element controller may be to determine the fate of alternate or less weighted objective elements.

An element response period may have a plurality of primary element controllers, each with a designated element category or element sub category.

Generally, an. element controller responds to element response options with subjectivity. One of the objectives of the period may be to gather subjective response data from entities comprising an element controller.

When Les Moonves (current CBS CEO and president) or Donald Trump are designated by themselves or others to controller the fate of element response options within one or more element categories during an element response period or game the objective of the period or game may be determined by Mr. Moonves or Mr. Trump.

One or more element categories within an element response period or game may be incorporated into the period or game for reasons other than contributing to a primary objective of the period or game. The reasons may be to gather response data from one or more designated controllers to the elements within the one or more categories.
Element Controller An element controller is one of the primary factors in the functionality of element response periods and element response periods with element response games and/or element response tests. The element controller may be anything that is capable of responding to an element. The element controller's response to an element may directly or indirectly control the fate or future of elements, when the fate or future of elements are controllable, presented before or during an element response period or element response game or test. The element controller's response to an element may be determined to be a correct response to the element for element response game or test participants.

An element controller may be identifiable, partially identifiable, or assumed. An identifiable element controller may be an entity or a plurality of entities with one voice. A partially identifiable or assumed element controller may be a percentage (majority) of a plurality of entities, a percentage of a segment (demographic) of a plurality of entities, a segment of a segment of a plurality of entities, a segment of a segment of a segment of a plurality of entities, etc.

An element controller may be revealed before or during an element response session.

An element controller may be kept secret during an element response session and revealed sometime after a response submission deadline.

When an element controller is revealed before or during a response session, participants may be provided with ample time to obtain information, regarding the element controller in order to provide an educated or objective response to element response options.

When an element controller is kept secret (mystery controller) participants may provide subjective responses to element response options.

When an element controller is a percentage of a plurality of entities, or a percentage of a segment of a plurality of entities the controller may be assumed or partially identifiable. When an element controller is assumed or partially identifiable participants may provide partially objective or partially subjective responses to element response options.

For example, when an element controller is a majority of a plurality of entities, the majority is unknown before the plurality has submitted or made known their responses. Therefore, an element response game participant may inquire to a number of entities (3 or more) to generate or compile a majority. By allowing participants to gather consensus data the participant is in essence interacting socially.

Example

A majority of ERG/T participants from an accessible society are identified as an element controller of a plurality of elements within an ERG/T. Participants are assigned a point value each time a response to an element matches or is at least similar to the majority of participant's responses to the same element. A participant may present the plurality of elements posted on printed material to 3 or more participants or entities of the society. The participants may inquire to the 3 or more entities which elements are most suitable to respond to. By garnering response information from a number of 3 or more participants the inquiring participant may determine the elements to which a majority will respond. The inquiring participant may then utilize the obtained knowledge in order to make an educated response to element response options.

The participant or entity providing response information to the inquiring participant may then receive the inquiring participant's response information. In essence, the information provider and recipient both become information recipients.

The participant may then respond to specific elements in a manner that is at least similar to an assumed element controller.

The inquiring participant then determines which elements a majority of participants inquired to will respond to a specific element.

The results of an element response game/test may determine if an entity is qualified to participate in a subsequent element response game as an element controller.

An element controller game/test may identify an entity or entities qualification level with respect to remaining an element controller for a subsequent phase, period, or series of periods.

Entities participating in an element controller game/test may be unqualified and wish to qualify to participate in subsequent or future element response game/test period or a game/test series of periods as qualified element controllers.

Element controller game/test participants may be viewers attempting to qualify to become element controllers during a subsequent or future element response period or a series of periods An element controller may be enrolled before or during an element response period.

An element controller may be predetermined by other means prior or during an element response period.

The element response period may be dedicated to an element controller. An example is how the academy is dedicated to the academy awards or how Mr. Hefner is dedicated to the playmate of the month or playmate of the year searches.

One or more participants with a highest point total with respect to one or more element controllers may be recognized as the most qualified to represent or assist the one or more element controllers.

Entities comprising an element controller may be required to participate in an element controller game/test. The element controller game/test may identify entities most qualified to remain entities comprising the element controller during a present or future phase, period or series of periods.

An element controller's ERG/T may be a primary, alternate, or ancillary ERG/T.

During an ERG/T a match or point value is assigned to a participant each time the participant's response to an element is at least similar to an element controller's response to the element. Therefore, a participant with the ability (objective or subjective) to identify and respond to elements in a manner that is at least similar to an element controller more times than other participants may qualify to represent or assist the element controller.

Objective Responses

Before or during an ERG/T an element controller's identity may be revealed to participants. When the element controller is known, the participant's responses to elements may be objective.

Before or during an ERG/T an element controller's identity may be partially revealed. This may be due to the fact that when an element controller is a segment of a plurality of entities (individuals/groups) the segment may be partially, known prior to the submission of responses by all entities. When an element controller is partially known, the participant's responses to elements may be-partially objective or partially subjective.

During an element response game an element controller's identity may be kept secret until after participants submit responses to elements. When the element controller is kept secret, the participant's responses to elements are subjective.

The element controller's responses to elements may be subjective or objective. Generally, an element controller's responses to elements are subjective. When an element response period has three or more element controllers or three or more element categories each controlled by a different element controller an element controller game/test may be incorporated into the period. An element controller game/test determines the one or more most qualified element controllers.

An element controller's game/test criterion may require an element controller or entities comprising an element controller to respond to elements in manner that is at least similar to a segment (majority) of element controllers or a segment of a plurality of entities.

An element controller game/test criterion may require an element controller to respond to elements in a manner that is at least similar to a segment of viewers or a segment of ERG/T participants.

An element controller may respond to elements in an objective manner during an element controller game/test.

An element controller game/test may allow element controllers to receive a match or point value each time a response to an element is at least similar to a segment of element controller's responses to the element.

An element controller game/test may allow element controllers to receive a match or point value each time a response to an element is at least similar to a majority of viewers or a segment of element response game participants. When no element controller game/test exists, the element controller's responses to elements are subjective.

An element controller may determine the fate of elements from one or more element categories or element sub categories when a plurality of element categories or element sub categories exist during an element response period or game.

When a plurality of element controllers are utilized, one element controller may be a primary element controller and one or more other element controllers may be alternate element controllers.

A primary element controller may a segment of a plurality of entities comprising the primary element controller. The one or more other or alternate element controllers may be one or more sub segments of the plurality of entities.

A primary element controller may be comprised of a segment of a plurality of entities comprising the primary element controller. The segment may not be known until the plurality of entities submits responses to elements.

An alternate element controller may be comprised of a segment or demographic of a plurality of entities.

A plurality of element controller's aggregated responses may determine the fate of elements within one or more element categories or an element sub, categories.

When more than one element controller exists during an element response period or element response game, one element controller is a generally a primary element controller and one or more other element controllers are generally alternate element controllers. A primary element controller may be comprised of a segment of a plurality of entities. The segment of the plurality of entities comprising the element controller may be a majority or a demographic of entities to which the element response period theme/genre or element response game theme/genre is targeted.

An element controller may determine elements that will be available to receive a response during a subsequent or future element response period or element response game.

An element controller may be, but is not limited to:
An entity (individual or group)
A segment of a plurality of entities (individuals, groups, or sub groups)
A segment of a plurality of viewers (individuals or teams)
A segment of a plurality of element response game participants
An entity with one voice
A segment of a plurality of entities
A segment of a plurality of individuals comprising an entity
A segment of a plurality of groups comprising an entity
A plurality of individuals
A group of individuals
A segment of a plurality of individuals
A majority of a plurality of individuals
A majority of individuals from a group
A sub group of a group of individuals
A group
An entity
A group of a sub group
A committee
A council
An assemblage
A character
A group of characters
A sub group of a group of characters
A majority of viewers from a group
A majority of a plurality of element response game participants
A segment of a plurality of element response game participants
A segment of a plurality of element response game participants from a group
A segment of element response game participants
A segment of a segment of element response game participants
A segment of a plurality of society members
A segment of a nation
A nation
A segment of audience members
A majority of audience members
A segment of viewers
A segment of a segment of viewers
A majority of viewers
A segment of consumers
A majority of consumers
A segment of a plurality of consumers
A segment of consumers from a group
A majority of consumers from a group
A majority of viewers from a specific demographic
A majority of element response game participants from a specific demographic
A majority of all viewers
A majority of all element response game participants
The Electoral College
Electorates from a specific geographic
A segment of element response game participants (viewers) from a specific nation
A segment of element response game participants (viewers) from a specific group of nations
An intelligent machine
A machine that provides random responses to elements
A machine that selects elements based on a criterion
The term segment may refer to:
A percentage
A part
A piece
A majority
Less than a majority
A demographic
A geographic
A psycho graphic
A group of entities within a group
A segment within a group or segment An ERP or ERG/T provider's primary objective may be to capture data from a specific or targeted segment of society by incorporating a theme of element response options into the ERP or ERG/T known or assumed to attract the segment. A provider's alternate objective may be to target or attract a different segment of the society by incorporating another theme of element response options known or assumed to attract the other segments. An element category may incorporate elements with themes to target a plurality of segments of the society.

An primary or alternate objective of an ERP or ERG/T provider may be to gather data from a range of participants not generally interested in a theme of element response options.

Element Controller Examples:

The grade or score an element receives from an element controller determines the elements level of performance, level of suitability, or level of appeal when compared to other elements.

The element may receive an evaluation; response from the element controller for a plurality of element evaluation categories. Each evaluation category may subject an element to a specific demand or performance requirement. A plurality of evaluation responses, ratings or scores, when combined to achieve a response total, may provide the necessary data to determine the element as a winning element, an element finalist, an element semi-finalist, a losing element, an eliminated element, to name a few.

One or more elements determined by an element controller to be a winning element, an element finalist, or an element semi-finalist for a period may become an element response option during a subsequent or future period or event.

A response to an element considered to be similar may be a ranking response whereas the element controller may rank an element as 1st and the participants may rank the element as 2nd or 3rd. Therefore, the participants responded to the same element with a response considered to be similar.

The participant with the ability to review/study an element controllers background, history, demographic, or psycho graphic information, to name a few, may be considered to have an ability that qualifies the participant become a representative of the element controller or a representative of a future element controller that may be related or similar to the element controller.

Providing No Element Controller Information

When a participant responds to an element in a exact manner or in a manner that is at least similar to an element controller, and the participant was not presented with information regarding the element controller or no element controller information was available or the element controller was not identified prior to the participant executing a response, the participants may be considered to have an innate ability to identify and respond to elements an element controller will find or has found to be most suitable, appealing or most qualified.

The participant's innate ability may qualify the participant to represent, assist, or work with the element controller in the future.

When a participant, with or without element controller information, consistently responds to elements during a plurality of phases or periods in an exact manner or in a manner at least similar to an element controller, the participant may be considered to be highly qualified to work with, for, or represent the element controller in any type of event where an element controller representative deemed necessary or desired by the powers to be or the element controller.

One or more participants with the ability (innate, learned/ skilled) to respond to elements in a manner that is at least similar to an element controller may qualify to represent the element controller or a similar element controller by staring in a future period or event as an element judge.

One or more participants with the ability (innate, learned/ skilled) to respond to elements in a manner that is at least similar to an element controller may qualify to represent the element controller or a similar element controller in the production of a future period or event as an element casting director.

Element Controller

An element controller is one of the major factors in the functionality of an element response periods, element response games, and element response tests.

An element controller may be anything with the ability to respond to elements within an element response period or element response game. Element controllers may or may not be qualified.

An element response game/test may determine if an entity is qualified to participate in a subsequent element response game as an element controller.

An element controller game/test may identity an entities level of qualification.

Element controller game/test participants may be unqualified element controllers attempting to qualify to participate in subsequent or future element response game/test period or a game/test series of periods as element controllers.

Element controller game/test participants may be viewers attempting to qualify to become element controllers during a subsequent or future element response period or a series of periods.

An element controller may be enrolled before or during an element response period.

An element controller may be predetermined by other means prior or during an element response period.

The element response, period may be dedicated to an element controller. An example is how the academy is dedicated to the academy awards or how Mr. Hefner is dedicated to the playmate of the month or playmate of the year.

During an element response game/test, a participant may receive a match or point value each time the participant's response to an element is at least similar to an element controller's response to the same element.

One or more participants with a highest point total with respect to one or more element controllers may be recognized as the most qualified to represent or assist the one or more element controllers.

Entities comprising an element controller may be required to participate in an element controller game/test. The element controller game/test may identify entities most qualified to remain as an element controller during a future phase, period, or series of periods.

An element controllers game may allow an entity or entities comprising an element controller to receive a match or point value each time an entity responds to an element in a manner that is at least similar to a percentage of a plurality of participants or interactive viewers or a percentage of one or more segments of a plurality of participants or interactive viewers.

An element controller game/test may identify an entity or entities most qualified to represent a plurality of participants or viewers or one or more segments of a plurality of participants or viewers in a future game/test.

An element controller game may provide a match or point value to an entity or entities comprising the element controller each time the entity or an entity responds to an element in a manner that is at least similar to a majority of other entities comprising the element controller when the element controller is comprised of three or more entities.

An element controller game/test may allow entities comprising the element controller to receive a match or point value each time an entity's response to an element is at least similar to the element controllers response to the same element.

An element controller game/test may allow element controllers to receive a match or point value each time a response to an element is at least similar to a majority (or segment) of voting viewers or a segment of element response game participants. When no element controller game/test exists, the element controllers responses may be subjective.

An element controller may determine the fate of elements from one or more element categories or element sub categories when a plurality of element categories or sub categories exist during an element response period.

A primary element controller may be comprised of a majority of a plurality of entities. An alternate element controller may be comprised of a segment or demographic of a plurality of entities.

When more than one element controller exists during an element response period or element response game, one element controller is a generally a primary element controller and one or more other element controllers are generally alternate element controllers. A primary element controller may be a segment of entities comprising an element controller. The segment of entities comprising the element controller may be a majority or a demographic of entities to which the element response period theme/genre or element response game theme/genre is targeted.

A plurality of element controllers may be combined to determine the fate of all element response options within a period or a series of periods or elements within one or more element categories or sub categories within a period or a series of periods.

An element controller may be, but is not limited to:
An intelligent machine
A machine that randomly responds to elements
A machine that selects elements based on a criterion
An individual
An entity with one voice
A segment of a plurality of entities
A segment of a plurality of individuals comprising an entity
A segment of a plurality of groups comprising an entity
A plurality of individuals
A group of individuals
A segment of a plurality of individuals
A majority of a plurality of individuals
A majority of individuals from a group
A sub group of a group of individuals
A group
An entity
A group of a sub group
A committee
A council
An assemblage
A character
A group of characters
A sub group of a group of characters
A majority of viewers from a group
A majority of a plurality of element response game participants
A segment of a plurality of element response game participants
A segment of a plurality of element response game participants from a group
A segment of element response game participants
A segment of a segment of element response game participants
A segment of a plurality of society members
A segment of a nation
A nation
A segment of audience members
A majority of audience members
A segment of viewers
A segment of a segment of viewers
A majority of viewers
A segment of consumers
A majority of consumers
A segment of a plurality of consumers
A segment of consumers from a group
A majority of consumers from a group
A majority of viewers from a specific demographic
A majority of element response game participants from a specific demographic
A majority of all viewers
A majority of all element response game participants
The Electoral College
Electorates from a specific geographic
A segment of element response game participants (viewers) from a specific nation
A segment of element response game participants (viewers) from a specific group of a nations demographic.
Element Controller
When the one or more objectives are determined by an element controller, the controller may establish the type of responses elements will receive.
Element Controller
Element controllers may be a machine, an entity, or a segment of a plurality of entities. Generally, one or more element controllers are determined according to a period objective.
Element Controller
A network such as the NTN network (Buzztime) may be designated to determine an element controller or allow Buzztime participant to comprise an element controller.
Element Controller Determined Responses
When a period or test objectives are determined by an element controller, the element controller may also determines the types of responses entities comprising the element controller, entities comprising another element controller, or game or test participants will be required to provide element response options.
Mystery Controller
A primary element controller of one or more elements within an element response test may not be revealed or remain a mystery until a same time, a time consistent with, or after a primary element response test participant's element response submission deadline.
Information from Outline
Element Controller Types
Revealed
   Identified to Participants prior to Element Presentations
   Partially Identified to Participants prior to Element Presentations
   Identified to Participants prior to a Response Submission Deadline
   Partially Identified to Participants prior to a Response Submission Deadline
Mystery
   Partially Identified to Participants prior to Element Presentations
   Partially Identified to Participants after Element Presentations
   Revealed to Participants after a Response Submission Deadline
   Identified to Participants after a series of Response Submission Deadlines
Identifiable to a Provider Prior to Element Presentations Identifiable to a Provider Prior to a Response Submission Deadline
Identifiable to a Provider after a Response Submission Deadline
An Entity
A Plurality of Entities with One Voice
A Segment of a Plurality of Entities with One Voice
A Sub Segment of a Plurality of Entities with One Voice
A Percentage of a Plurality of Entities
A Percentage of a Segment of a Plurality of Entities
A Percentage of a Sub Segment of a Segment of a Plurality of Entities
A Machine
An Apparatus
A Random Response Generator
A Poll or Survey Result (Think Neilson)
Period Provider Designated
Period Revenue Provider Designated
Period Viewer Designated
Primary Game/Test Provider Designated
Primary Game/Test Participant Designated
Primary Game/Test Viewer Designated
Secondary Game/Test Participant Designated
Alternate Game/Test Participant Designated
Ancillary Game/Test Provider Designated
Ancillary Game/Test Participant Designated
Ancillary Game/Test Viewer Designated Preferred Embodiments Segmenting A segment/graphic may be a demographic, biographic, psychographic, responsegraphic or an identifiable or non identifiable percentage of a segment of period, game, or test participants or entities comprising one or more element controllers of elements within a period, game, or test Entities comprising one or more element controllers and game and test participants may be grouped or segmented according to a response or interpretation of one or more elements.

During an element response period if participants comprise one or more element controllers the participants may be required to provide sufficient data as to segment or group participants in order to identify each participant (or team of participants) as a member of one or more segments.

When each participant submits a response to an element the response may be categorized according to a respective segment. Element s receiving responses from each segment are grouped with respect to the segment. After an element response submission deadline one or more categorized elements receiving a highest number and type of responses are identified. The identified elements from each segment are revealed during a next phase or period as an element semi finalist, element finalist, winning element, dismissed or rejected element, etc. determined by each segment of participants.

Grouping Participants and Controllers

When an element response period or game provider determines a majority of viewers or participants comprises an element controller, viewers or participants may or may not be required to provide information to identify the participants as members of a particular segment of participants.

When a provider determines or designates one or more segments of viewers or participants other than a majority of viewers or participants comprises one or more element controllers, viewers or participants are generally required to provide sufficient identifying data in order for the provider to segment or group participants.

A segment and demographic may be synonymous.

An element response period with no primary game may refer to viewers that respond to elements as participants.

Participants (period and/or game) may be grouped according to a how they respond to a plurality of elements rather than personal information they provide during a registration process.

Example 1

A green and blue element is presented during a registration process. Participants may be asked to provide a response to each element according to an appeal factor. Participants that submit the blue element as most appealing may be placed in a blue group. Participants that submit the green element as most appealing may be placed in a green group.

Example 2

A plurality of hair colors such as blond, brunette, silver, and pink are presented. Registering participants may be asked to select and submit the hair color that is most appealing. Participants may then be segmented according to an element response demographic.

Participants may also be grouped initially according to various types of standard or considered standard demographic information and then sub grouped according to other type of submitted information such as responses or interpretations of elements.

Responses to elements may be similar to the above two examples. Element interpretations may be similar to a psychological ink blot test where a subject is asked to reveal what comes to mind when an ink blot is presented.

Example

Participants making two hundred to two hundred and fifty thousand dollars year may be grouped according to their responses to specific elements. Therefore the two hundred to two, hundred and fifty demographic may have a plurality of response demographics or sub demographics.

Participants providing false information may not qualify to receive an award and may not be permitted to be period or game participants.

Segmenting ERG/T Participants

Members of a controlling segment of one or more societies or nations may have an advantage over members of non-controlling segments when a response to an element from the controlling segment is a correct response to the element and point values are given to members and non-members for the correct response. To provide members of the non-controlling segment and controlling segment a level playing field the following methods may be applied. Although these methods may not always be utilized by a provider due to the providers objectives which may not be consistent with providing a level playing field for the controlling members and non-controlling members.

Wien an ERG/T provider utilizes a single element controller for all elements within a designated game/test and the controller consists of members of a segment of at least one society, the members may be required, by the provider, to respond to a number of elements within their designated game/test in order to participant in of one or more other games/tests with controllers other than their respective social segment. This method allows a provider to differentiate a controller and participants while capturing a higher percentage of response data when compared to response data captured by participants that are also member of a controlling segment.

Multiple Primary Controllers

An ERG/T may have a plurality of primary element controllers consisting of members of various segments of at least one society. Members of each social segment may be required to respond to elements they control as controllers and be allowed to respond to elements controlled by member of other segments of the society as participants. The elements they control and elements controlled by others may be the same elements within the same game/test. Therefore, if the term participant can be defined as either controlling members of an ERG/T or ERG/T participants, this method would allow a provider, at times, to capture more than one response to each element by each participant. "At times" means that an element may be seen by a member of a controlling segment as requiring a same response for their controlling segment as well as another controlling segment.

Primary & Alternate Controllers

An ERG/T may have at least one primary element controller and one or more alternate element controllers. The one primary element controller may consist of a members of a segment of at least one society and the one or more alternate element controllers may consist of members of at least one society other than or overlapping the controlling segment.

Therefore, participating members of other segments of the society may qualify to receive an award for being in-sync with members of the controlling segment. When this method of qualifying only to represent other segments of a society is utilized no member of a segment may represent their segment but only other segments. In essence, participants/controllers will provide data for two or more ERG/Ts resulting in as least 100% more data capture than other types of participation requirements.

This method results in members of a segment of a society representing other segments of the society.

When the award is becoming a controller representative, participants of this type of ERG/T may represent Therefore, member of the society participating in the ERG/T they controller may qualify to receive an award for being in-sync with When an ERG/T provider utilizes a plurality of element controllers and each element controller consists of a different segment of participants, members of each segment may be required to participate in their segment as controllers and one or more other segments as ERG/T participants. Members of the controlling segment may not be allowed to receive an award for being in-sync with one segment unless they participate as controllers of their segment.

Segmenting Participants

The terms segment and graphic may be synonymous when referring to ERG/T viewers, participants, or element controllers.

Generally, members of a society are segmented to benefit those who are targeting a specific group within the society.

Currently people are categorized by age, sex, race, income, location, political party affiliation, to name a few.

Segmenting or categorizing may be achieved during a registration process wherein those who register provide various types of personal information.

Response Graphic

A new method of categorizing people is by collecting various types of responses to a diverse or closely related series of elements. For example, individuals that response positively to red and negatively to green may be categorized into a +RED, −GREEN category. Certain individuals may rank red hair a 10 on a 1 to 10 scale and auburn hair a 5 one a 1 to 10 scale.

Members of a society may be identified or categorized by the way each member responds to various elements. Members provided one or more responses to various elements may be segmented or categorized into a "Response Graphic".

Members may be categorized according to their ability to be in sync with one or more element controllers.

Members may be categorized according to time taken to submit responses or a type or number response platforms utilized.

Members may be categorized according to a fee paid or bid offered to participate. Members may be categorized according to a number of points received or accumulated.

Members that choose to organize a team may be categorized according to a number of team members, average team member's scores, or team member social diversity.

Segmenting Element Controllers

An element response period provider may designate one or a plurality of element controllers to determine the fate or future of elements within the period and correct responses to elements for ancillary element response test participation. A period provider may designate a plurality of element controllers each comprised of a different segment of a society. For example, a period provider may designate the ten segments of a society to control elements.

Element Controller Segment 1: Girls 12-17
Element Controller Segment 2: Women 18-34
Element Controller Segment 3: Women 35-49
Element Controller Segment 4: Women 55-64
Element Controller Segment 5: Women 65+
Element Controller Segment 6: Boys 12-17
Element Controller Segment 7: Men 18-34
Element Controller Segment 8: Men 34-49
Element Controller Segment 9: Men 50-64
Element Controller Segment 10: Men 65+

Each segment may determine which elements for their segment are most suitable for entertainment or consumption when elements are available to entertain or be consumed.

Ancillary test participants may be allowed or required to choose one or more segments to determine correct responses for their test whereby each segment represents test.

When a period provider designates an element controller comprised of a majority of viewers and the majority is made up of a specific segment of viewers, ancillary test administrators may register fewer participants than when the period provider designates a plurality of element controllers each comprised of a majority of a segment of viewers.

An ancillary test provider may register a higher number of test participants when a plurality of segments of a society are designated as ancillary test element controllers.

Specific Segment Period Participation

Specific segment period or test participation is accomplished by affording test participants are afforded an opportunity to register to participate with and/or against participants from specific Segments.

Up to now, interactive competitions and games only allow participants to receive points for participating with and/or against participants from all Segments combined.

Participants may now receive points for participating in game play or tests with and/or against participants form specific Segments.

Element Controller Segment 1: Girls 12-17
Element Controller Segment 2: Women 18-34
Element Controller Segment 3: Women 35-49
Element Controller Segment 4: Women 55-64
Element Controller Segment 5: Women 65+

Element Controller Segment 6: Boys 12-17
Element Controller Segment 7: Men 18-34
Element Controller Segment 8: Men 34-49
Element Controller Segment 9: Men 50-64
Element Controller Segment 10: Men 65+

Example 1

"American Idol" Game Play
The largest Segment for American Idol may be Women 18-34 (Segment 2)
A male viewer of "American Idol" age 50 (Segment 9) may not register to play with and/or against the largest Segment of American Idol players, Women 18-34 (Segment 2). If male viewers from Segment 9 could register to play with and/or against other players for Segment 9, viewers from Segment 9 would be empowered and enticed to register and play.

Example 2

"United We SCORE" in the search for "America's Host"
The largest Segment for "America's Host" may be Men 34-49 (Segment 8)
A female viewer of "America's Host" age 34 (Segment 3) may not wish to register to play against the largest Segment of "America's Host" players, Men 34-49 (Segment 2). If female viewers from Segment 3 could register to play with and/or against other players from Segment 3, viewers from Segment 3 would be empowered and enticed to register and play.

Viewers that register to play with and/or against players from all Segments combined may win cash and prizes of higher value than viewers that register to play with and/or against players from a specific Segment.

Therefore, viewers are empowered and enticed to register to play with and/or against players from all Segments combined as well as registering to play with and/or against players from specific Segments. This greatly increases the number of registering participants and a player's odds of winning cash and prizes.

Preferred Embodiments

Social Benefits
In a preferred embodiment, the present invention is directed to systems and methods for providing members of one or more society's an opportunity to receive consideration with respect to providing responses to primary theme and revenue providing elements.

The systems and methods of the present inventions serve to enable period and test providers and associated businesses to capture data from viewers of an unlimited number of element response period and test themes.

The data and/or information obtained from the present inventions may be utilized in order to provide analysis across demographic, geographic, biographic, and responsegraphic societies and society segments.
Social Benefits XA
Social Integration
An element response test provider may designate two or more test element controllers each comprised of a different segment of a society. In order for the test provider to achieve social integration the provider may allow or require test participants to form team with at least one team member belonging to each of the different segments of the society. Socially integrated teams may be offered prizes and awards of a higher value than individual participants or non socially integrated teams.

Team Participation
Teams may be allowed or required to respond to elements controlled by two or more controllers. A team's qualifying score may be determined by combining point totals with respect to the team being in sync with two or more controllers.
Individual Participation
Individuals may be allowed or required to respond to elements controlled by a plurality of controllers. An individual's qualifying score may be determined by combining point totals with respect to the individual being in sync with a plurality of controllers.

Teams and individuals registering to respond to elements controlled by a plurality of controllers may be grouped on a multi-controller level of participation.

Participants in sync with a highest number of element controllers may qualify to receive prizes or awards of a higher value than participants in sync with less than a highest number of controllers.

Entities comprising a plurality of element controllers and test participants may have a socially positive experience by knowing a society or segment of a society directly or indirectly benefited by the test experience.
Social Awareness
Social awareness is achieved by presenting various segments of a society (psychographic, demographic, geographic, response graphic, etc.) that may be utilized as an element controller of one or more element categories within an element response period or test.
Social Interaction
Test participants may respond to elements based on inquiries to members of a society or a segment of society when member of the society or segment of the society are designated to control elements with a test.
Social Learning
Social learning is achieved when a designated element controller is a segment of one or more societies and responses to elements receive from the one or more segments is revealed.
Social Consideration
Viewers and participants of element response periods and tests are provided an opportunity to understand how various societies or segments of societies evaluate and respond to elements within and around the societies or segments. Element response test viewers and participants belonging to one society or segment may begin to see elements as if they belonged to another society or segment.

In essence, viewers and participants will see and think of elements with objectivity resulting in consideration for members of various societies as well as elements within various societies.
Social Interaction
When one or more element response test element controllers is comprised of accessible entities test participants may enquire to the accessible entities or similar entities which elements within the test they would provide one or more responses with respect to one or more response required by the test provider.

When a test award is representing or assisting an element controller and a plurality of element controllers are presented for a participant to choose from, the participant may select a controller that is most desirable to represent or assist.
International Relationship Improvement
Revealing the potential of a nation's cooperation to achieve a common goal and providing rewards for the most cooperative, with or without knowledge of cooperation remains one of the most important opportunities of the next millennium. The system will improve the nation's interactions of various demographics resulting in productivity and economic and social benefit for the nation. There is a need in all areas of human endeavor for an effective method for valuing and measuring a viewer's contribution to the achievement of a national goal.

Collaboration Points

An element response test may provide a means for social interaction when an element controller is comprised of members of an accessible society.

When an element controller is known prior to a test and prior to a presentation of test elements test potential test participants may present assumed test elements to entities or assumed entities comprising the element controller to form a consensus on which type of elements the controller would respond to during the test.

Social Benefits

Viewers may receive interaction points for submitting an interaction submitted by a majority of viewers. A strategy viewers may implement is to inquire to as many viewers and non-viewers whether or not an interaction is correct according to the majority of viewers asked. Therefore, each viewer that approaches others may in effect create a viral marketing effect for the event by providing knowledge of the event to others. Therefore, the system may effectively create a multi million viewer focus group.

The system enables viewers to participate with and against viewers from specific demographics By allowing viewers to receive points for choosing which products form a plurality of products are most suitable to be interacted with by contestants and placed in the audition and competition, sponsor Viewers may then purchase.

The system enables audition and competition sponsor's to build relationships with viewers/consumers by provide them with prizes, gift certificates, product coupons, discounted product purchases and points for interacting with sponsor's products and surveys. Sponsor's gift certificates are then given to viewers/consumers with the highest point total.

Interaction with Subsequent Event

The system psychologically attaches viewers to subsequent game shows that also allows viewers to interact with the series Commercial Free Programming The system allows sponsor's to promote products and capture product and survey date within events such as pay-per-view and video on demand. Viewers with commercial skipping technology will not be able to escape sponsor's products and surveys.

Sub Systems

The system incorporates multiple sub systems

Specific Demographic Datacapture

The system allows administrator to

The system entices viewers to participate in the demographic they are most accustomed to interacting with.

Viral Effects

The system motivates viewers to ask friends, class mates and co-workers of their opinions on interaction before an interaction submission deadline. This creates a viral marketing effect of the elements of the event, the sponsor's products and survey integrated into the event and the subsequent events staring the winning contestants.

Encouraging Sponsor and Viewer Participation

Most Qualified or Suitable Established

The system rewards collaboration and

This Method and Performance Feedback System eliminates these deficiencies by exposing successful actions and collaboration patterns. It provides a means to compare the contributions of team members with functionally different roles on the team, thereby making each team member accountable for his contribution to team achievement. This value relationship serves as a simple guide for individual team members to guide their choice of actions and collaborations to maximize their personal reward. In the Basketball example, the reduced set of player action-types filters out most player actions and exposes the critical few actions that directly contribute to winning. This exposure identifies winning behavior and enables team members to quickly learn from past successes; and enables team members to emulate winning behavior in future action.

Fame & Fortune

Social Research

When an element response test provider designates members of one or more societies or one or more segment of one or more societies the test may provide valuable social research and testing information.

The utility of an element response game/test is multifaceted and provides a plurality of positive social benefits, such as social interaction, social learning, and ultimately social consciousness.

The most qualified element response game participants, at the very least, receive social recognition. Participants may receive:

Titles

Awards

Employment Social Status Frame

Fortune

Socially Diverse Team Participation

An element response test provider may allow or require participants to form teams. Teams may be required to consist of members that can prove they are most qualified to represent various segments of a society when the segments of societies are or have comprised of element controllers.

In each of the previous embodiments, an entity or entities comprising one or more element controller's and test participant's responses to elements are transferred to a server. The responses from the controllers, the test participants, or the controllers and test participants may be employed to produce a report of various statistics including number of entities comprising element controllers and test participants, distribution of demographics of entities, Other metrics may be employed to assess audience characteristics and to select future element response options tailored to a particular society or segment of a society.

Aspects or variations of methods and systems herein may be combined and combined with other present or future methods, systems, and apparatus to realize a plethora of novel, non-obvious, and utility providing methods, systems, and apparatus.

While the present inventions have been described and illustrated in various preferred and alternate embodiments, such descriptions and illustrations are not to be construed to be limitations thereof. Accordingly, the present inventions encompass any variations, modifications, and/or alternate embodiments with the scope of the present inventions being limited only by the claims, which will be included in the forthcoming application.

A plurality of novel embodiments have been described herein. Nevertheless, it may be understood that various modifications may be made without departing from the spirit and scope of the invention. Accordingly, other embodiments are within the scope of the following claims.

Revenue Provider

Method of an element response period provider engaging one or more revenue providers and allowing at least one revenue provider to incorporate elements into an element response period in order for the at least one revenue provider to capture data with respect to one or more incorporated elements in exchange for providing revenue to the provider.

Prior to an Element Response Period

An element response period provider engages one or more revenue providers to incorporate elements into an element response period The element response period provider designates one or more element controllers to determine the future or fate of one or more elements to be incorporated into a future element response period, whereas the elements future or fate the one or more elements is capable of being controlled, and to provide correct responses to one or more of said one or more elements, The one or more revenue providers designate one or more element controllers to determine the future or fate of one or more elements to be incorporated into the future element response period, whereas the elements future or fate the one or more elements is capable of being controlled, and to provide correct responses to one or more of said one or more elements, Designated element controllers and others are afforded access to one or more types of personal element response recording, element controller's element response recording, element response point self assignment, and element response point calculation systems During Phase One The element response period provider presents a plurality of element response options within one or more element categories, whereas one or more of the plurality of the presented elements are provided by at least one of the one or more revenue providers, The one or more element controllers designated by the element response period provider are instructed to provide at least one type of response to at least one of the element response period provider's presented elements, The one or more element controllers designated by the revenue provider are instructed to provide at least one type of response to at least one of the revenue provider's presented elements, The element response period provider receives the at least one type of response to the at least one of the element response period providers elements from the element response period providers one or more designated element controllers, The element response period provider receives the at least one type of response to the at least one of the revenue providers elements from the revenue providers designated one or more element controllers, During Phase Two The element response period provider presents at least one element receiving the at least one response from at least one of the period providers one or more element controllers, The element response period provider presents at least one element receiving the at least one response from at least one of the revenue providers one or more element controllers, Lay Claims—Two Phase Period Two Phase Element Response Period An element response period enables a period or revenue provider to achieve one or more objectives or goals. Generally, a primary period objective is to capture responses from an element controller to elements made available to receive responses during the period. The responses to elements from an element controller may determine the fate or future of elements when elements are of the type that may have a future and/or determine correct responses to elements for element response test participants when one or more element response tests are directly or indirectly associated with the element response period. Generally, an element response test directly associated with an element response period is referred to as a primary element response test. An element response test indirectly associated with an element response period is referred to as an ancillary element response test.

Another period objective may be to allow a revenue provider to incorporate elements into the period in order to capture responses to elements from the one or more element controllers designated by the period provider or one or more other elements controllers which may be designated by the revenue provider.

An element response test provides test participants an opportunity to receive a point value each time a response to an element is at least similar to an element controller's response to the same element. Test participants with a highest point value with respect to an element controller may be qualify to receive consideration. Most notably, test participants with a highest point total may be selected to assist or represent the respective element controller during a future production or event. Element controller assistants or representatives may receive a wage commensurate with a production or event executive's salary.

Members of one or more societies with access to an element response period or test observation platform and an element response submission platform may be afforded an opportunity to become test participants or entities comprising a controller.

A period provider or revenue provider may designate a mystery controller to determine the fate or future of elements and/or determine correct responses to elements. A mystery controller may be utilized to ensure test participant's responses are not influenced by knowledge of an element controller due to the fact that an element controller's responses to elements are determined to be correct test responses.

Two Phase Element Response Period

During Phase One

Viewers are presented a plurality of element response options and information based upon the one or more non mystery controllers.

The one or more controllers are instructed to provide a predetermined one or more types of responses to one or more of the plurality of elements presented. The element controller's instructions may be made known to viewers. The one or more elements controllers one or more types of responses to the one or more elements are received by at least one element response period response platform provider prior to an element controllers element response submission deadline.

During Phase Two

The one or more elements receiving the one or more types of responses from the one or more element controllers are presented. When a mystery element controller is utilized and is no longer needed the mystery controllers identity is revealed.

Two Phase Element Response Period and Ancillary Test

During Phase One

Viewers and ancillary test participants are presented a plurality of element response options and information based upon the one or more non mystery controllers.

The one or more controllers are instructed to provide a predetermined one or more types of responses to one or more of the plurality of elements presented. The element controller's instructions are made known to viewers and ancillary test participants. The one or more elements controllers one or more types of responses to the one or more elements are received by at least one element response period response platform provider prior to an element controllers element response submission deadline.

During Phase Two

The one or more elements receiving the one or more types of responses from the one or more element controllers are presented. When a mystery element controller is utilized and is no longer needed the mystery controllers identity is revealed.

The element response period provider or an ancillary element response test administrator announces a highest ancillary test point total. One or more test participants with a highest point total receive consideration. When the number of test participants with a highest point total exceeds a number to which consideration is available, a consideration selection process is utilized by the period provider or test administrator.

During an element response period or test one or more elements presented may be free point elements. A free point element is generally an element without a controller. A free point element allows a test participant to receive a point value for providing a response to the element.

An element response period or test may utilize one or more response point release elements. Response point release elements are element that when responded to allows a participants points to be counted or released. In essence a response point release element may hold captive possible response points.

One or more element controller presented during an element response period may be referred to as alternate element controllers when one or more primary element controllers exist. A test provider may allow test participants to receive consideration based on receiving a highest point total with respect to one or more alternate controller. A test provider may or may not require participants to respond to elements controlled by a primary controller, although the primary controller and alternate controllers may control the same elements. Therefore, when a participant is allowed to receive consideration with respect to a primary controller and an alternate controller and both the primary controller and alternate controller are controlling the same elements the participant must provide a set of responses with respect to each controller.

Viewers may be offered a secondary element response game provided by a secondary element response game administrator. The secondary element response game administrator may:

provide information based upon an element controller,
present a plurality of element response options,
enroll a plurality of secondary element response game participants,
receive a response to one or more elements from a plurality of secondary game participants,
receive a response to one or more elements from said element controller, wherein said element controller is other than a segment of said plurality of secondary game participants,
assign a point value to one or more secondary game participants each time an element response received from said element controller is at least similar to an element response received from said one or more secondary game participants,
during phase two of one or more periods, present said one or more elements receiving a response from said element controller,
identify one or more participants from said plurality of participants with a highest point total compared to said plurality of participants.

Lay Claims—Two Phase Period B

Two Phase Element Response Periods

Example 1

During Phase One

At least one element controller and a plurality of response elements are presented.

The at least one controller is instructed to submit one or more types of responses to one or more response elements prior to a response submission deadline.

During Phase Two

The one or more elements receiving the one or more types of responses from the at least one controller is presented.

At least one of the elements presented during phase one is presented as an element finalist for the period.

Example 2

During Phase One

At least one mystery element controller and a plurality of response elements are presented.

The at least one mystery controller is instructed to submit one or more types of responses to one or more response elements prior to a response submission deadline.

During Phase Two

The one or more elements receiving the one or more types of responses from the at least one mystery controller is presented.

At least one of the elements presented during phase one is presented as an element finalist for the period.

Two Phase Ancillary Element Response Test Series

Prior to Phase One

Members of one or more societies are informed of a future ancillary element response test series associated with a future series of element response periods providing one hundred test participants with a highest point total for each period an opportunity to receive a one thousand dollar award and test participants with a highest point total for the series an opportunity to star on Television as an element controller representative during the production of a future element response test and receive a one million dollar award.

Viewers are informed each time a test participants response to an element is at least similar to an element controller's response to the same element the test participant is allowed to assign them self and/or is assigned a point value.

A plurality of viewers register to become ancillary element response test participants.

Viewers and registered ancillary test participants are afforded access (free or fee?) to a printed element evaluation, response recording, and response point calculation system.

During Test Phase One

An element controller and a plurality of response elements associated with a first two phase element response period are presented on one or more media.

Ancillary test participants are instructed to submit (free or fee?) a same number of one or more types of responses to the same number of one or more elements as the element response period element controller is instructed to submit prior to an element response submission deadline.

The ancillary test administrator stores test participant's initial response submissions for future initial response re submission comparison.

During Test Phase Two

The one or more elements receiving the one or more types of responses from the element controller are presented on one or more media.

The ancillary test administrator informs test participants of a one thousand dollar qualifying point total with respect to initial response submissions.

The test administrator instructs participants with a. qualifying point total to re submit initial responses (free or fee?) prior to a qualifying initial response re submission deadline.

The test administrator identifies a participant's initial response re submission as either qualifying or not qualifying the participant to receive the one thousand dollar award. When a participants initial response re submission is qualified the test administrator compares the re submitted initial response submission with the participants stored initial response submission. When the response submissions match the test participant is identified as qualified to receive or qualified to be selected to receive the one thousand dollar award.

Test participants with a highest point total for the test series qualified to become element controller representative or qualified to be selected to become element controller representative.

Two Phase Element Response Test Series

Example 1

Prior to Phase One

Element response test participants are enrolled, five test element controllers are designated, and test elements are selected.

During the enrollment process test participants are required to select a test element controller.

Participants are informed each time a participant's response to an element is at least similar to a selected test element controller's response to the same element the participant is assigned a point value. Participants with a highest point value for the period qualify to receive consideration.

During Test Phase One

Five test element controllers and a plurality of element response options are presented.

The five test element controllers and test participants are instructed to provide a same number of one or more types of responses to a same number of one or more test elements prior to an element response submission deadline. Generally, a test participant's response submission deadline is before an element controller's response submission deadline.

During Test Phase Two

The one or more elements receiving the one or more types of responses from each of the five test element controllers are presented.

A highest point total with respect to each of the five controllers is announced.

One or more test participants with a highest point total with respect to the five test element controllers receive consideration.

Example 2

Prior to Phase One

Element response test participants are enrolled, one primary and five alternate test element controllers are designated, and a plurality of test elements are selected.

During the enrollment process test participants are required to select one of the five alternate test element controllers.

During the test participants are required to provide primary responses with respect to the primary controller and alternate responses with respect to a selected alternate controller.

Each time a participant's primary response to an element is at least similar to the primary controller's response to the same element the participant is assigned a primary point value.

Each time a participant's alternate response to an element is at least similar to a selected alternate controller's response to the same element the participant is assigned an alternate point value.

Participants with a highest primary point total qualify to receive primary consideration.

Participants with a highest alternate point total qualify to receive alternate consideration.

Participants with a highest combined primary and alternate point total qualify to receive consideration of a higher value than primary consideration.

During Test Phase One

The one primary test element controller, the five alternate test element controllers, and the plurality of test elements are presented:

The primary and alternate test element controllers and test participants are instructed to provide a same number of one or more types of responses to a same number of one or more test elements prior to an element response submission deadline.

During Test Phase Two

The one or more elements receiving the one or more types of responses from the primary controller and each of the five alternate controllers are presented.

A highest point total with respect to the primary controller and each of the five alternate controllers is announced.

One or more test participants with a highest point total with respect to the primary controller receive primary consideration.

One or more test participants with a highest point total with respect to each of the five alternate controllers receive alternate consideration.

One or more test participants with a highest combined primary and alternate point total receive consideration of a higher value than primary consideration.

Three Phase Element Response Periods

Example 1

During Phase One

At least one element controller, a plurality of phase one multi response session elements, and a plurality of single response session elements are presented.

The at least one controller is instructed to submit one or more types of responses to two or more of the plurality phase one multi response session elements and one or more types of responses to at least one single response session element prior to an element response submission deadline.

During Phase Two

The two or more phase one multi response session elements receiving the one or more types of responses from the at least one element controller are presented.

The at least one single response session element receiving the one or more types of responses from the at least one element controller is presented.

At least two phase one multi responses, session elements are presented while attached to or influenced by at least one phase one single response session element. The at least two phase one multi response session elements now become phase two multi response session elements.

The period providers at least one element controller is instructed to submit one or more types of responses to at least one of the phase two multi response session elements prior to a response submission deadline.

During Phase Three

The at least one phase two multi response session element receiving the one or more types of responses from the at least one element controller is presented. At least one of the phase two multi response session elements is presented as an element finalist for the period.

When a subsequent period exists phase one of the subsequent period is now initiated.

Example 2

During Phase One

At least one element controller designated by a period provider is presented.

At least one element controller designated by a revenue provider is presented.

A plurality of phase one multi response session elements and a plurality of phase one single response session elements are presented.

The period providers at least one element controller is instructed to submit one or more types of responses to two or more multi response session elements and one or more types of responses to at least one single response session element prior to a response submission deadline.

A plurality of phase one revenue response elements are presented.

The revenue provider's at least one element controller is instructed to submit one or more types of responses to at least one phase one revenue response element prior to a response submission deadline.

During Phase Two

The two or more phase one multi response session elements and the at least one phase one single response session element receiving the one or more types of responses from the period provider's at' least one element controller are presented.

The at least one revenue response element receiving the one or more types of responses from the revenue provider's at least one element controller is presented.

At least two phase one multi responses session elements are presented while attached to or influenced by at least one phase one single response session element. The at least two phase one multi response session elements now become phase two multi response session elements.

The period provider's at least one element controller is instructed to submit one or more types of responses to at least one of the two phase two multi response session elements prior to a response submission deadline.

A plurality of phase two revenue response elements are presented.

The revenue provider's at least one element controller is instructed to submit one or more types of responses to at least one of the plurality of phase two revenue response elements prior to a response submission deadline.

During Phase Three

The at least one phase two multi response session element receiving the one or more types of responses from the period provider's element controller is presented. At least one of the phase two multi response session elements are presented to an element finalist for the period.

The at least one phase two revenue response element receiving the one or more types of responses from the revenue provider's element controller is presented.

When a subsequent period exists phase one of the subsequent period is now initiated.

Initial Response Resubmission
 Afford viewers access to response test point calculation system
 Present test elements
 Allow users to input personal responses to one or more elements into system
 Receive initial response submissions from test participants
 Receive responses from element controller
 Allow users to input controller's responses
 Announce a consideration qualifying point total
 Receive initial response re submissions from self determined qualified test participants
 Provide one or more qualified test participants with consideration Redundant Response Submission Method a) An element response game/test provider affords members of one or more segments of one or more societies an opportunity to participate in an element response game/test.

b) Members are afforded access (Fee or free?) to one or more game/test registration platforms.

c) Registered and non registered participants are afforded access (Fee or free?) to at least one element response recording, response point assignment, and response point calculation system.

d) Game/test provider/administrator presents a plurality of element response options on one or more media (Free or fee?).

e) Participants may be instructed to record one or more types of responses to a number of presented elements.

f) Participants may be instructed to visit one or more response submission platforms (Free or fee?) to submit responses prior to a response submission deadline A and re visit the one or more response submission platforms (Free or fee?) to re submit responses prior to a response re submission deadline B when a qualifying response point total is calculated.

g) The one or more response submission platform administrators receive participant's response submissions prior to the response submission deadline A.

h) The one or more administrators store participant's submitted responses.

i) Provider announces/posts correct responses and one or more consideration qualifying point totals on one or more media.

j) Participants calculate response points to identify a consideration qualifying point total.

k) Participants with a consideration qualifying point total re visit one or more response submission platforms (Free or fee?) to re submit responses prior to the response re submission deadline B.

l) Administrator identifies participants re submitted responses as either qualified or unqualified.

m) Administrator compares participant's qualified re submitted responses with previously submitted responses.

n) Participants are identified as qualified when qualifying re submitted responses match previously submitted responses.

Aspects

Wherein all players may be required to rank a $1^{st}$ and $2^{nd}$ place element from three elements
    Wherein the element receiving a $1^{st}$ place response by a highest number of players becomes identifiable as the element receiving the controller's $1^{st}$ place response and the element receiving a $2^{nd}$ place response by a highest number of players becomes identifiable as the element receiving the controller's $2^{nd}$ place response
        Wherein players comprising the $1^{st}$ and $2^{nd}$ place controller become identifiable
            Wherein players that are in-sync with the $1^{st}$ place controller may receive a point value and player that are in-sync with the $2^{nd}$ place controller may receive a point value
            Wherein players that are in-sync with both the $1^{st}$ and $2^{nd}$ place controllers may receive a highest point total
Wherein all players may be required to provide a single response to one of two elements
    Wherein the one element receiving a response by a majority of players becomes identifiable as the element receiving the controller's response
        Wherein players comprising the controller become identifiable
            Wherein players that are in-sync with the controller may be assigned a point value
Wherein all players may be required to rank a $1^{st}$ and $2^{nd}$ place element from three elements
    Wherein the element receiving a $1^{st}$ place response by a highest number of players becomes identifiable as the element receiving the controller's $1^{st}$ place response and the element receiving a $2^{nd}$ place response by a highest number of players becomes identifiable as the element receiving the controller's $2^{nd}$ place response
        Wherein players comprising the $1^{st}$ and $2^{nd}$ place controller become identifiable
            Wherein players that are in-sync with the $1^{st}$ place controller may receive a point value and player that are in-sync with the $2^{nd}$ place controller may receive a point value
            Wherein players that are in-sync with both the $1^{st}$ and $2^{nd}$ place controllers may receive a highest point total
Wherein all players may be required to rate three elements on a scale of 1 to 10 and rank the highest rated element in $1^{st}$ place and rank the second highest rated element in $2^{nd}$ place
    Wherein the element receiving a highest rating by a highest number of players become identifiable as the element receiving the controller highest rating
        Wherein the element receiving the $1^{st}$ place ranking by the highest number of players become identifiable as the element receiving the controllers $1^{st}$ place ranking
            Wherein the element receiving the second highest rating by a highest number of players becomes identifiable as the element receiving the controller second highest rating
                Wherein the element receiving a $2^{nd}$ place ranking by a highest number of players becomes identifiable as the element receiving the controller's $2^{nd}$ place ranking
                    Wherein players comprising the highest rating controller receive a point value
                    Wherein players comprising the $1^{st}$ place controller receive a point value
                        Wherein players comprising the second highest rating controller receive a point value
                            Wherein players comprising the $2^{nd}$ place controller receive a point value
                                Wherein Players comprising each of the 4 controllers receive a highest point total
Wherein the controller may be comprised of a segment of players
    Wherein all players may be required to provide a single response to one of three or more elements
        Wherein the one element receiving a response by a highest number of the segment of players may become identifiable as the element receiving the controller's response
            Wherein players comprising the controller may become identifiable
                Wherein players identified as comprising the controller may receive -continued

```
            a point value
                Wherein players identified as not comprising the controller
                but did respond to the element receiving the controllers
                response may be assigned a point value
Wherein all players may be required to provide a single response to one of two elements
elements
    Wherein the one element receiving a response by a majority of the segment
    of players may become identifiable as the element receiving the controller's
    response
        Wherein players comprising the controller may become identifiable
            Wherein players identified as comprising the controller may receive
            a point value
                Wherein players identified as not comprising the controller
                but did respond to the element receiving the controller's
                response may be assigned a point value
Wherein all players may be required to rank a 1st and 2nd place element from three
elements
    Wherein the element receiving a 1st place response by a highest number of the
    segment of players may become identifiable as the element receiving the
    controller's 1st place response and the element receiving a 2nd place response by a
    highest number of the segment of players becomes identifiable as the
    element receiving the controller's 2nd place response
        Wherein players comprising the 1st and 2nd place controller become
        identifiable
            Wherein players comprising the 1st place controller may
            receive a point value and players comprising the 2nd place
            controller may receive a point value
                Wherein players not comprising the 1st place controller but
                did rank the controller's 1st place element in 1st place may
                receive a point value
                    Wherein players not comprising the 2nd place
                    controller but did rank the controller's 2nd place
                    element in 2nd place may receive a point value
```

I claim:

1. A method of response game play comprising the steps of:
receiving a control designation from a revenue provider, the control designation designating a control and wherein the control designation received from the revenue provider is a target demographic of interest to the revenue provider;
receiving selections for each of a plurality of competing media content game elements within one or more categories from a plurality of participants;
receiving selections for each of the same plurality of competing media content game elements within the one or more categories from the control, wherein the control is a subset of participants within the plurality of participants, the subset of participants comprising participants within the target demographic;
identifying selections received from a highest number of participants within the control as accurate selections;
assigning a point value to each respective participant in the plurality of participants who provided an accurate selection;
assigning a point value to each respective participant in the control who provided an accurate selection;
identifying a participant in at least one of the control and the plurality of participants receiving a highest assigned point value; and
providing information about the participant receiving a highest assigned point value and the accurate selections to the revenue provider.

2. The method of claim 1, wherein a highest assigned point value is based on one or more response types.

3. The method of claim 1, wherein a highest assigned point total is based on one or more media content game element categories.

4. The method of claim 1, wherein a highest assigned point total is based on one or more response periods.

5. The method of claim 1, wherein the participant identified as receiving the highest assigned point value receives a prize.

6. The method of claim 1, wherein the participant identified as receiving the highest assigned point value qualifies to participate in at least one future event.

7. The method of claim 6, wherein the future event participation includes participating as a research data panel member.

8. The method of claim 6, wherein the future event participation includes participating as a representative of the control.

9. The method of claim 6, wherein the future event participation includes participating as an assistant to the control.

10. The method of claim 6, wherein the future event participation includes participating as an in-studio participant.

11. The method of claim 10, wherein participating as an in-studio participant includes participating as a judge.

12. The method of claim 10, wherein participating as an in-studio participant includes participating as a contestant.

13. A method of conducting a response competition, comprising:
providing a plurality of media content game elements from a revenue provider to a group of participants;
receiving rating and ranking information from each participant in the group of participants for each media content game element in the plurality of media content game elements;
receiving rating and ranking information for each media content game element in the same plurality of media content game elements from a control group, wherein the control group is a subset of participants within the group of participants, the subset of participants comprising participants within a target demographic identified by the revenue provider;
selecting a winning media content game element from the plurality of media content game elements based on the rating and ranking information from the control group;

assigning a point value to each participant in the control group and each participant in the group of participants based on a similarity between the participant's ranking information and the ranking information received from the control group;

ranking participants in at least one of the control group and the group of participants based on the assigned point values;

selecting one or more winners from at least one of the control group and the group of participants based on the ranking, and providing information about the one or more winners to the revenue provider.

14. The method of claim 13, further comprising:

ranking the one or more participants from the group of participants by comparing the rating information received from each participant with the rating information received from the control group; and ranking the one or more participants from the control group by comparing the rating information received from each participant in the control group with the rating information received from the control group.

15. The method of claim 13, wherein ranking the one or more participants further comprises:

awarding a point value to each participant based on a similarity between the participant's ranking information and the ranking information received from the control group;

awarding a further point value to each participant based on a similarity between the participant's rating information and the rating information received from the control; and ranking the one or more participants based on the point values awarded to each participant.

16. The method of claim 13, wherein the plurality of media content game elements is provided to the group of participants via an interactive website.

17. The method of claim 13, wherein the rating and ranking information from at least one participant is received via an interactive website.

18. The method of claim 13, wherein the plurality of media content game elements is provided to the group of participants via a wireless device.

19. The method of claim 13, wherein receiving rating and ranking information from each participant comprises receiving information identifying the ranking of a participant's most favorite media content game element to least favorite media content game element within the plurality of media content game elements.

20. The method of claim 13, wherein receiving rating and ranking information from each participant comprises receiving a numerical point assignment for each media content game element from each participant.

21. The method of claim 13, wherein the rating and ranking information received from the control group are not revealed until after a participant rating and ranking submission deadline has passed.

22. A system for conducting a response competition, comprising:

a server configured to provide a plurality of media content game elements from a revenue provider to a group of participants over the Internet and receive rating and ranking information over the Internet from each participant in the group of participants for each media content game element in the plurality of media content game elements;

a scoring device configured to:

receive rating and ranking information for each media content game element in the same plurality of media content game elements from a control group, wherein the control group is a subset of participants within the group of participants, the subset of participants comprising participants within a target demographic identified by the revenue provider;

receive the rating and ranking information from each participant in the group of participants from the server;

select a winning media content game element from the plurality of media content game elements based on the rating and ranking information from the control group;

assign a point value to each participant in the control group and each participant in the group of participants based on a similarity between the participant's ranking information and the ranking information received from the control group; and rank participants in at least one of the control group and the group of participants based on the assigned point values;

a selection device configured to select one or more winners from at least one of the control group and the group of participants based on the rankings and provide information about the one or more winners to the revenue provider.

23. A system for conducting a response competition, comprising:

a visual platform configured to provide a plurality of media content game elements to a group of participants and a control group, wherein the control group is a subset of participants within the group of participants, the subset of participants comprising participants within a target demographic identified by the revenue provider;

a response platform configured to receive rating and ranking information from each participant in the group of participants and from the control group for each media content game element in the plurality of media content game elements; and a scoring platform configured to assign a point value to each participant in the control group and each participant in the group of participants based on a similarity between the participant's ranking information and the ranking information received from the control group, rank participants in at least one of the control group and the group of participants based on the assigned point values, and select one or more winners from at least one of the control group and the group of participants based on the rankings.

24. A method of response game play involving video content, comprising:

receiving video content for a ranking game from a revenue provider;

receiving a control player designation for the ranking game video content from the revenue provider, wherein the control designation received from the revenue provider is a target demographic of interest to the revenue provider;

receiving registration information for a plurality of ranking game players;

identifying control players in the plurality of ranking game players, the control players satisfying the control player designation from the revenue provider;

identifying non-control players in the plurality of ranking game players, the control players not satisfying the control player designation from the revenue provider;

receiving content ranking selections for the ranking game video content from the control players and the non-control players;

identifying content that received a highest number of ranking selections by the control players as accurate ranking selections;

assigning a point value to each control player and non-control player for each accurate ranking selection received from the respective player;

identifying individual control players and non-control players that received a highest point value as most qualified to represent the control players; and delivering to the revenue provider content ranking selections and registration information for the individual control players and non-control players that received the highest point value.

25. The method of claim 24, further comprising receiving payment from the revenue provider for the content ranking selections and registration information for the individual control players and non-control players that received the highest point value.

26. The method of claim 24, further comprising distributing the ranking game video content receiving a highest content ranking selection from an individual player to an email address of the player.

27. The method of claim 24, further comprising distributing the ranking game video content receiving a highest content ranking selection from players in a geographical region to email addresses of the players in the geographical region.

28. The method of claim 24, further comprising posting the individual control players and non-control players that received a highest point value on a multi-game leaderboard.

29. The method of claim 24, further comprising awarding a prize to a plurality of players receiving a highest multi-game point total.

30. The method of claim 24, wherein the revenue provider is an advertiser.

31. The method of claim 1, wherein the media content game elements are advertising content game elements.

32. The method of claim 13, wherein the media content game elements are advertising content game elements.

33. The method of claim 1, wherein the control designation is unknown to the plurality of participants.

34. The method of claim 13, wherein the control group is unknown to the plurality of participants.

35. The method of claim 24, wherein the control player designation is unknown to the non-control players.

* * * * *